(12) United States Patent
Aboelella et al.

(10) Patent No.: US 8,450,438 B2
(45) Date of Patent: *May 28, 2013

(54) HIGH TEMPERATURE POLYETHYLENE SOLUTION POLYMERIZATION PROCESS

(75) Inventors: Nermeen W. Aboelella, Pearland, TX (US); Robert D. Froese, Midland, MI (US); David D. Graf, Lake Jackson, TX (US); Wayde V. Konze, Midland, MI (US); Pulikkottil J. Thomas, Midland, MI (US)

(73) Assignee: Dow Global Technologies, LLC, Midland, MI (US)

( * ) Notice: Subject to any disclaimer, the term of this patent is extended or adjusted under 35 U.S.C. 154(b) by 937 days.

This patent is subject to a terminal disclaimer.

(21) Appl. No.: 12/300,857

(22) PCT Filed: Apr. 24, 2007

(86) PCT No.: PCT/US2007/009844
§ 371 (c)(1),
(2), (4) Date: Sep. 1, 2009

(87) PCT Pub. No.: WO2007/136496
PCT Pub. Date: Nov. 29, 2007

(65) Prior Publication Data
US 2012/0108770 A1 May 3, 2012

Related U.S. Application Data

(60) Provisional application No. 60/801,182, filed on May 17, 2006.

(51) Int. Cl.
*C08F 4/76* (2006.01)
*C08F 4/64* (2006.01)
*C07F 7/00* (2006.01)

(52) U.S. Cl.
USPC ........... 526/172; 526/161; 526/170; 526/160; 526/348; 526/348.2; 526/352; 556/51

(58) Field of Classification Search
USPC .................. 526/172, 161, 351, 348
See application file for complete search history.

(56) References Cited

U.S. PATENT DOCUMENTS

| 6,686,490 | B1 | 2/2004 | Kol et al. | |
| 6,869,904 | B2 * | 3/2005 | Boussie et al. | 502/171 |
| 7,645,893 | B2 * | 1/2010 | Rosen et al. | 556/7 |
| 8,101,696 | B2 * | 1/2012 | Konze et al. | 526/172 |
| 2004/0010103 | A1 | 1/2004 | Boussie et al. | |
| 2005/0164872 | A1 | 7/2005 | Boussie et al. | |
| 2005/0215737 | A1 | 9/2005 | Dharmarajan et al. | |
| 2005/0288461 | A1 | 12/2005 | Jensen et al. | |

FOREIGN PATENT DOCUMENTS

| WO | WO-99/45041 A1 | 9/1999 |
| WO | WO-03102042 A1 | 12/2003 |
| WO | WO-2006/020624 A | 2/2006 |
| WO | WO-2006/020624 A1 | 2/2006 |
| WO | WO 2006/020624 A1 * | 2/2006 |

OTHER PUBLICATIONS

Dow Global Technologies, Inc., EP Appln. No. 07776021.3 Office Actions, Sep. 6, 2011.
Dow Global Technologies, Inc., CN Appln. No. 200780025905.2 Office Actions, May 7, 2012.
Dow Global Technologies, Inc., RU Appln. No. 2008149711 Office Actions, May 7, 2012.
PCT/US2007/009844, International Search Report, Nov. 17, 2008.
PCT/US2007/009844, Written Opinion of the International Searching Authority, Nov. 17, 2008.
PCT/US2007/009844, International Preliminary Report on Patentability, Nov. 17, 2008.

* cited by examiner

*Primary Examiner* — Rip A. Lee

(57) ABSTRACT

Metal complexes of polyvalent aryloxyethers appropriately substituted with sterically bulky substituents possess enhanced solubility in aliphatic and cycloaliphatic hydrocarbons and/or when employed as catalyst components for the polymerization of ethylene/α-olefin copolymers, produce products having reduced $I_{10}/I_2$ values.

25 Claims, 1 Drawing Sheet

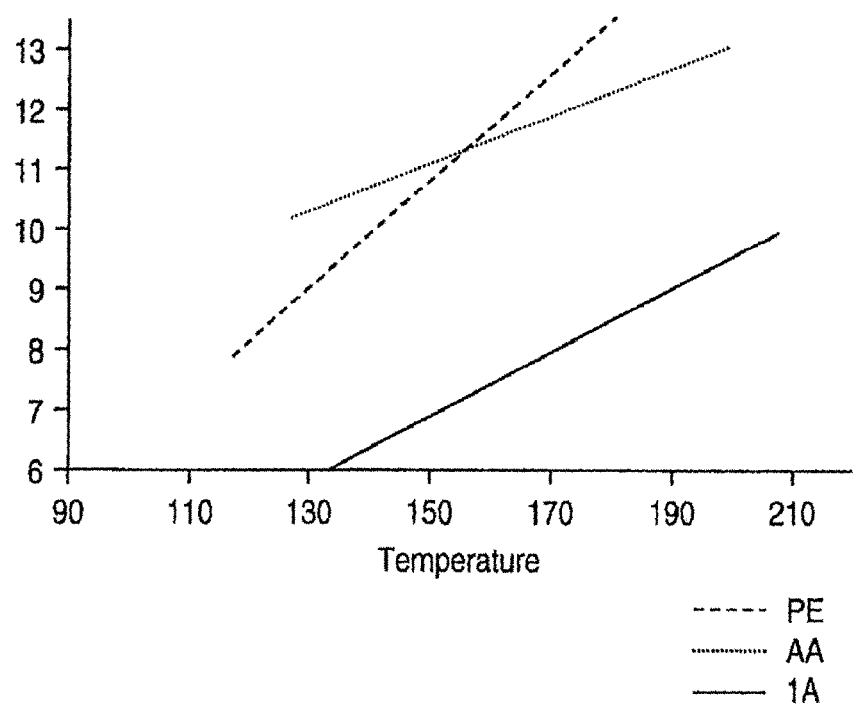

HIGH TEMPERATURE POLYETHYLENE SOLUTION POLYMERIZATION PROCESS

CROSS REFERENCE STATEMENT

This application claims the benefit of U.S. Provisional Application 60/801,182, filed May 17, 2006. This application is a national stage entry under 35 USC §371 from PCT application PCT/US07/09844 filed Apr. 24, 2007.

BACKGROUND OF THE INVENTION

Higher temperature solution processes for olefin polymerization are highly desirable due to the increased throughput, decreased energy necessary for devolatization and decreased fouling that these higher temperatures afford. Although Ziegler-Natta catalyst systems can be run at high temperatures commercially, these catalysts suffer from poor efficiency and poor comonomer incorporation at elevated temperatures. In addition, polymers produced from Ziegler-Natta catalysts at elevated temperatures have broadened molecular weight distributions, which limit their suitability for use in many applications. Conventional Ziegler-Natta catalysts are typically composed of many types of catalytic species, each having different metal oxidation states and different coordination environments with ligands. Examples of such heterogeneous systems are known and include metal halides activated by an organometallic co-catalyst, such as titanium chloride supported on magnesium chloride, activated with organoaluminum and organoaluminumhalide cocatalysts. Because these systems contain more than one catalytic species, they possess polymerization sites with different activities and varying abilities to incorporate comonomer into a polymer chain. The consequence of such multi-site chemistry is a product with poor control of the polymer chain architecture. Moreover, differences in the individual catalyst site produce polymers of high molecular weight at some sites and low molecular weight at others, resulting in a polymer with a broad molecular weight distribution and a heterogeneous composition. Due to this heterogeneity, mechanical and other properties of the polymers may be less than desired.

More recently, catalyst compositions based on well defined metal complexes, especially transition metal complexes such as constrained geometry catalysts (CGCs), metallocenes and post-metallocenes have been shown to give products having high comonomer incorporation and narrow molecular weight distribution. However, these catalysts often have poor high temperature stability and also suffer from poor efficiencies at elevated polymerization temperatures. Additionally, the molecular weight of the polymers formed from these catalysts often decreases dramatically with increasing temperature, especially for polymers containing significant amounts of comonomer (lower density). That is, the ability of most olefin polymerization catalysts to incorporate higher α-olefins in an ethylene/α-olefin copolymer decreases with increasing polymerization temperature, due to the fact that the reactivity ratio, $r_1$, is dependant on polymerization temperature.

Reactivity ratios of catalysts may be obtained by known methods, for example, the technique described in "Linear Method for Determining Monomer Reactivity Ratios in Copolymerization", M. Fineman and S. D. Ross, *J. Polymer Science*, 5, 259 (1950) or "Copolymerization", F. R. Mayo and C. Walling, *Chem. Rev.*, 46, 191 (1950). One widely used copolymerization model is based on the following equations:

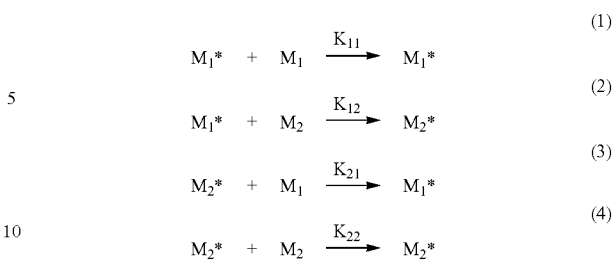

where $M_i$ refers to a monomer molecule which is arbitrarily designated as "i" where i=1, 2; and $M_2^*$ refers to a growing polymer chain to which monomer i has most recently attached.

The $k_{ij}$ values are the rate constants for the indicated reactions. For example, in ethylene/propylene copolymerization, $k_{11}$ represents the rate at which an ethylene unit inserts into a growing polymer chain in which the previously inserted monomer unit was also ethylene. The reactivity ratios follow as: $r_1 = k_{11}/k_{12}$ and $r_2 = k_{22}/k_{21}$ wherein $k_{11}$, $k_{12}$, $k_{22}$ and $k_{21}$ are the rate constants for ethylene (1) or propylene (2) addition to a catalyst site where the last polymerized monomer is an ethylene ($k_{1X}$) or propylene ($k_{2X}$).

Certain post metallocene catalyst compositions based on Group 3-6 or Lanthanide metal complexes, preferably Group 4 metal complexes of bridged divalent aromatic ligands containing a divalent Lewis base chelating group are disclosed for use in olefin polymerizations in U.S. Pat. No. 6,827,976 and US 2004/0010103. In general, these metal complexes are usefully employed in solution polymerizations at elevated temperatures. However, their use at higher reaction temperatures in the production of ethylene/α-olefin copolymers often results in polymers having high $I_{10}/I_2$, due, it is believed, to high incorporation levels of long chain monomers formed in situ under the polymerization conditions employed (long chain branch formation). In many applications the presence of such long chain branching can give polymer products having advantaged properties due to increased processability and green-strength, while maintaining a narrow molecular weight distribution. However, for certain other applications, such as films, fibers and adhesives, high levels of long chain branching may not be desired. In particular, poorer tear properties in films made from such polymers, poor fiber forming and drawing properties, and diminished hot tack strength may be correlated to increased $I_{10}/I_2$ values. Accordingly, it would be desirable to provide post metallocene catalysts having the ability to prepare interpolymers of ethylene and one or more $C_{3-20}$ α-olefins with lower $I_{10}/I_2$ values while retaining good high temperature operating conditions.

In addition, the solubility of this class of post metallocene metal complexes in aliphatic or cycloaliphatic hydrocarbon solvents is often lower than desired. Catalyst solubility is very important from an industrial standpoint, in order to maximize catalyst efficiency and reduce catalyst shipping volumes. The more metal complex that can be dissolved in a given volume of solvent the greater the reduction in storage and shipping costs. In addition, catalyst poisoning due to natural occurrences of impurities in the solvent, becomes significantly more problematic as concentrations are limited. A greater portion of the catalyst is sacrificed or lost due to poisoning.

Accordingly, selection of catalyst compositions capable of formation of ethylene/α-olefin copolymers at increased efficiency at elevated reaction temperatures and production of polymers of reduced or low $I_{10}/I_2$ is greatly desired. Use of catalysts having increased solubility in aliphatic or cycloaliphatic hydrocarbons is also greatly desired.

In US 2005/0215737 A1, a continuous, solution, olefin polymerization process is disclosed for preparing ethylene-butene and ethylene-propylene interpolymers at high ethylene conversions.

For the industrial production of high molecular weight polyolefins, especially in a continuous solution process, it is especially desirable to conduct the polymerization reaction under conditions of relatively high reactor temperature, with a high conversion of the olefin monomers to polymer in a reactor having a high solids content, all with high catalyst efficiency. This combination of process requirements severely restricts the choice of metal complex that can suitably be employed. Metal complexes that are suited for use under less demanding conditions may, in fact, be unacceptable for use under commercial processing conditions. Metal complexes that are relatively good incorporators of comonomer over wide temperature ranges with limited ability to incorporate longer chain comonomers are especially desired.

In WO 99/45041, another continuous, solution olefin polymerization process is disclosed using bridged hafnocene complexes with noncoordinating anionic cocatalysts. Although the resulting polymers contained significant amounts of comonomer, catalyst efficiencies were relatively low and polymer molecular weights, even in the absence of chain transfer agent, were less than desirable.

In WO 03/102042, a high temperature, solution olefin polymerization process is disclosed using indenoindolyl transition metal complexes to prepare polyolefins at temperatures greater than about 130° C. In one example, the copolymerization of ethylene and 1-hexene was carried out at 180° C. resulting in formation of a polymer having poor comonomer incorporation (density=0.937 g/cm$^3$) at relatively low catalyst efficiencies.

We have now discovered that certain metal complexes may be employed in a solution polymerization process to prepare relatively high molecular weight ethylene containing interpolymers containing relatively large quantities of $C_{3-8}$ α-olefin comonomer incorporated therein while retaining relatively low $I_{10}/I_2$ values, indicative of reduced long chain branch formation. Moreover, the solubility of such metal complexes in aliphatic or cycloaliphatic hydrocarbons (as measured by solubility at 20° C. in methylcyclohexane, hexane, or mixed hexanes) has been found to be exceptionally and unpredictably high. Accordingly, there is now provided a process for the preparation of such olefin polymer products, especially high molecular weight polyethylene interpolymers having reduced $I_{10}/I_2$ values, at very high catalyst efficiency.

SUMMARY OF THE INVENTION

According to the present invention there are now provided certain metal complexes capable of being employed in a highly efficient solution polymerization process to prepare ethylene/α-olefin interpolymers, especially copolymers of ethylene with 1-butene, 1-hexene or 1-octene. In addition there are now provided certain metal complexes characterized by high polymerization efficiency and productivity due to increased solubility in aliphatic or cycloaliphatic hydrocarbons. In a final embodiment of the invention, there is now provided an improved, high temperature, continuous solution polymerization process for preparing the foregoing ethylene interpolymers having a desirable range of physical properties, primarily reduced $I_{10}/I_2$.

More specifically, according to the invention it is possible to produce interpolymers possessing relatively high molecular weights (with correspondingly low melt indices) and high levels of comonomer incorporation (low densities), having relatively low $I_{10}/I_2$. The polymers can be prepared under high temperature, high conversion conditions at high catalyst efficiencies.

The present invention is particularly advantageous for use under continuous solution polymerization conditions wherein a reaction mixture comprising a metal complex, an activating cocatalyst, optionally a chain transfer agent, and at least one $C_{2-20}$ α-olefin is continuously added to a reactor operating under solution polymerization conditions, and polymer product is continuously or semi-continuously removed therefrom. In one embodiment, the invention is used to prepare copolymers of ethylene and at least one $C_{3-8}$ α-olefin, preferably ethylene and 1-butene, ethylene and 1-hexene, or ethylene and 1-octene having low $I_{10}/I_2$ and reduced long chain branching. In addition, the process may employ the use of catalyst compositions comprising more than one metal complex or compound and/or multiple reactors, optionally in combination with a chain shuttling agent.

The invention is particularly suitable for production of resins that are used in the insulation layer of electrical wires and cables, particularly in medium and high voltage applications, in films, including multi-layer and single component films, in fibers and other extruded articles, and as components of adhesives.

BRIEF DESCRIPTION OF THE DRAWINGS

FIG. 1 shows $I_{10}/I_2$ values for ethylene/octene copolymers as a function of reactor temperature for several metal complexes.

DETAILED DESCRIPTION OF THE INVENTION

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date hereof. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

The term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

As used herein with respect to a chemical compound, unless specifically indicated otherwise, the singular includes all isomeric forms and vice versa (for example, "hexane", includes all isomers of hexane individually or collectively). The terms "compound" and "complex" are used interchangeably herein to refer to organic-, inorganic- and organometal compounds. The term, "atom" refers to the smallest constituent of an element regardless of ionic state, that is, whether or not the same bears a charge or partial charge or is bonded to another atom. The term "heteroatom" refers to an atom other than carbon or hydrogen. Preferred heteroatoms include: F, Cl, Br, N, O, P, B, S, Si, Sb, Al, Sn, As, Se and Ge. The term "amorphous" refers to a polymer lacking a crystalline melting point as determined by differential scanning calorimetry (DSC) or equivalent technique.

The term, "hydrocarbyl" refers to univalent substituents containing only hydrogen and carbon atoms, including branched or unbranched, saturated or unsaturated, cyclic, polycyclic or noncyclic species. Examples include alkyl-, cycloalkyl-, alkenyl-, alkadienyl-, cycloalkenyl-, cycloalkadienyl-, aryl-, and alkynyl-groups. "Substituted hydrocarbyl" refers to a hydrocarbyl group that is substituted with one or more nonhydrocarbyl substituent groups. The terms, "heteroatom containing hydrocarbyl" or "heterohydrocarbyl" refer to univalent groups in which at least one atom other than hydrogen or carbon is present along with one or more carbon atom and one or more hydrogen atoms. The term "heterocarbyl" refers to groups containing one or more carbon atoms and one or more heteroatoms, but no hydrogen atoms. The bond between the carbon atom and any heteroatom as well as the bonds between any two heteroatoms, may be a single or multiple covalent bond or a coordinating or other donative bond. Thus, an alkyl group substituted with a heterocycloalkyl-, aryl-substituted heterocycloalkyl-, heteroaryl-, alkyl-substituted heteroaryl-, alkoxy-, aryloxy-, dihydrocarbylboryl-, dihydrocarbylphosphino-, dihydrocarbylamino-, trihydrocarbylsilyl-, hydrocarbylthio-, or hydrocarbylseleno- group is within the scope of the term heteroalkyl. Examples of specific heteroalkyl groups include cyanomethyl-, benzoylmethyl-, (2-pyridyl)methyl-, and trifluoromethyl-groups.

As used herein the term "aromatic" refers to a polyatomic, cyclic, conjugated ring system containing $(4\delta+2)$ $\pi$-electrons, wherein $\delta$ is an integer greater than or equal to 1. The term "fused" as used herein with respect to a ring system containing two or more polyatomic, cyclic rings means that with respect to at least two rings thereof, at least one pair of adjacent atoms is included in both rings. The term "aryl" refers to a monovalent aromatic substituent which may be a single aromatic ring or multiple aromatic rings which are fused together, linked covalently, or linked to a common group such as a methylene or ethylene moiety. Examples of aromatic ring(s) include phenyl, naphthyl, anthracenyl, and biphenyl, among others.

"Substituted aryl" refers to an aryl group in which one or more hydrogen atoms bound to any carbon is replaced by one or more functional groups such as alkyl, substituted alkyl, cycloalkyl, substituted cycloalkyl, heterocycloalkyl, substituted heterocycloalkyl, halogen, alkylhalos (for example, $CF_3$), hydroxy, amino, phosphido, alkoxy, amino, thio, nitro, and both saturated and unsaturated cyclic hydrocarbons which are fused to the aromatic ring(s), linked covalently or linked to a common group such as a methylene or ethylene moiety. The common linking group may also be a carbonyl as in benzophenone, or oxygen as in diphenylether, or nitrogen as in diphenylamine.

The term, "sterically bulky" refers to substituents occupying significant volume that is not in the plane of the aryl-group or arylene-group to which they are attached (non-coplanar). Groups that are considered to be sterically bulky for purposes of the present invention may be identified based on theoretical calculations according to known techniques. One suitable technique, known as QSAR analysis, is disclosed in C. Hansch and A. Leo: "Exploring QSAR Fundamentals and Applications in Chemistry and Biology" Chapter 3 (ACS Professional Reference Book, Washington, D.C. (1995)). According to this technique, certain steric parameters, identified as Es, which is indicative of the steric bulkiness of the substituent in three dimensions, and B1, which is indicative of the steric bulkiness of the substituent in two dimensions, may be calculated. For purposes of the present invention three dimensional bulkiness is the most significant indicator of effectiveness, and accordingly, Es values are preferably employed to indicate steric bulkiness. Preferred sterically bulky ligand groups possess B1 values of 1.75 or higher, preferably 1.90 or higher, and most preferably 2.50 or higher. Highly preferred sterically bulky ligand groups possess Es values of −1.70 or less, preferably −2.30 or less, and most preferably −2.50 or less.

Embodiments of the invention provide a new solution process for making olefin polymers using a catalyst composition comprising a transition metal complex at high temperature and high catalyst efficiency, wherein the produced polymers are of variable density (due to varying amounts of comonomer incorporated into the polymer) and relatively low $I_{10}/I_2$. Particularly of interest is the ability to produce high molecular weight ethylene/α-olefin interpolymers at reaction temperature from 130 to 200° C., at high conversion conditions with very high catalyst efficiencies. These polymers desirably have narrow molecular weight distributions ($M_w/M_n$) less than or equal to 3.0, preferably less than or equal to 2.7 and most preferably less than or equal to 2.4, comonomer contents giving polymer densities from 0.850 to 0.950, more preferably from 0.860 to 0.930, and most preferably from 0.865 to 0.920, and $I_{10}/I_2 \leq 10$, more preferably $I_{10}/I_2$ from 6.0 to 10.0. Such polymers are suitably employed where improved extrusion performance is desired, such as in molding and extrusion grades of polymer especially for film, fiber, or wire and cable insulating applications.

The term "polymer" as used herein refers to a macromolecular compound prepared by polymerizing one or more monomers. A polymer refers to homopolymers, copolymers, terpolymers, interpolymers, and so on. The term "interpolymer" is used herein interchangeably with the term copolymer to refer to polymers incorporating in polymerized form at least two copolymerizable monomers, or incorporating long chain branching as a result of chain termination/olefin formation reactions in situ, and reincorporation of the in situ formed olefin. Accordingly, copolymers may result from the polymerization of a single monomer, under the correct operating conditions. The least prevalent monomer in the resulting copolymer or interpolymer is generally referred to by the term "comonomer". The chain length of long chain branches, referred to above, is consequently longer than the carbon length resulting from polymerization of any deliberately added comonomer, and in particular, longer than 6 carbons. The presence of long chain branching may be detected by the increased shear sensitivity of the polymer, as disclosed in EP-A-608,369, and elsewhere. Preferably for use herein, long chain branching is very low. Preferred polymers according to the invention possess Melt Index Ratio (MIR), which is a ratio of polymer melt viscosities measured under differing loads, especially $I_{21}/I_2$ less than 30 or $I_{10}/I_2$ values less than 10. Moreover, the process and polymers resulting therefrom may be characterized by a relationship between polymer melt index (MI) satisfying the equation: $I_{10}/I_2 \leq 10.32(MI)^{-0.0814}$ for MI values ranging from 0.01 to 50, preferably from 0.1 to 30, and most preferably from 0.3 to 10.

The process described herein may be employed to prepare interpolymers of ethylene and a $C_{3-8}$ α-olefin, especially copolymers of ethylene with 1-butene, 1-hexene or 1-octene, as well as copolymers of ethylene, propylene and a non-conjugated diene, for example, EPDM interpolymers. Preferred interpolymers are ethylene/1-octene copolymers containing from 2 to 20, preferably from 3 to 12 mole percent octene comonomer.

Polymerization conditions generally refer to temperature, pressure, monomer content (including comonomer concentration), catalyst concentration, cocatalyst concentration, monomer conversion, or other conditions that influence the properties of the resulting polymer. By operation according to the prescribed polymerization conditions of the invention high molecular weight polymers may be prepared having relatively high comonomer incorporation with high catalyst activities, low cocatalyst usage and high $I_{10}/I_2$ or MIR. In particular, activities (based on weight of polymer to weight of transition metal) greater than 0.5 g/µg, preferably greater than 0.55 g/µg, and even greater than 0.6 g/µg are possible. Solubility of the metal complexes desirably are at least 5 weight percent, preferably at least 6 weight percent as measured at 20° C. in either hexane, methylcyclohexane, or mixed hexanes (hydrogenated propylene dimers sold commercially as Isopar E™, available from ExxonMobil Chemicals Inc.).

Polymer weight-average molecular weight ($M_w$) is measured by gel permeation chromatography, one technique of which as described in U.S. Pat. No. 5,272,236. Alternatively, melt index, $I_2$, $I_{10}$ or $I_{21}$, measured, for example, according to ASTM D-1238 may be employed as an indication of molecular weight. Generally, melt index is inversely related to the molecular weight of the polymer. The higher the molecular weight, the lower the melt index, although the relationship is not necessarily linear.

One embodiment of this invention entails a process which comprises contacting ethylene and one or more $C_{3-8}$ α-olefins, and optionally a conjugated diene, in a continuous solution polymerization process. The present invented process is particularly advantageous for use under polymerization conditions wherein a reaction mixture comprising metal complex, cocatalyst, ethylene, and at least one $C_{3-8}$ α-olefin comonomer and optional diolefin (or the individual components thereof) is continuously or intermittently added to a reactor operating under solution polymerization conditions, optionally in the additional presence of a chain transfer agent, and polymerized product is continuously or semi-continuously removed therefrom. This process preferably comprises, polymerizing ethylene and one or more $C_{3-8}$ α-olefins and or diolefins using a zirconium complex and a cocatalyst of approximate formula $[(C_{14-18}H_{27-35})_2CH_3N]^+[B(C_6F_5)_4]^-$, and optionally an alumoxane scavenger, under continuous, solution polymerization conditions at a temperature from 100 to 200° C., preferably from 120 to 190° C., under high ethylene conversion conditions (>85 percent, preferably >90 percent) which results in a polymer with a density between 0.850 and 0.950 g/cm³, preferably between 0.860 and 0.930 g/cm³, and most preferably between 0.865 and 0.920 g/cm³, a melt index ($I_2$) from 0.01 to 50.0, preferably from 0.1 to 30.0, and most preferably from 0.3 to 10.0, a narrow molecular weight distribution (Mw/Mn<3.0, preferably <2.7, especially <2.5) with a catalyst efficiency of greater than 0.5 $g_{polymer}/\mu g_{metal}$, and chain transfer agent concentration from 0.0 to 2.5 mole percent, preferably from 0.01 to 2.0 mole percent.

When a chain transfer agent is utilized, a sufficient quantity is used so that a substantial decrease in molecular weight (>10 percent) occurs compared to a comparative polymerization without the use of chain transfer agent. Highly desirably, the quantity of chain transfer agent employed is adjusted to produce a polymer having Mn of at least 50,000. A most preferred chain transfer agent is hydrogen.

Surprisingly, the present metal complexes are capable of producing polymers of extremely high molecular weight under a variety of polymerization conditions while retaining a narrow molecular weight distribution (<3.0) and a catalyst efficiency of greater than 0.5 $g_{polymer}/\mu g_{metal}$, thereby allowing the use of a chain transfer agent to control molecular weight. Especially surprising is the fact that density (comonomer content) is relatively unaffected by polymerization temperature and long chain branching is minimized relative to other catalysts of the present type bearing different substituents. This allows for the efficient preparation of ethylene/α-olefin interpolymers with varying levels of comonomer coupled with relatively low $I_{10}/I_2$.

Metal Complexes

Suitable metal complexes for use according to the present invention include compounds corresponding to the formula:

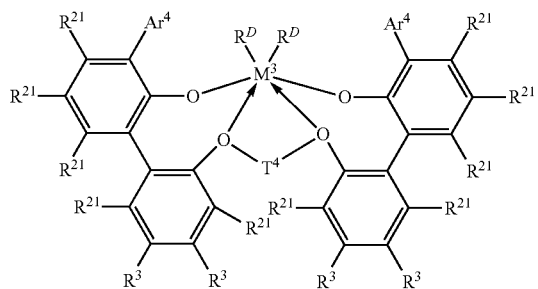

where $M^3$ is Hf or Zr, preferably Zr;

$Ar^4$ independently each occurrence is a substituted $C_{9-20}$ aryl group, wherein the substituents, independently each occurrence, are selected from the group consisting of alkyl; cycloalkyl; and aryl groups; and halo-, trihydrocarbylsilyl- and halohydrocarbyl-substituted derivatives thereof, with the proviso that the substituent must lack co-planarity with the aryl group to which it is attached;

$T^4$ independently each occurrence is a $C_{2-20}$ alkylene, cycloalkylene or cycloalkenylene group, or an inertly substituted derivative thereof;

$R^{21}$ independently each occurrence is hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ independently each occurrence is hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$, independently each occurrence is halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group.

The present inventors have discovered that each of the $Ar^4$ groups must be substituted with at least one sterically bulky group, and preferably substituted with two such groups in order to achieve polymers of the desired $I_{10}/I_2$ range under the present reaction conditions. Further desirably, at least one $R^3$ group and preferably two such $R^3$ groups on different arylene rings also are sterically bulky. Substantially equivalent solubility of the metal complex can be gained at the expense of slightly increased $I_{10}/I_2$ if $R^3$ groups located on the aryleneoxy group are linear alkyl groups. Highly preferably, $R^3$ substituent groups located at both 4-positions of the arylene groups in the metal complex are sterically bulky.

Further preferably, $Ar^4$ groups correspond to the formula:

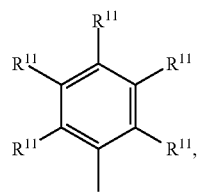

wherein $R^{11}$ independently each occurrence is hydrogen, halo, hydrocarbyl, trihydrocarbylsilyl, trihydrocarbylsilylhydrocarbyl, alkoxy or di(hydrocarbyl)amino of up to 50 atoms not counting hydrogen, or two $R^{11}$ groups together are part of a ring attached to the aryl group in two positions, with the proviso that in at least one occurrence $R^{11}$, or the divalent derivative of two such $R^{11}$ groups, is sterically bulky, and/or lacks co-planarity with the aryl ring to which it is attached.

Desirably $R^{11}$ and $R^3$ substituents are sterically bulky monovalent ligand groups lacking co-planarity with the phenylene ring to which they are attached, especially tertiary alkyl-, sec-alkyl-, cycloalkyl-, aryl, trihydrocarbylsilyl-, tri(hydrocarbyl)silylhydrocarbyl-, or (hydrocarbyl)aryl-groups having from 3 to 20 nonhydrogen atoms. Examples include: tert-butyl, sec-butyl, tert-octyl (2,4,4-trimethylpentan-2-yl), 1-phenylethyl, 2,3-dimethyl-but-2-yl, trityl (triphenylmethyl), cumyl (2-phenylprop-2-yl), tert-amyl (1,1-dimethylpropyl), phenyl, cyclohexyl, trimethylsilyl, trimethylsilylmethyl, isopropyl, 2,4,6-trimethylphenyl, 2,6-dimethylphenyl, 3,5-di(isopropyl)phenyl, and 3,5-di(t-butyl)phenyl.

Further preferred examples of suitable metal complexes correspond to the formula:

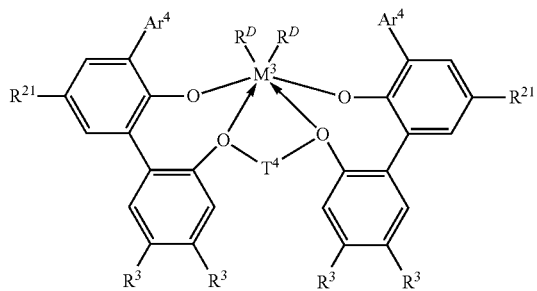

where $M^3$ is Zr;

$Ar^4$ is 3,5-di(tert-butyl)phenyl, 3,5-di(isopropyl)phenyl, 3,5-di(isobutyl)phenyl, 3,5-di(tert-octyl)phenyl, 3,5-di(2,4,6-trimethylphenyl)phenyl, 3,5-di(2,6-dimethylphenyl)phenyl, 3,5-di(2,4,6-tri-isopropylphenyl)phenyl, 3,5-di(3,5-di-tert-butylphenyl)phenyl, 1,2,3,4,6,7,8,9-octahydroanthracen-5-yl, 3,6-di(tert-butyl)-9H-carbazol-9-yl, 3,6-di(tert-octyl)-9H-carbazol-9-yl;

$R^{21}$ independently each occurrence is methyl or tert-butyl;

$R^3$ independently each occurrence is branched alkyl, cycloalkyl, substituted aryl, or other sterically bulky group;

$T^4$ is propan-1,3-diyl, butan-1,4-diyl, cyclohexane-1,2-diyl or cyclohexane-1,2-dimethylene; and $R^D$, independently each occurrence is halo or a hydrocarbyl or trihydrocarbylsilyl group of up to 20 atoms not counting hydrogen, or 2 $R^D$ groups together are hydrocarbylene, hydrocarbadiyl, 1,4-dihydrocarbyl-substituted 1,3-butadiene, or a poly(hydrocarbyl)silylene group.

In a highly preferred embodiment at least one $R^{11}$ group on each $Ar^4$ ring, most preferably 2 such $R^{11}$ groups in the 3 and 5 positions of an $Ar^4$ phenyl ring, and at least two $R^3$ group on different arylene rings are branched alkyl, cycloalkyl, hydrocarbyl-substituted aryl, or poly(hydrocarbyl)-substituted silyl groups, containing from 3 to 20 carbons, preferably from 4 to 12 carbons. Most highly preferred sterically bulky $R^{11}$ and $R^3$ groups are tertiary butyl and tertiary octyl groups. A most highly preferred metal complex is a zirconium complex of the foregoing formula wherein both $Ar^4$ groups are 3,5-di-t-butylphenyl or 3,5-di-t-octylphenyl, one $R^3$ group in the 4- or 5-position of each phenyleneoxy ligand is tert-butyl or tert-octyl, and each $R^{21}$ group is hydrogen or hydrocarbyl of up to 20 carbon atoms, preferably tert-butyl.

Most highly preferred metal complexes according to the invention correspond to the formulas:

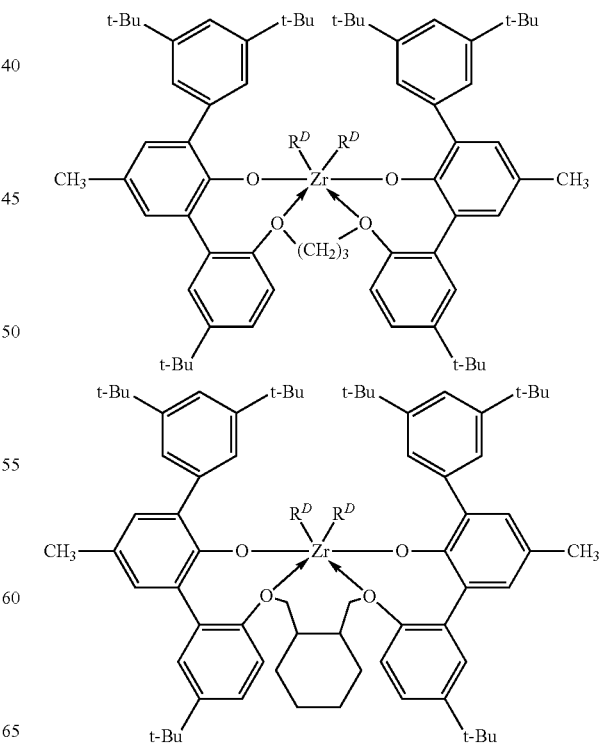

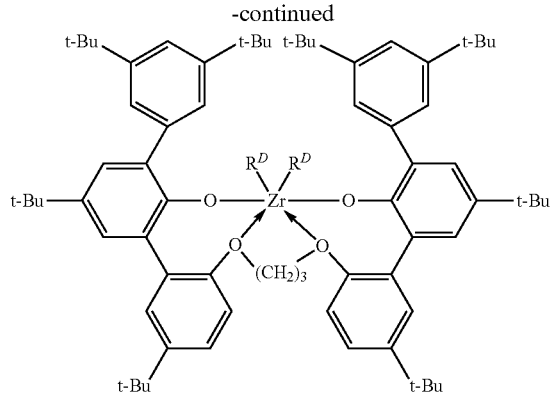
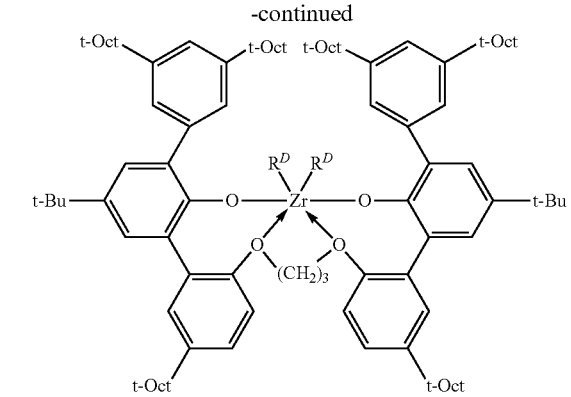
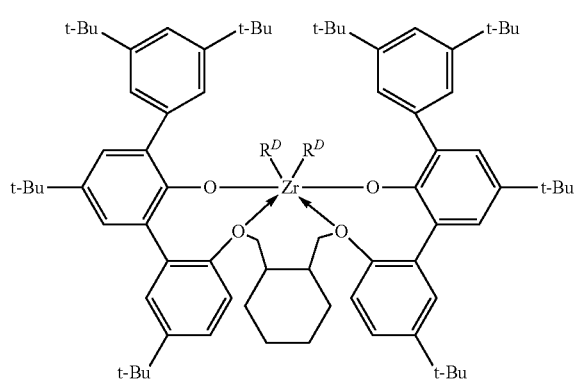
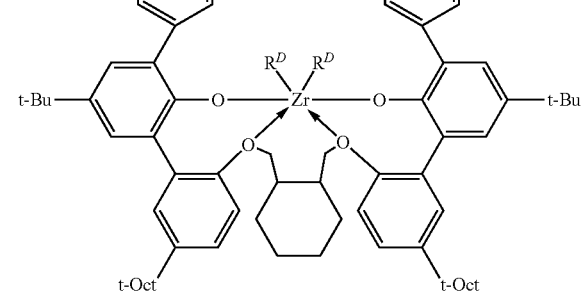
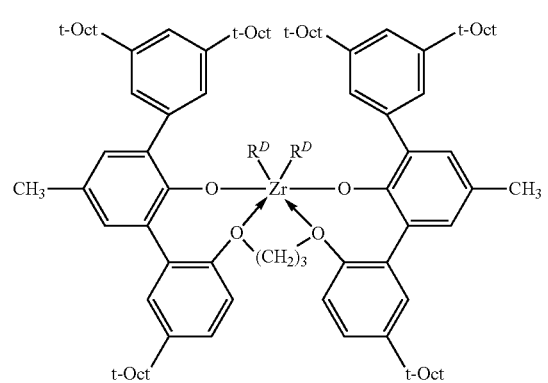
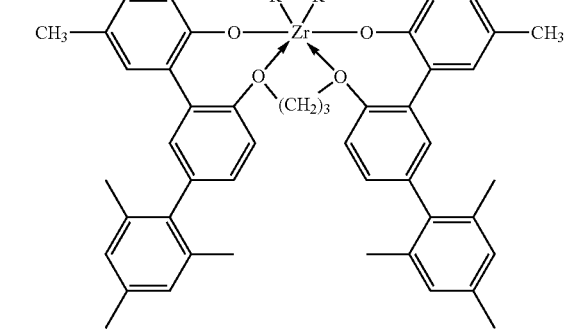
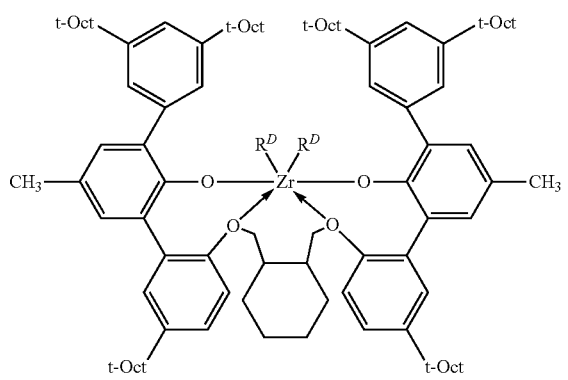
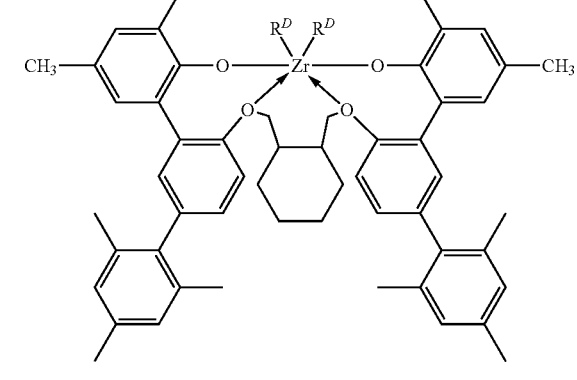

-continued
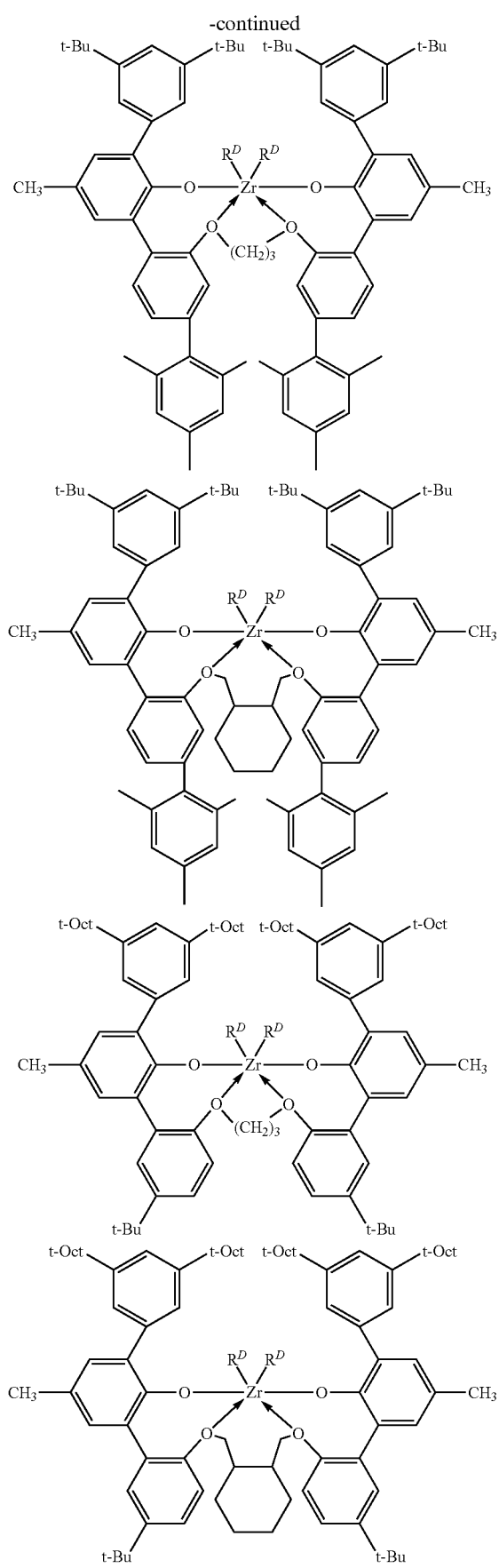
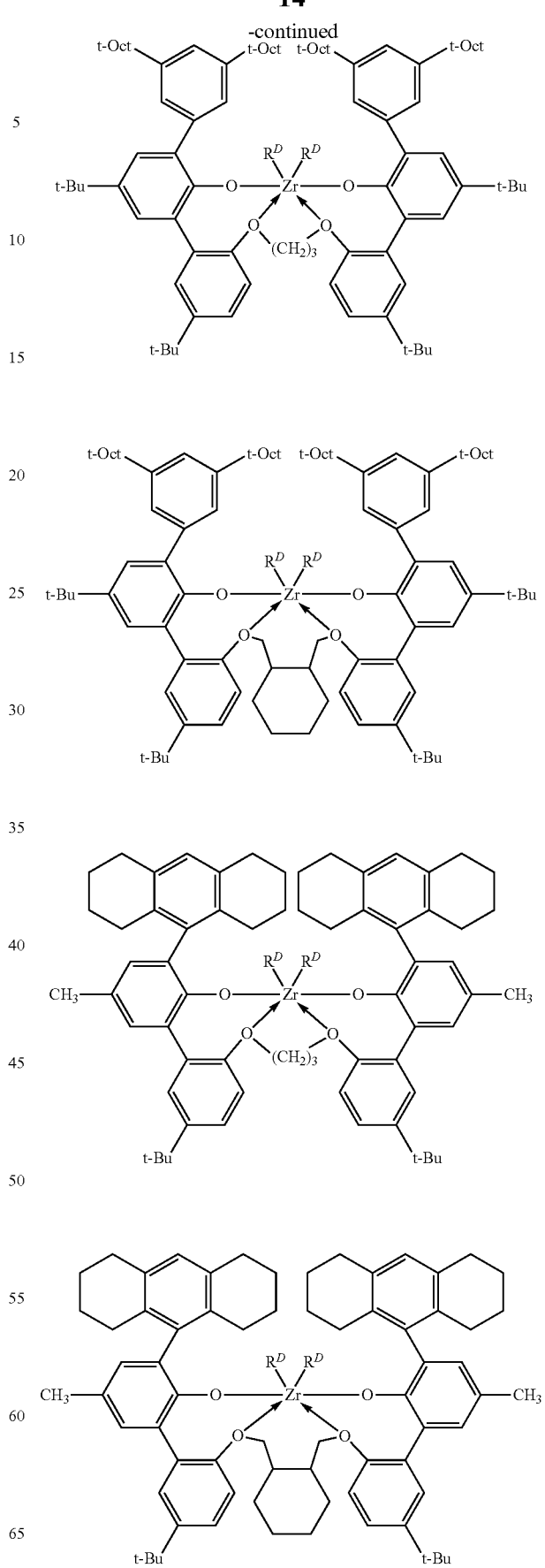

-continued
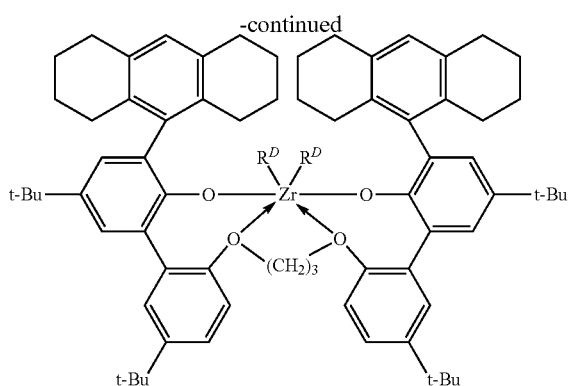
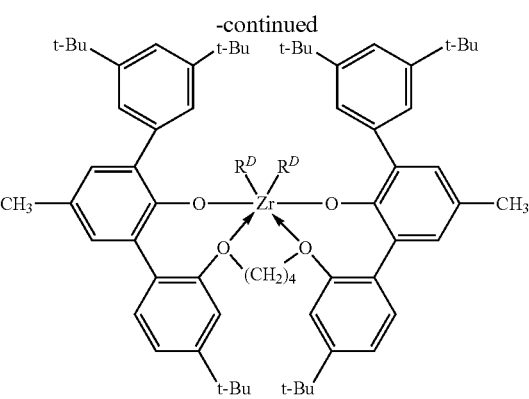
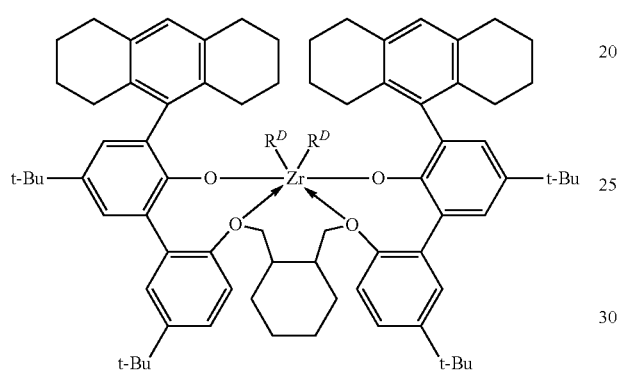
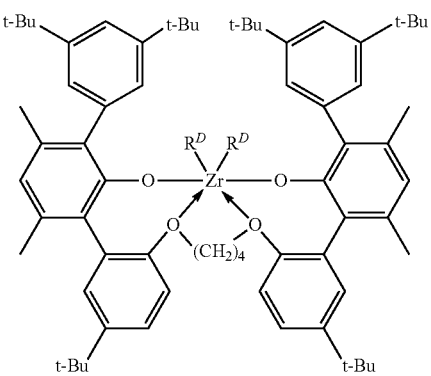
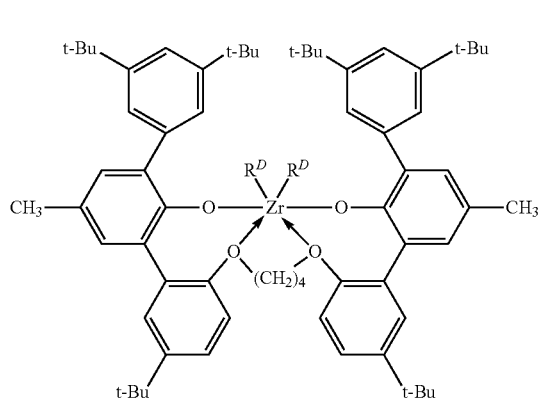
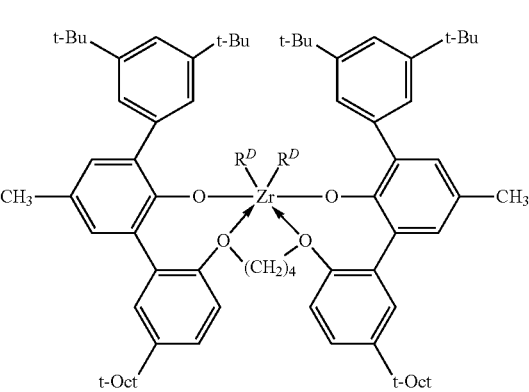
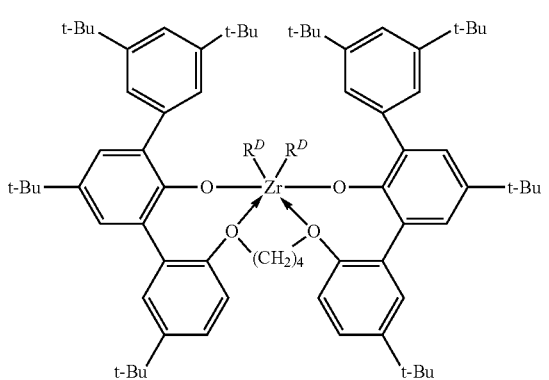
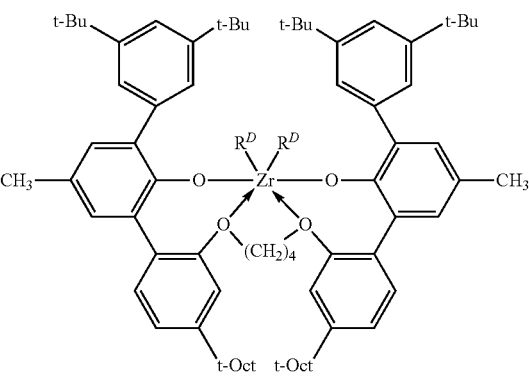

-continued

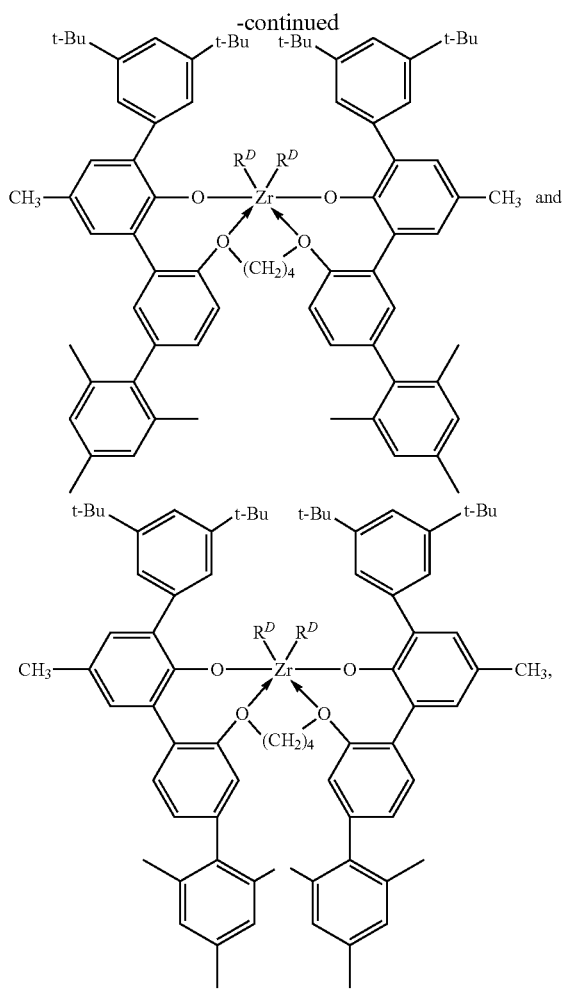

where $R^D$ independently each occurrence is chloride, methyl or benzyl.

Specific examples of suitable metal complexes are the following compounds:

A) bis((2-oxoyl-3-(3,5-bis-(1,1-dimethylethyl)phenyl)-5-methyl(phenyl)-4-(1,1-dimethylethyl)-2-phenoxy)propane-1,3-diyl zirconium (IV) dimethyl, bis((2-oxoyl-3-(3,5-bis-(1,1-dimethylethyl)phenyl)-5-methyl(phenyl)-4-(1,1-dimethylethyl)-2-phenoxy)propane-1,3-diyl zirconium (IV) dichloride, bis((2-oxoyl-3-(3,5-bis-(1,1-dimethylethyl)phenyl)-5-methyl(phenyl)-4-(1,1-dimethylethyl)-2-phenoxy)propane-1,3-diyl zirconium (IV) dibenzyl, bis((2-oxoyl-3-(3,5-bis-(1,1-dimethylethyl)phenyl)-5-methyl(phenyl)-4-(1,1-dimethylethyl)-2-phenoxy)methyl)cyclohexane-1,2-diyl zirconium (IV) dimethyl, bis((2-oxoyl-3-(3,5-bis-(1,1-dimethylethyl)phenyl)-5-methyl(phenyl)-4-(1,1-dimethylethyl)-2-phenoxy)methyl)cyclohexane-1,2-diyl zirconium (IV) dichloride, bis((2-oxoyl-3-(3,5-bis-(1,1-dimethylethyl)phenyl)-5-methyl(phenyl)-4-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-methyl(phenyl)-4-(1,1-dimethylethyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-methyl(phenyl)-4-(1,1-dimethylethyl)-2-phenoxy)methyl)cyclohex-4-ene-1,2-diyl zirconium (IV) dichloride, bis((2-oxoyl-3-(3,5-bis-(1,1-dimethylethyl)phenyl)-5-methyl(phenyl)-4-(1,1-dimethylethyl)-2-phenoxy)methyl)cyclohex-4-ene-1,2-diyl zirconium (IV) dibenzyl,
bis((2-oxoyl-3-(3,5-bis-(1,1-dimethylethyl)phenyl)-5-(1,1-dimethylethyl)(phenyl)-4-(1,1-dimethylethyl)-2-phenoxy)propane-1,3-diyl zirconium (IV) dimethyl, bis((2-oxoyl-3-(3,5-bis-(1,1-dimethylethyl)phenyl)-5-(1,1-dimethylethyl)(phenyl)-4-(1,1-dimethylethyl)-2-phenoxy)propane-1,3-diyl zirconium (IV) dichloride, bis((2-oxoyl-3-(3,5-bis-(1,1-dimethylethyl)phenyl)-5-(1,1-dimethylethyl)(phenyl)-4-(1,1-dimethylethyl)-2-phenoxy)propane-1,3-diyl zirconium (IV) dibenzyl, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohexane-1,2-diyl zirconium (IV) dimethyl, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohexane-1,2-diyl zirconium (IV) dichloride, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohex-4-ene-1,2-diyl zirconium (IV) dichloride, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohex-4-ene-1,2-diyl zirconium (IV) dibenzyl,
bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)propane-1,3-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)propane-1,3-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)propane-1,3-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohexane-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohexane-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dibenzyl, B) bis((2-oxoyl-3-(3,5-bis-(1,1-dimethylethyl)phenyl)-5-methyl(phenyl)-4-(2,4,4-trimethylpentan-2-yl)-2-phenoxy)propane-1,3-diyl zirconium (IV) dimethyl, bis((2-oxoyl-3-(3,5-bis-(1,1-dimethylethyl)phenyl)-5-methyl(phenyl)-4-(2,4,4-trimethylpentan-2-yl)-2-phenoxy)propane-1,3-diyl zirconium (IV) dichloride, bis((2-oxoyl-3-(3,5-bis-(1,1-dimethylethyl)phenyl)-5-methyl(phenyl)-

4-(2,4,4-trimethylpentan-2-yl)-2-phenoxy)propane-1,3-diyl zirconium (IV) dibenzyl, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohexane-1,2-diyl zirconium (IV) dimethyl, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(1,1-dimethylethyl)(phenyl)-4-(1-methyl-4,4-dimethylpen-2-yl-2-phenoxy)propane-1,3-diyl zirconium (IV) dimethyl, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)propane-1,3-diyl zirconium (IV) dichloride, bis((2-oxoyl-3-(3,5-bis-(1,1-dimethylethyl)phenyl)-5-(1,1-dimethylethyl)(phenyl)-4-(1-methyl-4,4-dimethylpen-2-yl-2-phenoxy)propane-1,3-diyl zirconium (IV) dibenzyl, bis((2-oxoyl-3-(3,5-bis-(1,1-dimethylethyl)phenyl)-5-(1,1-dimethylethyl)(phenyl)-4-(1-methyl-4,4-dimethylpen-2-yl-2-phenoxy)methyl)cyclohexane-1,2-diyl zirconium (IV) dimethyl, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)propane-1,3-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)propane-1,3-diyl zirconium (IV) dichloride, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)propane-1,3-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dibenzyl, C) bis((2-oxoyl-3-(3,5-bis-(1,1-dimethylethyl)phenyl)-5-methyl(phenyl)-4-(1-butyl)-2-phenoxy)propane-1,3-diyl zirconium (IV) dimethyl, bis((2-oxoyl-3-(3,5-bis-(1,1-dimethylethyl)phenyl)-5-methyl(phenyl)-4-(1-butyl)-2-phenoxy)propane-1,3-diyl zirconium (IV) dichloride, bis((2-oxoyl-3-(3,5-bis-(1,1-dimethylethyl)phenyl)-5-methyl(phenyl)-4-(1-butyl)-2-phenoxy)propane-1,3-diyl zirconium (IV) dibenzyl, bis((2-oxoyl-3-(3,5-bis-(1,1-dimethylethyl)phenyl)-5-methyl(phenyl)-4-(1-butyl)-2-phenoxy)methyl)cyclohexane-1,2-diyl zirconium (IV) dimethyl, bis((2-oxoyl-3-(3,5-bis-(1,1-dimethylethyl)phenyl)-5-methyl(phenyl)-4-(1-butyl)-2-phenoxy)methyl)cyclohexane-1,2-diyl zirconium (IV) dichloride, bis((2-oxoyl-3-(3,5-bis-(1,1-dimethylethyl)phenyl)-5-methyl(phenyl)-4-(1-butyl)-2-phenoxy)methyl)cyclohexane-1,2-diyl zirconium (IV) dibenzyl, bis((2-oxoyl-3-(3,5-bis-(1,1-dimethylethyl)phenyl)-5-methyl(phenyl)-4-(1-butyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-methyl(phenyl)-4-(1-butyl)-2-phenoxy)methyl)cyclohex-4-ene-1,2-diyl zirconium (IV) dichloride, bis((2-oxoyl-3-(3,5-bis-(1,1-dimethylethyl)phenyl)-5-methyl(phenyl)-4-(1-butyl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(1,1-dimethylethyl)(phenyl)-4-(1-butyl)-2-phenoxy)propane-1,3-diyl zirconium (IV) dimethyl, bis((2-oxoyl-3-(3,5-bis-(1,1-dimethylethyl)phenyl)-5-(1,1-dimethylethyl)(phenyl)-4-(1-butyl)-2-phenoxy)propane-1,3-diyl zirconium (IV) dichloride, bis((2-oxoyl-3-(3,5-bis-(1,1-dimethylethyl)phenyl)-5-(1,1-dimethylethyl)(phenyl)-4-(1-butyl)-2-phenoxy)propane-1,3-diyl zirconium (IV) dibenzyl, bis((2-oxoyl-3-(3,5-bis-(1,1-dimethylethyl)phenyl)-5-(1,1-dimethylethyl)(phenyl)-4-(1-butyl)-2-phenoxy)methyl)cyclohexane-1,2-diyl zirconium (IV) dimethyl, bis((2-oxoyl-3-(3,5-bis-(1,1-dimethylethyl)phenyl)-5-(1,1-dimethylethyl)(phenyl)-4-(1-butyl)-2-phenoxy)methyl)cyclohexane-1,2-diyl zirconium (IV) dichloride, bis((2-oxoyl-3-(3,5-bis-(1,1-dimethylethyl)phenyl)-5-(1,1-dimethylethyl)(phenyl)-4-(1-butyl)-2-phenoxy)methyl)cyclohexane-1,2-diyl zirconium (IV) dibenzyl, bis((2-oxoyl-3-(3,5-bis-(1,1-dimethylethyl)phenyl)-5-(1,1-dimethylethyl)(phenyl)-4-(1-butyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(1,1-dimethylethyl)(phenyl)-4-(1-butyl)-2-phenoxy)methyl)cyclohex-4-ene-1,2-diyl zirconium (IV) dichloride, bis((2-oxoyl-3-(3,5-bis-(1,1-dimethylethyl)phenyl)-5-(1,1-dimethylethyl)(phenyl)-4-(1-butyl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(1-butyl)-2-phenoxy)propane-1,3-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1-butyl)-2-phenoxy)propane-1,3-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1-butyl)-2-phenoxy)propane-1,3-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(1-butyl)-2-phenoxy)methyl)cyclohexane-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1-butyl)-2-phenoxy)methyl)cyclohexane-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1-butyl)-2-phenoxy)methyl)cyclohexane-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(1-butyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1-butyl)-2-phenoxy)methyl)cyclohex-4-ene-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1-butyl)-2-phenoxy)methyl)cyclohex-4-ene-1,2-diyl zirconium (IV) dibenzyl, D) bis((2-oxoyl-3-(3,5-bis-(1,1-dimethylethyl)phenyl)-5-methyl(phenyl)-5-(1,1-dimethylethyl)-2-phenoxy)propane-1,3-diyl zirconium (IV) dimethyl, bis((2-oxoyl-3-(3,5-bis-(1,1-dimethylethyl)phenyl)-5-methyl(phenyl)-5-(1,1-dimethylethyl)-2-phenoxy)propane-1,3-diyl zirconium (IV) dichloride, bis((2-oxoyl-3-(3,5-bis-(1,1-dimethylethyl)phenyl)-5-methyl(phenyl)-5-(1,1-dimethylethyl)-2-phenoxy)propane-1,3-diyl zirconium (IV) dibenzyl, bis((2-oxoyl-3-(3,5-bis-(1,1-dimethylethyl)phenyl)-5-methyl(phenyl)-5-(1,1-dimethylethyl)-2-phenoxy)methyl)cyclohexane-1,2-diyl zirconium (IV) dimethyl, bis((2-oxoyl-3-(3,5-bis-(1,1-dimethylethyl)phenyl)-5-methyl(phenyl)-5-(1,1-dimethylethyl)-2-phenoxy)methyl)cyclohexane-1,2-diyl zirconium (IV) dichloride, bis((2-oxoyl-3-(3,5-bis-(1,1-dimethylethyl)phenyl)-5-methyl(phenyl)-5-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-methyl(phenyl)-5-(1,1-dimethylethyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-methyl(phenyl)-5-(1,1-dimethylethyl)-2-phenoxy)methyl)cyclohex-4-ene-1,2-diyl zirconium (IV) dichloride, bis((2-oxoyl-3-(3,5-bis-(1,1-dimethylethyl)phenyl)-5-methyl(phenyl)-5-(1,1-dimethylethyl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(1,1-dimethylethyl)(phenyl)-5-(1,1-dimethylethyl)-2-phenoxy)propane-1,3-diyl zirconium (IV) dimethyl, bis((2-oxoyl-3-(3,5-bis-(1,1-dimethylethyl)phenyl)-5-(1,1-dimethylethyl)(phenyl)-5-(1,1-dimethylethyl)-2-phenoxy)propane-1,3-diyl zirconium (IV) dichloride, bis((2-oxoyl-3-(3,5-bis-(1,1-dimethylethyl)phenyl)-5-(1,1-dimethylethyl)(phenyl)-5-(1,1-dimethylethyl)-2-phenoxy)propane-1,3-diyl zirconium (IV) dibenzyl, bis((2-oxoyl-3-(3,5-bis-(1,1-dimethylethyl)phenyl)-5-(1,1-dimethylethyl)(phenyl)-5-(1,1-dimethylethyl)-2-phenoxy)methyl)cyclohexane-1,2-diyl zirconium (IV) dimethyl, bis((2-oxoyl-3-(3,5-bis-(1,1-dimethylethyl)phenyl)-5-(1,1-dimethylethyl)(phenyl)-5-(1,1-dimethylethyl)-2-phenoxy)methyl)cyclohexane-1,2-diyl zirconium (IV) dichloride, bis((2-oxoyl-3-(3,5-bis-(1,1-dimethylethyl)phenyl)-5-(1,1-dimethylethyl)(phenyl)-5-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-(1,1-dimethylethyl)(phenyl)-5-(1,1-dimethylethyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(1,1-dimethylethyl)(phenyl)-5-(1,1-dimethylethyl)-2-phenoxy)methyl)cyclohex-4-ene-1,2-diyl zirconium (IV) dichloride, bis((2-oxoyl-3-(3,5-bis-(1,1-dimethylethyl)phenyl)-5-(1,1-dimethylethyl)(phenyl)-5-(1,1-dimethylethyl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)propane-1,3-diyl zirconium (IV) dimethyl, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)propane-1,3-diyl zirconium (IV) dichloride, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)propane-1,3-diyl zirconium (IV) dibenzyl, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)methyl)cyclohexane-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)methyl)cyclohexane-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)methyl)cyclohex-4-ene-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)methyl)cyclohex-4-ene-1,2-diyl zirconium (IV) dibenzyl, E) bis((2-oxoyl-3-(3,5-bis-(2,4,4-trimethylpentan-2-yl)phenyl)-5-methyl(phenyl)-4-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-methyl(phenyl)-4-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-methyl(phenyl)-4-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-methyl(phenyl)-4-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-methyl(phenyl)-4-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-methyl(phenyl)-4-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-methyl(phenyl)-4-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-methyl(phenyl)-4-(1, 1-dimethylethyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-methyl(phenyl)-4-(1,1-dimethylethyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dibenzyl, F) bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)propane-1,3-diyl zirconium (IV) dimethyl, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)propane-1,3-diyl zirconium (IV) dichloride, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)propane-1,3-diyl zirconium (IV) dibenzyl, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1-methyl-4,4-dimethylpen-2-yl-2-phenoxy)propane-1,3-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)propane-1,3-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1-methyl-4,4-dimethylpen-2-yl-2-phenoxy)propane-1,3-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1-methyl-4,4-dimethylpen-2-yl-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)propane-1,3-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)propane-1,3-diyl zirconium (IV) dichloride, bis((2-oxoyl- 3-(3,5-bis-(2,4,4-trimethylpentan-2-yl)(phenyl)-5-(2,4,4-trimethylpentan-2-yl)(phenyl)-4-(2,4,4-trimethylpentan-2-yl)-2-phenoxy)propane-1,3-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dibenzyl, G) bis((2-oxoyl-3-(3,5-bis-(2,4,4-trimethylpentan-2-yl)phenyl)-5-methyl(phenyl)-4-(1-butyl)-2-phenoxy)propane-1,3-diyl zirconium (IV) dimethyl, bis((2-oxoyl-3-(3,5-bis-(2,4,4-trimethylpentan-2-yl)phenyl)-5-methyl(phenyl)-4-(1-butyl)-2-phenoxy)propane-1,3-diyl zirconium (IV) dichloride, bis((2-oxoyl-3-(3,5-bis-(2,4,4-trimethylpentan-2-yl)phenyl)-5-methyl(phenyl)-4-(1-butyl)-2-phenoxy)propane-1,3-diyl zirconium (IV) dibenzyl, bis((2-oxoyl-3-(3,5-bis-(2,4,4-trimethylpentan-2-yl)phenyl)-5-methyl(phenyl)-4-(1-butyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-methyl(phenyl)-4-(1-butyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-methyl(phenyl)-4-(1-butyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-methyl(phenyl)-4-(1-butyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-methyl(phenyl)-4-(1-butyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-methyl(phenyl)-4-(1-butyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1-butyl)-2-phenoxy)propane-1,3-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1-butyl)-2-phenoxy)propane-1,3-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1-butyl)-2-phenoxy)propane-1,3-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)propane-1,3-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)propane-1,3-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)propane-1,3-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohex-4-ene-1,2-diyl zirconium (IV) dibenzyl, H) bis((2-oxoyl-3-(3,5-bis-(2,4,4-trimethylpentan-2-yl)phenyl)-5-methyl(phenyl)-5-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-methyl(phenyl)-5-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-methyl(phenyl)-5-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohex-4-ene-1,2- diyl zirconium (IV) dibenzyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohex-4-ene-1,2-diyl zirconium (IV) dibenzyl,
bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohex-4-ene-1,2-diyl zirconium (IV) dichloride, and bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohex-4-ene-1,2-diyl zirconium (IV) dibenzyl.

The foregoing metal complexes may be conveniently prepared by standard metallation and ligand exchange procedures involving a source of the transition metal and a neutral polyfunctional ligand source. The techniques employed are the same as or analogous to those disclosed in U.S. Pat. No. 6,827,976 and US 2004/0010103, and elsewhere.

The metal complex is activated to form the active catalyst composition by combination with the cocatalyst. The activation may occur prior to addition of the catalyst composition to the reactor with or without the presence of other components of the reaction mixture, or in situ through separate addition of the metal complex and activating cocatalyst to the reactor.

Activation may take place in various ways to yield catalyst compounds having a vacant coordination site that will coordinate, insert, and polymerize addition polymerizable monomers, especially olefin(s). For the purposes of this patent specification and appended claims, the term "activator" or "cocatalyst" is defined to be any compound or component or method which can activate the metal complex in the foregoing manner. Non-limiting examples of suitable activators include Lewis acids, non-coordinating ionic activators, ionizing activators, organometal compounds, and combinations of the foregoing substances capable of converting the neutral metal complex to a catalytically active species. As used herein, the term "noncoordinating" means a substance (solvent, anion, cocatalyst or cocatalyst remnant) which either does not coordinate to the catalyst precursor and the active catalytic species derived therefrom, or which is only weakly coordinated to such complexes or species, thereby remaining sufficiently labile to be displaced by a neutral Lewis base, such as an olefin.

It is believed, without desiring to be bound by such belief, that in one embodiment of the invention, catalyst activation may involve formation of a cationic, partially cationic, or zwitterionic species, by means of proton transfer, oxidation, or other suitable activation process. It is to be understood that the present invention is operable and fully enabled regardless of whether or not such an identifiable cationic, partially cationic, or zwitterionic species actually results during the activation process, also interchangeably referred to herein as an "ionization" process or "ionic activation process".

Ionizing cocatalysts may contain an active proton, or some other cation associated with, but not coordinated to or only loosely coordinated to, an anion of the ionizing compound. Such compounds are described in European publications EP-A-570982, EP-A-520732, EP-A-495375, EP-A-500944, EP-A-277 003 and EP-A-277004, and U.S. Pat. Nos. 5,153,157, 5,198,401, 5,066,741, 5,206,197, 5,241,025, 5,384,299 and 5,502,124. Preferred among the foregoing activators are ammonium cation containing salts, especially those containing trihydrocarbyl-substituted ammonium cations containing one or two $C_{10-40}$ alkyl groups, especially methylbis(octadecyl)-ammonium- and methylbis(tetradecyl)-ammonium-cations and a non-coordinating anion, especially a tetrakis(perfluoro)arylborate anion, especially tetrakis(pentafluorophenyl)borate. It is further understood that the cation may comprise a mixture of hydrocarbyl groups of differing lengths. For example, the protonated ammonium cation derived from the commercially available long-chain amine comprising a mixture of two $C_{14}$, $C_{16}$ or $C_{18}$ alkyl groups and one methyl group. Such amines are available from Chemtura Corp., under the trade name Kemamine™ T9701, and from Akzo-Nobel under the trade name Armeen™ M2HT. A most preferred ammonium salt activator is methyldi($C_{14-20}$alkyl)ammonium tetrakis(pentafluorophenyl)borate.

Activation methods using ionizing ionic compounds not containing an active proton but capable of forming active catalyst compositions, such as ferrocenium salts of the foregoing non-coordinating anions are also contemplated for use herein, and are described in EP-A-426637, EP-A-573403 and U.S. Pat. No. 5,387,568. Also included is the use of strong Lewis acids, especially tris(perfluoro)aryl borane compounds, such as tris(pentafluorophenyl)borane, which are capable of abstraction of a ligand groups, especially a hydrocarbyl ligand, thereby forming a non-coordinating counter anion for the cationic derivative of the metal complex.

A class of cocatalysts comprising non-coordinating anions generically referred to as expanded anions, further disclosed in U.S. Pat. No. 6,395,671, may be suitably employed to activate the metal complexes of the present invention for olefin polymerization. Generally, these cocatalysts (illustrated by those having imidazolide, substituted imidazolide, imidazolinide, substituted imidazolinide, benzimidazolide, or substituted benzimidazolide anions) may be depicted as follows:

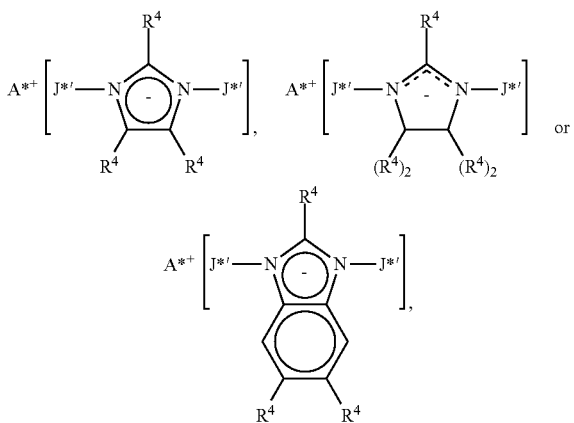

wherein:

$A^{*+}$ is a cation, especially a proton containing cation, and preferably is a trihydrocarbyl ammonium cation containing one or two $C_{10-40}$ alkyl groups, especially a methyldi($C_{14-20}$alkyl)ammonium-cation, $R^4$, independently each occurrence, is hydrogen or a halo, hydrocarbyl, halocarbyl, halohydrocarbyl, silylhydrocarbyl, or silyl, (including mono-, di- and tri(hydrocarbyl)silyl) group of up to 30 atoms not counting hydrogen, preferably $C_{1-20}$ alkyl, and $J^{*'}$ is tris(pentafluorophenyl)borane or tris(pentafluorophenyl)alumane).

Examples of these catalyst activators include trihydrocarbylammonium-salts, especially, methyldi($C_{14-20}$alkyl)ammonium-salts of:
bis(tris(pentafluorophenyl)borane)imidazolide, bis(tris(pentafluorophenyl)borane)-2-undecylimidazolide, bis(tris(pentafluorophenyl)borane)-2-heptadecylimidazolide, bis(tris(pentafluorophenyl)borane)-4,5-bis(undecyl)imidazolide, bis(tris(pentafluorophenyl)borane)-4,5-bis(heptadecyl)imidazolide, bis(tris(pentafluorophenyl)borane)imidazolinide, bis(tris(pentafluorophenyl)borane)-2-undecylimidazolinide, bis(tris(pentafluorophenyl)borane)-2-heptadecylimidazolinide, bis(tris(pentafluorophenyl)borane)-4,5-bis(undecyl)imidazolinide, bis(tris(pentafluorophenyl)borane)-4,5-bis(heptadecyl)imidazolinide, bis(tris(pentafluorophenyl)borane)-5,6-dimethylbenzimidazolide, bis(tris(pentafluorophenyl)borane)-5,6-bis(undecyl)benzimidazolide, bis(tris(pentafluorophenyl)alumane)imidazolide, bis(tris(pentafluorophenyl)alumane)-2-undecylimidazolide, bis(tris(pentafluorophenyl)alumane)-2-heptadecylimidazolide, bis(tris(pentafluorophenyl)alumane)-4,5-bis(undecyl)imidazolide, bis(tris(pentafluorophenyl)alumane)-4,5-bis(heptadecyl)imidazolide, bis(tris(pentafluorophenyl)alumane)imidazolinide, bis(tris(pentafluorophenyl)alumane)-2-undecylimidazolinide, bis(tris(pentafluorophenyl)alumane)-2-heptadecylimidazolinide, bis(tris(pentafluorophenyl)alumane)-4,5-bis(undecyl)imidazolinide, bis(tris(pentafluorophenyl)alumane)-4,5-bis(heptadecyl)imidazolinide, bis(tris(pentafluorophenyl)alumane)-5,6-dimethylbenzimidazolide, and bis(tris(pentafluorophenyl)alumane)-5,6-bis(undecyl)benzimidazolide.

Other activators include those described in PCT publication WO 98/07515 such as tris (2,2',2"-nonafluorobiphenyl) fluoroaluminate. Combinations of activators are also contemplated by the invention, for example, alumoxanes and ionizing activators in combinations, see for example, EP-A-0 573120, PCT publications WO 94/07928 and WO 95/14044 and U.S. Pat. Nos. 5,153,157 and 5,453,410. WO 98/09996 describes activating catalyst compounds with perchlorates, periodates and iodates, including their hydrates. WO 99/18135 describes the use of organoboroaluminum activators. EP-A-781299 describes using a silylium salt in combination with a non-coordinating compatible anion. Other activators or methods for activating a catalyst compound are described in for example, U.S. Pat. Nos. 5,849,852, 5,859, 653, 5,869,723, EP-A-615981, and PCT publication WO 98/32775.

Another suitable class of organometal activators or cocatalysts are alumoxanes, also referred to as alkylaluminoxanes. Alumoxanes are well known activators for use with metallocene type catalyst compounds to prepare addition polymerization catalysts. There are a variety of methods for preparing alumoxanes and modified alumoxanes, non-limiting examples of which are described in U.S. Pat. Nos. 4,665,208, 4,952,540, 5,091,352, 5,206,199, 5,204,419, 4,874,734, 4,924, 018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451 5,744,656; European publications EP-A-561476, EP-A-279586 and EP-A-594218; and PCT publication WO 94/10180. Preferred alumoxanes are Lewis acid modified alumoxanes, especially tri($C_{3-6}$)alkylaluminum modified methylalumoxane, including tri(isobutyl)aluminum modified methalumoxane, available commercially as MMAO-3A or tri(n-octyl)aluminum modified methalumoxane, available commercially as MMAO-12, from Akzo Nobel, Inc.

It is within the scope of this invention to use alumoxane(s) or modified alumoxane(s) as an activator or as a tertiary component in the invented process. That is, the compound may be used alone or in combination with other activators, either neutral or ionic, such as tri(alkyl)ammonium tetrakis (pentafluorophenyl)borate compounds, trisperfluoroaryl compounds, polyhalogenated heteroborane anions as disclosed in WO 98/43983, and combinations thereof. When used as a tertiary component, the amount of alumoxane employed is generally less than that necessary to effectively activate the metal complex when employed alone. In this embodiment, it is believed, without wishing to be bound by such belief, that the alumoxane does not contribute significantly to actual catalyst activation. Not withstanding the foregoing, it is to be understood that some participation of the alumoxane in the activation process is not necessarily excluded.

Suitable alumoxanes include polymeric or oligomeric alumoxanes, especially methylalumoxane (MAO) as well as Lewis acid-modified alumoxanes, especially trihydrocarbylaluminum-, halogenated tri(hydrocarbyl)aluminum- or halogenated tri(hydrocarbyl)boron-modified alumoxanes, having from 1 to 10 carbons in each hydrocarbyl or halogenated hydrocarbyl group. Such activating cocatalysts are previously disclosed in U.S. Pat. Nos. 6,214,760, 6,160,146, 6,140,521, and 6,696,379, and elsewhere. Preferred Lewis acid-modified alumoxane compounds are tri(i-butyl)aluminum-modified methalumoxane and tri(n-octyl)aluminum-modified methalumoxane containing from 10 to 30, preferably 15 to 25 mole percent i-butyl content and 10 to 20, preferably 12 to 18 mole percent n-octyl contents, respectively, said molar percents based on total alkyl ligand content. The alumoxane or Lewis acid-modified alumoxane activator is preferably utilized in molar ratios cocatalyst:catalyst from 20-200, more preferably from 20-150, and most preferably from 20-80.

Because of the ability to be activated at relatively low levels of alumoxane or Lewis acid modified alumoxane cocatalysts while maintaining high catalyst efficiency, the present zirconium complexes can achieve reduced levels of cocatalyst byproducts in the resulting polymer along with long chain branch formation in the resulting polymer. Such polymers are especially suited for use in demanding applications such as those requiring high clarity or low dielectric constant.

Monomers

Suitable olefin mixtures for use herein include mixtures of ethylene with one or more $C_{3-8}$ α-olefin comonomers, and optionally one or more conjugated or non-conjugated dienes. Preferred comonomers include, but are not limited to, propylene, isobutylene, 1-butene, 1-pentene, 1-hexene, 4-methyl-1-pentene, 3-methyl-1-butene, 3-methyl-1-pentene, 4-methyl-1-pentene, and 1-octene.

Suitable conjugated or non-conjugated dienes include straight chain-, branched chain- or cyclic-hydrocarbon dienes having from 4 to 15 carbon atoms. Examples include, but are not limited to, 1,3-butadiene, 1,3-pentadiene, 1,3-hexadiene, 1,4-hexadiene, dicyclopentadiene, norbornadiene, ethylidenenorbornene, and mixtures thereof. The most preferred diene is 5-ethylidene-2-norbornene (ENB).

In general, the polymerization may be accomplished at conditions well known in the prior art for olefin solution polymerization reactions. Preferred polymerization temperatures are dependent upon the comonomer content of the resulting polymer. For polymers of densities ranging from 0.855 to 0.885 g/cc, the preferred temperatures range from 120-250° C., more preferably from 150-220° C. For polymers of densities ranging from 0.885 to 0.955 g/cc, the preferred temperatures range from 150-250° C., more preferably from 180-250° C. Preferred polymerization pressures are from atmospheric to 3000 atmospheres (100 kPa to 300 MPa), more preferably from 1 MPa to 10 MPa. In most polymerization reactions the molar ratio of catalyst:polymerizable compound employed is from $10^{-12}$:1 to $10^{-1}$:1, more preferably from $10^{-11}$:1 to $10^{-5}$:1. Highly desirably, the reaction is conducted under continuous, solution polymerization conditions, that is, conditions wherein the monomer or monomers are continuously added to a reactor operating under solution polymerization conditions, and polymerized product is continuously or semi-continuously removed and recovered or forwarded to a second reactor.

Desirably, the polymerization mixture comprises an aliphatic or alicyclic liquid diluent. Examples of such aliphatic or alicyclic liquid diluents include straight and branched-chain hydrocarbons such as isobutane, butane, pentane, hexane, heptane, octane, and mixtures thereof; alicyclic hydrocarbons such as cyclohexane, cycloheptane, methylcyclohexane, methylcyclo-heptane, and mixtures thereof; and perfluorinated hydrocarbons such as perfluorinated $C_{4-10}$ alkanes, and the like. Small quantities of aromatic hydrocarbons such as toluene, ethylbenzene or xylene may be included as well, but are not preferred. Mixtures of the foregoing are also suitable. A preferred liquid diluent is a hydrogenated oligomeric aliphatic hydrocarbon mixture having a distillation, ASTM D 86, IBP of 118° C., distillation, ASTM D 86, Dry Point of 137° C., and Specific Gravity, 15.6° C., ASTM D 1250 of 0.72 sold commercially under the trade designation Isopar™ E, available from ExxonMobil Corporation.

The use of molecular weight control agents or chain transfer agents in the present process is desired. Examples of such molecular weight control agents include hydrogen, trialkyl aluminum compounds, or other known chain transfer agents. Hydrogen is a most preferred molecular weight control agent or chain transfer agent. A particular benefit of the use of the present invention is the ability (depending on reaction conditions) to produce narrow molecular weight distribution ethylene/α-olefin interpolymers. Such narrow molecular weight distribution polymer products are highly desirable due to improved tensile strength properties as well as reduced levels of extractables and metal values.

Without limiting in any way the scope of the invention, one means for carrying out the present polymerization process is as follows. In a stirred-tank reactor, the monomers to be polymerized are introduced continuously together with any solvent or diluent. The reactor contains a liquid phase composed substantially of monomers together with any solvent or diluent and dissolved polymer. Catalyst along with cocatalyst and optionally chain transfer agent are continuously or intermittently introduced in the reactor liquid phase or any recycled portion thereof. The reactor temperature may be controlled by adjusting the solvent/monomer ratio, the catalyst addition rate, as well as by use of cooling or heating coils, jackets or both. The polymerization rate is controlled by the rate of catalyst addition. Pressure is controlled by the monomer flow rate and partial pressures of volatile components. The ethylene content of the polymer product is determined by the ratio of ethylene to comonomer in the reactor, which is controlled by manipulating the respective feed rates of these components to the reactor. The polymer product molecular weight is controlled, optionally, by controlling other polymerization variables such as the temperature, monomer concentration, or by the flow rate of the previously mentioned chain transfer agent. Upon exiting the reactor, the effluent is contacted with a catalyst kill agent such as water, steam or an alcohol. The polymer solution is optionally heated, and the polymer product is recovered by flashing off gaseous monomers as well as residual solvent or diluent at reduced pressure, and, if necessary, conducting further devolatilization in equipment such as a devolatilizing extruder. In a continuous process, the mean residence time of the catalyst and polymer in the reactor generally is from 5 minutes to 8 hours, and preferably from 10 minutes to 6 hours.

Alternatively, the foregoing polymerization may be carried out in a continuous loop reactor with or without a monomer, comonomer, catalyst or cocatalyst gradient established between differing regions thereof, optionally accompanied by separate addition of catalysts and/or chain transfer agent, and operating under adiabatic or non-adiabatic solution polymerization conditions or combinations of the foregoing reactor conditions. Examples of suitable loop reactors and a variety of suitable operating conditions for use therewith are found in U.S. Pat. Nos. 5,977,251, 6,319,989 and 6,683,149.

Multiple reactor polymerization processes are suitably employed in the present invention. Examples include such systems as are disclosed in U.S. Pat. No. 3,914,342, among others. The multiple reactors can be operated in series or in parallel, with at least one catalyst composition according to the present invention employed in at least one of the reactors. One or both reactors may also contain at least two catalysts which have different comonomer incorporation capability and/or different molecular weight capability. In one embodiment, a relatively high molecular weight product ($M_w$ from 100,000 to over 1,000,000, more preferably 200,000 to 500,000) is formed while in the second reactor a product of a relatively low molecular weight ($M_w$ 2,000 to 300,000) is formed. Both of these reactor products can have similar or different densities. The final product is a mixture of the two reactor effluents which are combined prior to devolatilization to result in a uniform mixing of the two polymer products. In another embodiment, the molecular weight of the products from both reactors is nearly the same but the densities vary to the extent that one of the reactors produces a polymer with density in the range of 0.865-0.895, while the other reactor produces polymer with a different density in the range of 0.885-0.950. Such a dual reactor/dual catalyst process allows for the preparation of products with tailored properties. In one embodiment, the reactors are connected in series, that is, the effluent from the first reactor is charged to the second reactor and fresh monomer, solvent and hydrogen is optionally added to the second reactor. Reactor conditions are adjusted such that the weight ratio of polymer produced in the first reactor to that produced in the second reactor is ideally in the range from 20:80 to 80:20. It will be appreciated by the skilled artisan that the foregoing dual reactor process is capable of producing polymers having broadened molecular weight distribution or polydispersity index (PDI). Preferred polymers made in the foregoing manner have PDI from 2.8 to 6.0, more preferably from 3.0 to 5.0. In addition, in a desirable embodiment, the high molecular weight component contains higher quantities of comonomer (lower density) than the low molecular weight component.

In yet another embodiment, one of the reactors in the polymerization process, including the first of two reactors operating in series, contains a heterogeneous Ziegler-Natta catalyst or a chromium containing catalyst, such as one of the numerous such catalysts known in the art. Examples of Ziegler-Natta catalysts include, but are not limited to, titanium-based catalysts supported on $MgCl_2$, and additionally comprise compounds of aluminum containing at least one aluminum-alkyl bond. Suitable Ziegler-Natty catalysts and their preparation include, but are not limited to, those disclosed in U.S. Pat. Nos. 4,612,300, 4,330,646, and 5,869,575. Suitable chromium based catalysts are those disclosed in U.S. Pat. Nos. 4,981,927, 4,835,219, 4,564,660, 4,173,548, 3,953,413, and elsewhere.

Single reactor, multiple catalyst processes are also useful in the present invention. In one embodiment, two or more catalysts are introduced into a single reactor at the reaction conditions that are herein disclosed, wherein each catalyst inherently produces different polyolefin copolymers. In one embodiment, a relatively high molecular weight product ($M_w$ from 100,000 to over 1,000,000, more preferably 200,000 to 500,000) is formed from one catalyst while a product of a relatively low molecular weight ($M_w$ 2,000 to 300,000) is formed from the other catalyst. Both of these catalyst compositions can have similar or different comonomer incorporation ability. The resulting polymer will have properties dependant on the ratio of the two catalysts that are employed in the single reactor. If a shuttling agent is employed, multi-block copolymers comprising polymer segments of differing composition and physical properties may be prepared in one or more reactors. Suitable combinations of polymer molecular weight, comonomer incorporation ability, processes, and ratios of catalysts for such products are disclosed in U.S. Pat. No. 6,924,342, WO2005/090425, WO2005/090426, and WO2005/090427. Due to the unique compatibility of the present catalyst compositions with other olefin polymerization catalysts, including Ziegler/Natta catalysts, the second catalyst composition may comprise a metal complex as herein disclosed, a metallocene or other π-bonded ligand group containing metal complex (including constrained geometry metal complexes), or a polyvalent heteroatom ligand group containing metal complex, especially polyvalent pyridylamine or imidizolylamine based complexes and tetradendate oxygen-ligated biphenylphenol based Group 4 metal complexes different from the present complexes.

Specific Embodiments

The following embodiments are provided for purposes of specific disclosure for the appended claims.

1. A process for polymerization of ethylene and one or more $C_{3-30}$ α-olefins or diolefins under continuous, solution polymerization conditions to prepare a high molecular weight polymer, said process comprising conducting the polymerization in the presence of a catalyst composition comprising a zirconium or hafnium complex of a polyvalent aryloxyether characterized in that the polymers have molecular weight distribution ($M_w/M_n$) less than or equal to 3.0, preferably less than or equal to 2.7 and most preferably less than or equal to 2.4, comonomer contents giving polymer densities from 0.850 to 0.950, more preferably from 0.860 to 0.930, and most preferably from 0.865 to 0.920, and $I_{10}/I_2 \leq 10$, more preferably $I_{10}/I_2$ from 6.0 to 10.0.

2. A process according to embodiment 1 wherein the polymer has $I_{10}$ and $I_2$ properties satisfying the equation $I_{10}/I_2 \leq 10.32(MI)^{-0.0814}$ for $I_{10}/I_2$ values ranging from 0.01 to 50, preferably from 0.1 to 30, and most preferably from 0.3 to 10.

3. A process according to embodiment 1 consisting essentially of copolymerized ethylene and 1-octene.

4. A process according to embodiment 1 operating at an ethylene conversion of 85 percent or greater.

5. A process for polymerization of ethylene and one or more $C_{3-30}$ α-olefins or diolefins under continuous, solution polymerization conditions to prepare a high molecular weight polymer, said process comprising conducting the polymerization in the presence of a catalyst composition comprising a zirconium complex of a polyvalent aryloxyether corresponding to the formula:

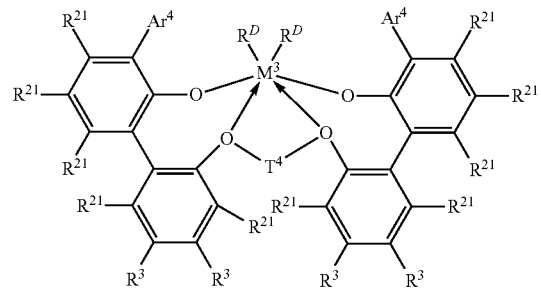

where $M^3$ is Hf or Zr, preferably Zr;

$Ar^4$ independently each occurrence is a substituted $C_{9-20}$ aryl group, wherein the substituents, independently each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached;

$T^4$ independently each occurrence is a $C_{2-20}$ alkylene, cycloalkylene or cycloalkenylene group, or an inertly substituted derivative thereof;

$R^{21}$ independently each occurrence is hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ independently each occurrence is hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$, independently each occurrence is halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group.

6. A process according to embodiment 1 wherein the metal complex corresponds to the formula:

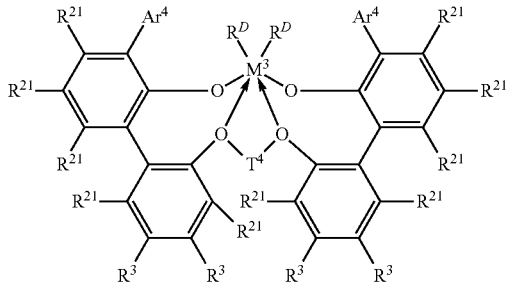

where $M^3$ is Hf or Zr, preferably Zr;

$Ar^4$ independently each occurrence is a substituted $C_{9-20}$ aryl group, wherein the substituents, independently each occurrence, are selected from the group consisting of alkyl; cycloalkyl; and aryl groups; and halo-, trihydrocarbylsilyl- and halohydrocarbyl-substituted derivatives thereof, with the proviso that the substituent must lack co-planarity with the aryl group to which it is attached;

$T^4$ independently each occurrence is a $C_{2-20}$ alkylene, cycloalkylene or cycloalkenylene group, or an inertly substituted derivative thereof;

$R^{21}$ independently each occurrence is hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ independently each occurrence is hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring or an $R^3$ and an $R^{21}$ group on the same or different arylene ring together form a divalent ligand group attached to the arylene group in two positions or join two different arylene rings together; and $R^D$, independently each occurrence is halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group.

7. The process of embodiment 5 or 6 wherein each $Ar^4$ group is substituted with at least one sterically bulky group, and preferably two sterically bulky groups, and at least two $R^3$ groups located on different aryleneoxy groups are sterically bulky.

8. The process of embodiment 7 wherein each $Ar^4$ group corresponds to the formula:

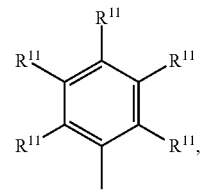

wherein $R^{11}$ independently each occurrence is hydrogen, halo, hydrocarbyl, trihydrocarbylsilyl, trihydrocarbylsilylhydrocarbyl, alkoxy or di(hydrocarbyl)amino of up to 50 atoms not counting hydrogen, or two $R^{11}$ groups together are part of a ring attached to the aryl group in two positions, with the proviso that in at least one occurrence $R^{11}$ or the divalent derivative of two such $R^{11}$ groups, is sterically bulky.

9. The process of embodiment 8 wherein the sterically bulky $R^{11}$ and $R^3$ substituents are independently selected from the group consisting of tertiary alkyl-, cycloalkyl-, aryl, trihydrocarbylsilyl-, tri(hydrocarbyl)silylhydrocarbyl-, and tri(hydrocarbyl)phenyl-groups having from 3 to 20 nonhydrogen atoms.

10. The process of embodiment 9 wherein the sterically bulky $R^{11}$ and $R^3$ substituents are independently selected from the group consisting of: tert-butyl, sec-butyl, tert-octyl (2,4,4-trimethylpentan-2-yl), 1-phenylethyl, 2,3-dimethylbut-2-yl, trityl (triphenylmethyl), cumyl (2-phenylprop-2-yl), tert-amyl (1,1-dimethylpropyl), phenyl, cyclohexyl, trimethylsilyl, trimethylsilylmethyl, isopropyl, 2,4,6-trimethylphenyl, 2,6-dimethylphenyl, 3,5-di(isopropyl)phenyl, and 3,5-di(t-butyl)phenyl.

11. The process of embodiment 6, wherein the metal complex corresponds to the formula:

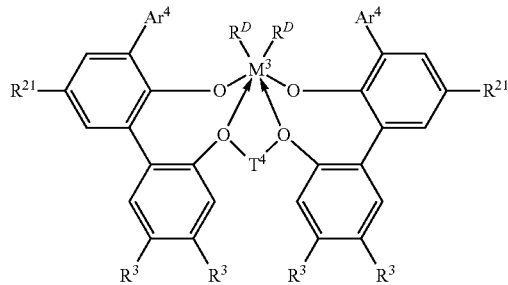

where $M^3$ is Zr;

$Ar^4$ is 3,5-di(tert-butyl)phenyl, 3,5-di(isopropyl)phenyl, 3,5-di(isobutyl)phenyl, 3,5-di(tert-octyl)phenyl, 3,5-di(2,4,6-trimethylphenyl)phenyl, 3,5-di(2,6-dimethylphenyl)phenyl, 3,5-di(2,4,6-tri-isopropylphenyl)phenyl, 3,5-di(3,5-di-tert-butylphenyl)phenyl, 1,2,3,4,6,7,8,9-octahydroanthracen-5-yl, 3,6-di(tert-butyl)-9H-carbazol-9-yl, 3,6-di(tert-octyl)-9H-carbazol-9-yl;

$R^{21}$ independently each occurrence is methyl or tert-butyl;

$R^3$ independently each occurrence is branched alkyl, cycloalkyl, substituted aryl, or other sterically bulky group;

$T^4$ is propan-1,3-diyl, butan-1,4-diyl, cyclohexane-1,2-diyl or cyclohexane-1,2-dimethylene; and $R^D$, independently each occurrence is halo or a hydrocarbyl or trihydrocarbylsilyl group of up to 20 atoms not counting hydrogen, or 2 $R^D$ groups together are hydrocarbylene, hydrocarbadiyl, 1,4-dihydrocarbyl-substituted 1,3-butadiene, or a poly(hydrocarbyl)silylene group.

12. The process of embodiment 11 wherein at least one $R^{11}$ group on each $Ar^4$ ring, most preferably 2 such $R^{11}$ groups in the 3 and 5 positions of an $Ar^4$ phenyl ring, and at least two $R^3$ group on different arylene rings are branched alkyl, cycloalkyl, hydrocarbyl-substituted aryl, or poly(hydrocarbyl)-substituted silyl groups, containing from 3 to 20 carbons, preferably from 4 to 12 carbons.

13. The process of embodiment 12 wherein two $R^{11}$ groups on each $Ar^4$ ring, and two $R^3$ groups on different arylene rings are tert-butyl or tert-octyl.

14. The process of embodiment 11 wherein the metal complex is selected from the group consisting of:

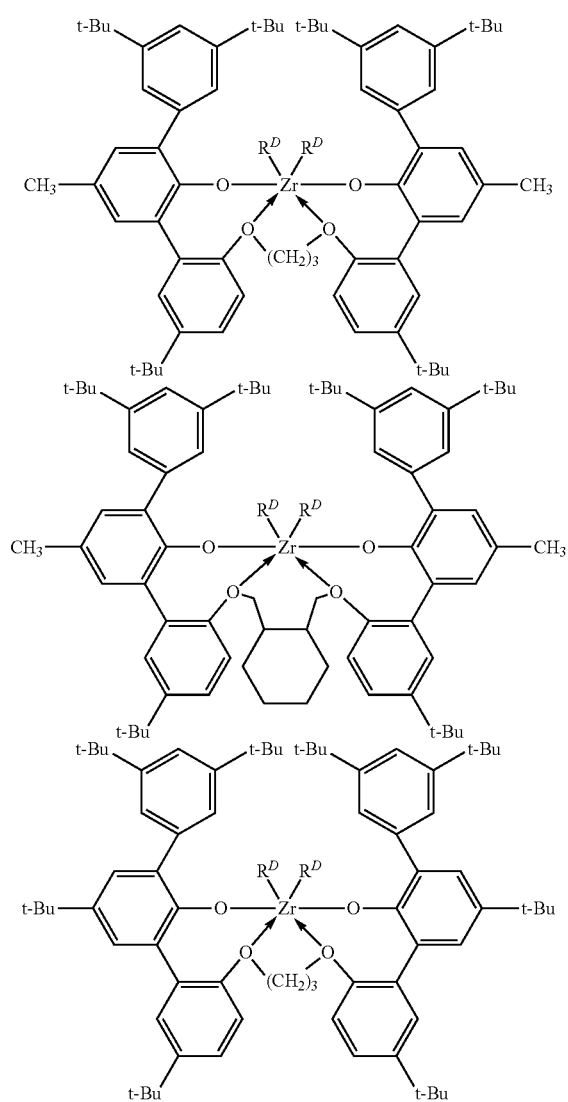

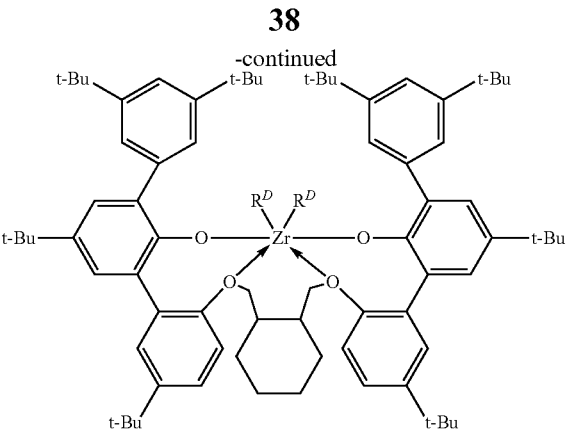

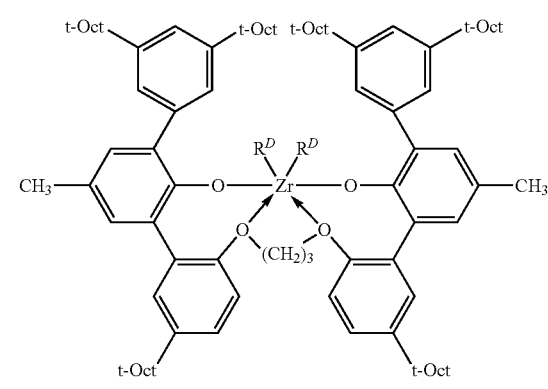

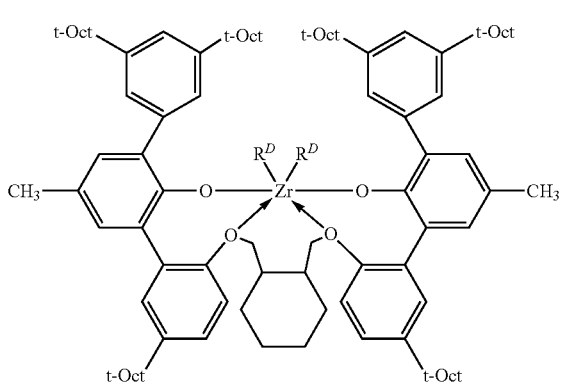

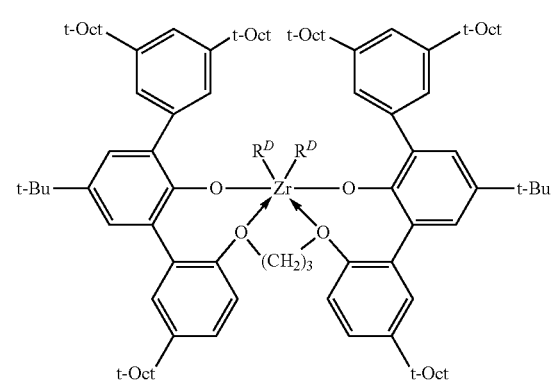

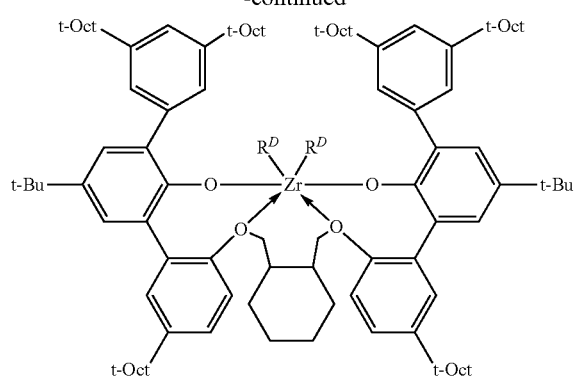
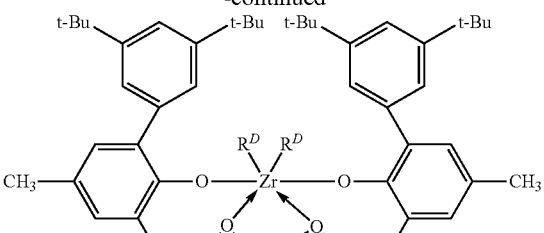
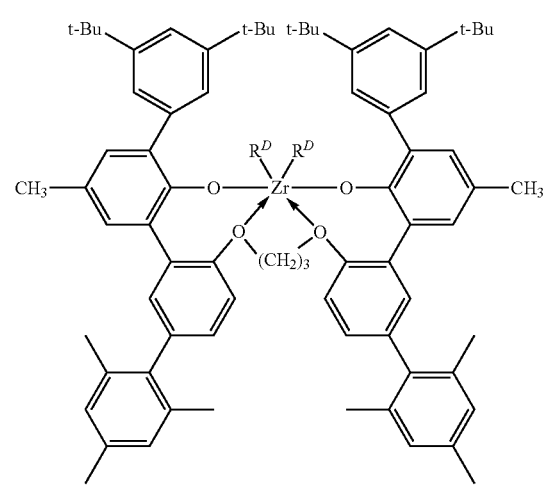
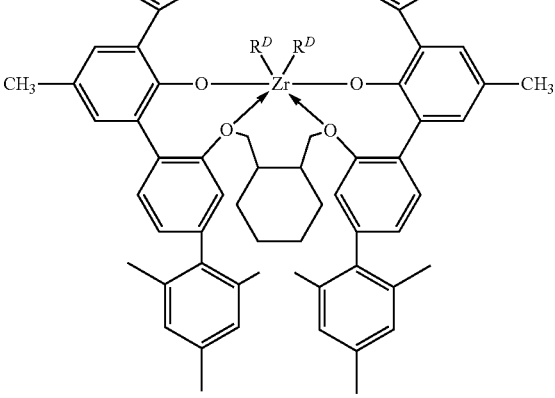
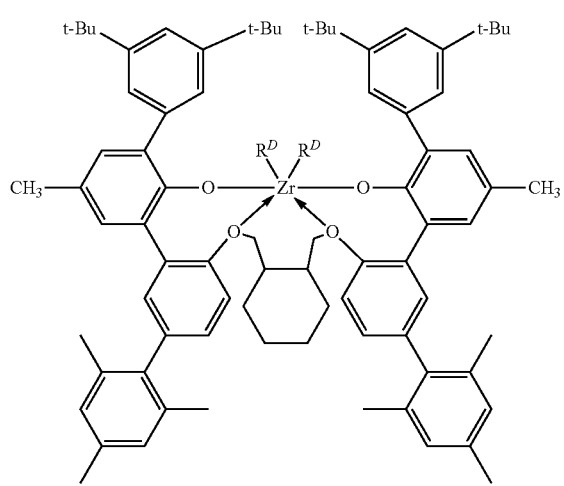
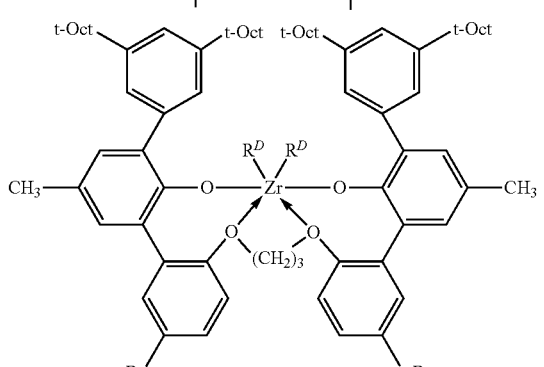
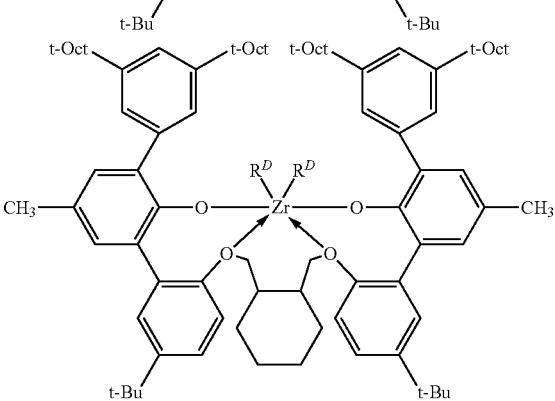

-continued
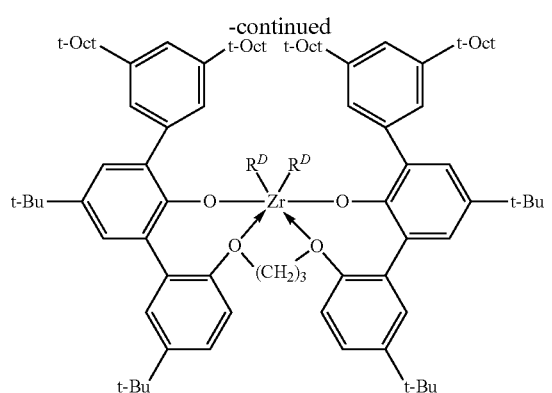
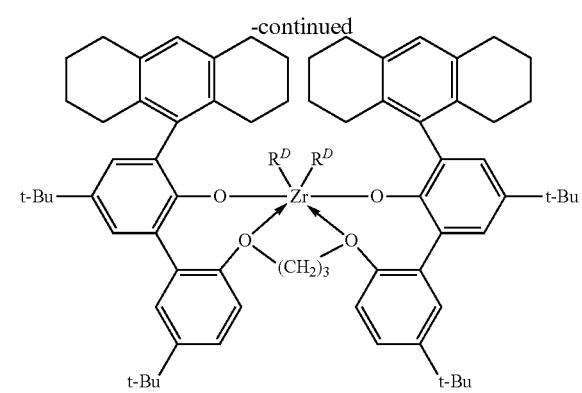
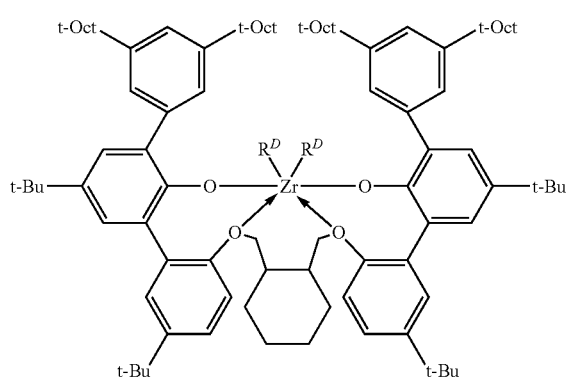
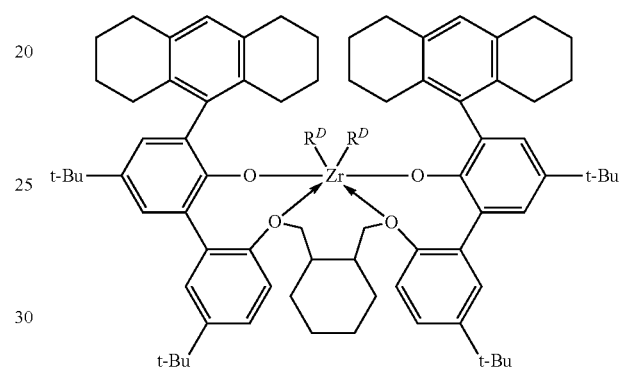
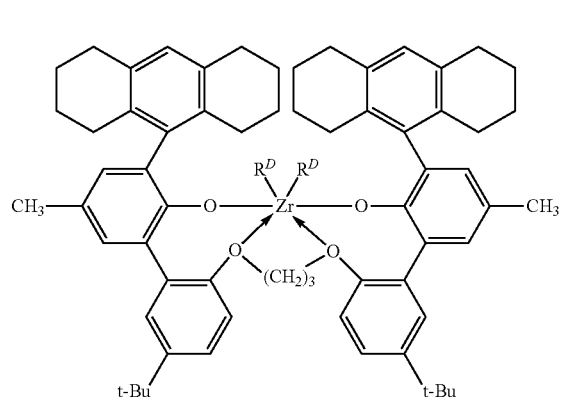
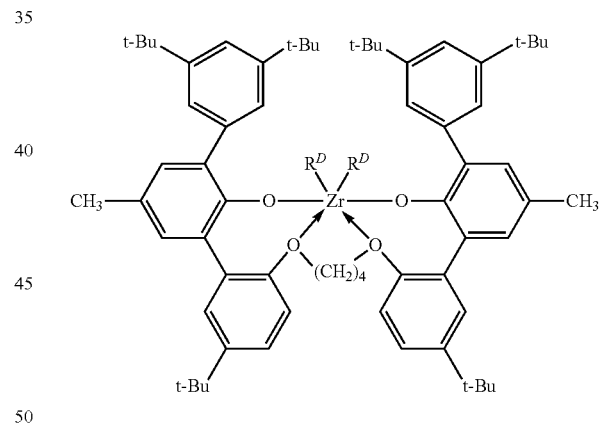
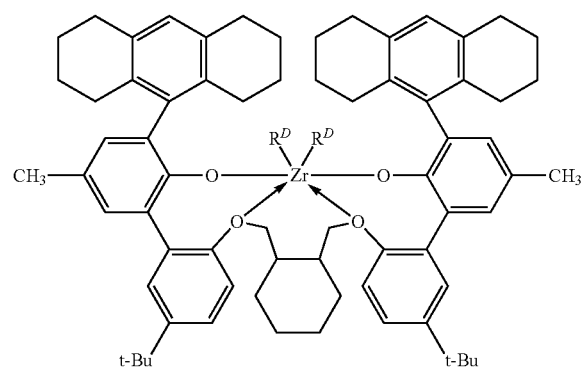
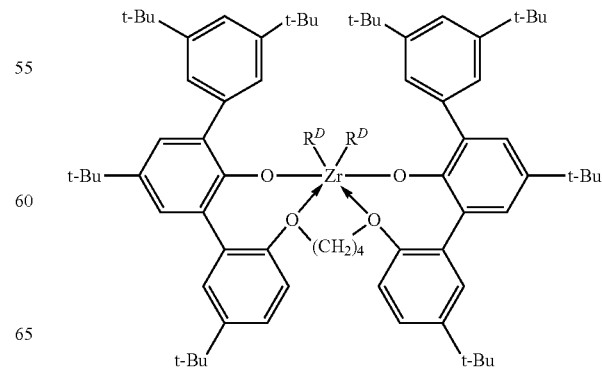

-continued

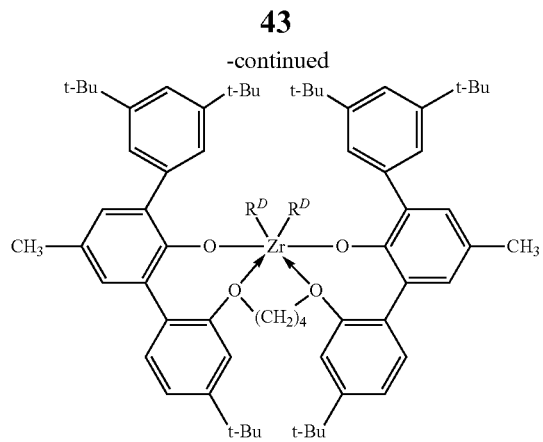

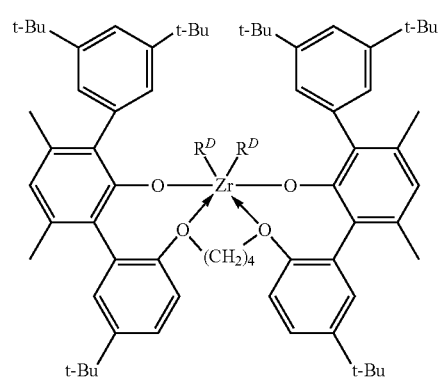

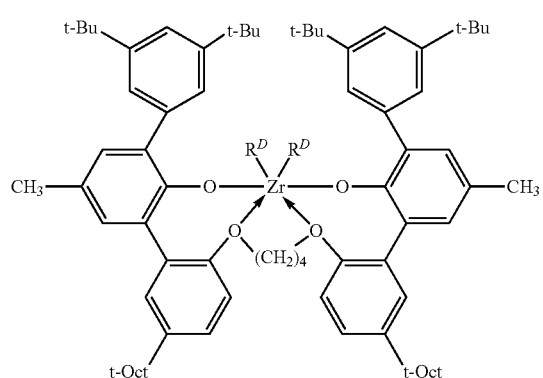

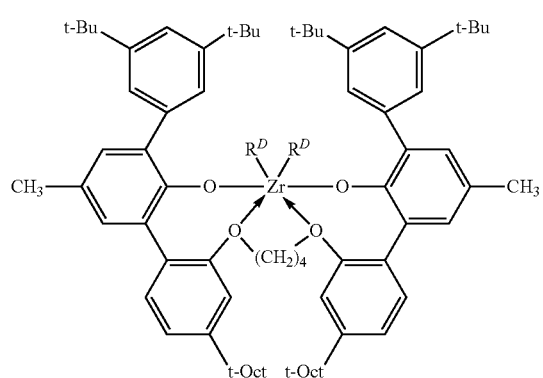

-continued

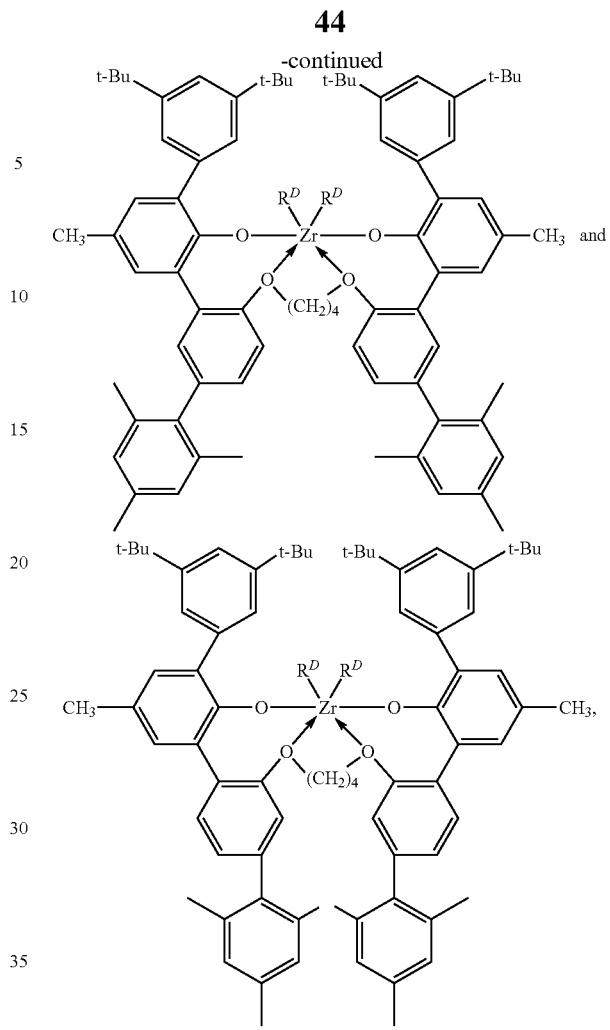

where $R^D$ independently each occurrence is chloride, methyl or benzyl.

15. The process of embodiment 14 wherein the metal complex is selected from the group consisting of:
A) bis((2-oxoyl-3-(3,5-bis-(1,1-dimethylethyl)phenyl)-5-methyl(phenyl)-4-(1,1-dimethylethyl)-2-phenoxy)propane-1,3-diyl zirconium (IV) dimethyl, bis((2-oxoyl-3-(3,5-bis-(1,1-dimethylethyl)phenyl)-5-methyl(phenyl)-4-(1,1-dimethylethyl)-2-phenoxy)propane-1,3-diyl zirconium (IV) dichloride, bis((2-oxoyl-3-(3,5-bis-(1,1-dimethylethyl)phenyl)-5-methyl(phenyl)-4-(1,1-dimethylethyl)-2-phenoxy)propane-1,3-diyl zirconium (IV) dibenzyl, bis((2-oxoyl-3-(3,5-bis-(1,1-dimethylethyl)phenyl)-5-methyl(phenyl)-4-(1,1-dimethylethyl)-2-phenoxy)methyl)cyclohexane-1,2-diyl zirconium (IV) dimethyl, bis((2-oxoyl-3-(3,5-bis-(1,1-dimethylethyl)phenyl)-5-methyl(phenyl)-4-(1,1-dimethylethyl)-2-phenoxy)methyl)cyclohexane-1,2-diyl zirconium (IV) dichloride, bis((2-oxoyl-3-(3,5-bis-(1,1-dimethylethyl)phenyl)-5-methyl(phenyl)-4-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-methyl(phenyl)-4-(1,1-dimethylethyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-methyl(phenyl)-4-(1,1-dimethylethyl)-2-phenoxy)methyl)cyclohex-4-ene-1,2-diyl zirconium (IV) dichloride, bis((2-oxoyl-3-(3,5-bis-(1,1-dimethylethyl)phenyl)-5- methyl(phenyl)-4-(1,1-dimethylethyl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(1,1-dimethylethyl)(phenyl)-4-(1,1-dimethylethyl)-2-phenoxy)propane-1,3-diyl zirconium (IV) dimethyl, bis((2-oxoyl-3-(3,5-bis-(1,1-dimethylethyl)phenyl)-5-(1,1-dimethylethyl)(phenyl)-4-(1,1-dimethylethyl)-2-phenoxy)propane-1,3-diyl zirconium (IV) dichloride, bis((2-oxoyl-3-(3,5-bis-(1,1-dimethylethyl)phenyl)-5-(1,1-dimethylethyl)(phenyl)-4-(1,1-dimethylethyl)-2-phenoxy)propane-1,3-diyl zirconium (IV) dibenzyl, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohexane-1,2-diyl zirconium (IV) dimethyl, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohexane-1,2-diyl zirconium (IV) dichloride, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohex-4-ene-1,2-diyl zirconium (IV) dichloride, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)propane-1,3-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)propane-1,3-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)propane-1,3-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohexane-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohexane-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dibenzyl, B) bis((2-oxoyl-3-(3,5-bis-(1,1-dimethylethyl)phenyl)-5-methyl(phenyl)-4-(2,4,4-trimethylpentan-2-yl)-2-phenoxy)propane-1,3-diyl zirconium (IV) dimethyl, bis((2-oxoyl-3-(3,5-bis-(1,1-dimethylethyl)phenyl)-5-methyl(phenyl)-4-(2,4,4-trimethylpentan-2-yl)-2-phenoxy)propane-1,3-diyl zirconium (IV) dichloride, bis((2-oxoyl-3-(3,5-bis-(1,1-dimethylethyl)phenyl)-5-methyl(phenyl)-4-(2,4,4-trimethylpentan-2-yl)-2-phenoxy)propane-1,3-diyl zirconium (IV) dibenzyl, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohexane-1,2-diyl zirconium (IV) dimethyl, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(1,1-dimethylethyl)(phenyl)-4-(1-methyl-4,4-dimethylpen-2-yl-2-phenoxy)propane-1,3-diyl zirconium (IV) dimethyl, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)propane-1,3-diyl zirconium (IV) dichloride, bis((2-oxoyl-3-(3,5-bis-(1,1-dimethylethyl)phenyl)-5-(1,1-dimethylethyl)(phenyl)-4-(1-methyl-4,4-dimethylpen-2-yl-2-phenoxy)propane-1,3-diyl zirconium (IV) dibenzyl, bis((2-oxoyl-3-(3,5-bis-(1,1-dimethylethyl)phenyl)-5-(1,1-dimethylethyl)(phenyl)-4-(1-methyl-4,4-dimethylpen-2-yl-2-phenoxy)methyl)cyclohexane-1,2-diyl zirconium (IV) dimethyl, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)propane-1,3-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)propane-1,3-diyl zirconium (IV) dichloride, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)propane-1,3-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dichloride, bis((2-oxoyl- 3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dibenzyl, C) bis((2-oxoyl-3-(3,5-bis-(1,1-dimethylethyl)phenyl)-5-methyl(phenyl)-4-(1-butyl)-2-phenoxy)propane-1,3-diyl zirconium (IV) dimethyl, bis((2-oxoyl-3-(3,5-bis-(1,1-dimethylethyl)phenyl)-5-methyl(phenyl)-4-(1-butyl)-2-phenoxy)propane-1,3-diyl zirconium (IV) dichloride, bis((2-oxoyl-3-(3,5-bis-(1,1-dimethylethyl)phenyl)-5-methyl(phenyl)-4-(1-butyl)-2-phenoxy)propane-1,3-diyl zirconium (IV) dibenzyl, bis((2-oxoyl-3-(3,5-bis-(1,1-dimethylethyl)phenyl)-5-methyl(phenyl)-4-(1-butyl)-2-phenoxy)methyl)cyclohexane-1,2-diyl zirconium (IV) dimethyl, bis((2-oxoyl-3-(3,5-bis-(1,1-dimethylethyl)phenyl)-5-methyl(phenyl)-4-(1-butyl)-2-phenoxy)methyl)cyclohexane-1,2-diyl zirconium (IV) dichloride, bis((2-oxoyl-3-(3,5-bis-(1,1-dimethylethyl)phenyl)-5-methyl(phenyl)-4-(1-butyl)-2-phenoxy)methyl)cyclohexane-1,2-diyl zirconium (IV) dibenzyl, bis((2-oxoyl-3-(3,5-bis-(1,1-dimethylethyl)phenyl)-5-methyl(phenyl)-4-(1-butyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-methyl(phenyl)-4-(1-butyl)-2-phenoxy)methyl)cyclohex-4-ene-1,2-diyl zirconium (IV) dichloride, bis((2-oxoyl-3-(3,5-bis-(1,1-dimethylethyl)phenyl)-5-methyl(phenyl)-4-(1-butyl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(1,1-dimethylethyl)(phenyl)-4-(1-butyl)-2-phenoxy)propane-1,3-diyl zirconium (IV) dimethyl, bis((2-oxoyl-3-(3,5-bis-(1,1-dimethylethyl)phenyl)-5-(1,1-dimethylethyl)(phenyl)-4-(1-butyl)-2-phenoxy)propane-1,3-diyl zirconium (IV) dichloride, bis((2-oxoyl-3-(3,5-bis-(1,1-dimethylethyl)phenyl)-5-(1,1-dimethylethyl)(phenyl)-4-(1-butyl)-2-phenoxy)propane-1,3-diyl zirconium (IV) dibenzyl, bis((2-oxoyl-3-(3,5-bis-(1,1-dimethylethyl)phenyl)-5-(1,1-dimethylethyl)(phenyl)-4-(1-butyl)-2-phenoxy)methyl)cyclohexane-1,2-diyl zirconium (IV) dimethyl, bis((2-oxoyl-3-(3,5-bis-(1,1-dimethylethyl)phenyl)-5-(1,1-dimethylethyl)(phenyl)-4-(1-butyl)-2-phenoxy)methyl)cyclohexane-1,2-diyl zirconium (IV) dichloride, bis((2-oxoyl-3-(3,5-bis-(1,1-dimethylethyl)phenyl)-5-(1,1-dimethylethyl)(phenyl)-4-(1-butyl)-2-phenoxy)methyl)cyclohexane-1,2-diyl zirconium (IV) dibenzyl, bis((2-oxoyl-3-(3,5-bis-(1,1-dimethylethyl)phenyl)-5-(1,1-dimethylethyl)(phenyl)-4-(1-butyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(1,1-dimethylethyl)(phenyl)-4-(1-butyl)-2-phenoxy)methyl)cyclohex-4-ene-1,2-diyl zirconium (IV) dichloride, bis((2-oxoyl-3-(3,5-bis-(1,1-dimethylethyl)phenyl)-5-(1,1-dimethylethyl)(phenyl)-4-(1-butyl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(1-butyl)-2-phenoxy)propane-1,3-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1-butyl)-2-phenoxy)propane-1,3-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1-butyl)-2-phenoxy)propane-1,3-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(1-butyl)-2-phenoxy)methyl)cyclohexane-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1-butyl)-2-phenoxy)methyl)cyclohexane-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1-butyl)-2-phenoxy)methyl)cyclohexane-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(1-butyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1-butyl)-2-phenoxy)methyl)cyclohex-4-ene-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1-butyl)-2-phenoxy)methyl)cyclohex-4-ene-1,2-diyl zirconium (IV) dibenzyl, D) bis((2-oxoyl-3-(3,5-bis-(1,1-dimethylethyl)phenyl)-5-methyl(phenyl)-5-(1,1-dimethylethyl)-2-phenoxy)propane-1,3-diyl zirconium (IV) dimethyl, bis((2-oxoyl-3-(3,5-bis-(1,1-dimethylethyl)phenyl)-5-methyl(phenyl)-5-(1,1-dimethylethyl)-2-phenoxy)propane-1,3-diyl zirconium (IV) dichloride, bis((2-oxoyl-3-(3,5-bis-(1,1-dimethylethyl)phenyl)-5-methyl(phenyl)-5-(1,1-dimethylethyl)-2-phenoxy)propane-1,3-diyl zirconium (IV) dibenzyl, bis((2-oxoyl-3-(3,5-bis-(1,1-dimethylethyl)phenyl)-5-methyl(phenyl)-5-(1,1-dimethylethyl)-2-phenoxy)methyl)cyclohexane-1,2-diyl zirconium (IV) dimethyl, bis((2-oxoyl-3-(3,5-bis-(1,1-dimethylethyl)phenyl)-5-methyl(phenyl)-5-(1,1-dimethylethyl)-2-phenoxy)methyl)cyclohexane-1,2-diyl zirconium (IV) dichloride, bis((2-oxoyl-3-(3,5-bis-(1,1-dimethylethyl)phenyl)-5-methyl(phenyl)-5-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-methyl(phenyl)-5-(1,1-dimethylethyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-methyl(phenyl)-5-(1,1-dimethylethyl)-2-phenoxy)methyl)cyclohex-4-ene-1,2-diyl zirconium (IV) dichloride, bis((2-oxoyl-3-(3,5-bis-(1,1-dimethylethyl)phenyl)-5-methyl(phenyl)-5-(1,1-dimethylethyl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(1,1-dimethylethyl)(phenyl)-5-(1,1-dimethylethyl)-2-phenoxy)propane-1,3-diyl zirconium (IV) dimethyl, bis((2-oxoyl-3-(3,5-bis-(1,1-dimethylethyl)phenyl)-5-(1,1-dimethylethyl)(phenyl)-5-(1,1-dimethylethyl)-2-phenoxy)propane-1,3-diyl zirconium (IV) dichloride, bis((2-oxoyl-3-(3,5-bis-(1,1-dimethylethyl)phenyl)-5-(1,1-dimethylethyl)(phenyl)-5-(1,1-dimethylethyl)-2-phenoxy)propane-1,3-diyl zirconium (IV) dibenzyl, bis((2-oxoyl-3-(3,5-bis-(1,1-dimethylethyl)phenyl)-5-(1,1-dimethylethyl)(phenyl)-5-(1,1-dimethylethyl)-2-phenoxy)methyl)cyclohexane-1,2-diyl zirconium (IV) dimethyl, bis((2-oxoyl-3-(3,5-bis-(1,1-dimethylethyl)

phenyl)-5-(1,1-dimethylethyl)(phenyl)-5-(1,1-dimethylethyl)-2-phenoxy)methyl)cyclohexane-1,2-diyl zirconium (IV) dichloride, bis((2-oxoyl-3-(3,5-bis-(1,1-dimethylethyl)phenyl)-5-(1,1-dimethylethyl)(phenyl)-5-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-(1,1-dimethylethyl)(phenyl)-5-(1,1-dimethylethyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(1,1-dimethylethyl)(phenyl)-5-(1,1-dimethylethyl)-2-phenoxy)methyl)cyclohex-4-ene-1,2-diyl zirconium (IV) dichloride, bis((2-oxoyl-3-(3,5-bis-(1,1-dimethylethyl)phenyl)-5-(1,1-dimethylethyl)(phenyl)-5-(1,1-dimethylethyl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)propane-1,3-diyl zirconium (IV) dimethyl, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)propane-1,3-diyl zirconium (IV) dichloride, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)propane-1,3-diyl zirconium (IV) dibenzyl, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)methyl)cyclohexane-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)methyl)cyclohexane-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)methyl)cyclohex-4-ene-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)methyl)cyclohex-4-ene-1,2-diyl zirconium (IV) dibenzyl, E) bis((2-oxoyl-3-(3,5-bis-(2,4,4-trimethylpentan-2-yl)phenyl)-5-methyl(phenyl)-4-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-methyl(phenyl)-4-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-methyl(phenyl)-4-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-methyl(phenyl)-4-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-methyl(phenyl)-4-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-methyl(phenyl)-4-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-methyl(phenyl)-4-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-methyl(phenyl)-4-(1,1-dimethylethyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-methyl(phenyl)-4-(1,1-dimethylethyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dibenzyl, F) bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)propane-1,3-diyl zirconium (IV) dimethyl, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)propane-1,3-diyl zirconium (IV) dichloride, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)propane-1,3-diyl zirconium (IV) dibenzyl; bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1-methyl-4,4-dimethylpen-2-yl-2-phenoxy)propane-1,3-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)propane-1,3-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1-methyl-4,4-dimethylpen-2-yl-2-phenoxy)propane-1,3-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1-methyl-4,4-dimethylpen-2-yl-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)propane-1,3-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)propane-1,3-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)propane-1,3-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dibenzyl, G) bis((2-oxoyl-3-(3,5-bis-(2,4,4-trimethylpentan-2-yl)phenyl)-5-methyl(phenyl)-4-(1-butyl)-2-phenoxy)propane-1,3-diyl zirconium (IV) dimethyl, bis((2-oxoyl-3-(3,5-bis-(2,4,4-trimethylpentan-2-yl)phenyl)-5-methyl(phenyl)-4-(1-butyl)-2-phenoxy)propane-1,3-diyl zirconium (IV) dichloride, bis((2-oxoyl-3-(3,5-bis-(2,4,4-trimethylpentan-2-yl)phenyl)-5-methyl(phenyl)-4-(1-butyl)-2-phenoxy)propane-1,3-diyl zirconium (IV) dibenzyl, bis((2-oxoyl-3-(3,5-bis-(2,4,4-trimethylpentan-2-yl)phenyl)-5-methyl(phenyl)-4-(1-butyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-methyl(phenyl)-4-(1-butyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-methyl(phenyl)-4-(1-butyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-methyl(phenyl)-4-(1-butyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-methyl(phenyl)-4-(1-butyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-methyl(phenyl)-4-(1-butyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1-butyl)-2-phenoxy)propane-1,3-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1-butyl)-2-phenoxy)propane-1,3-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1-butyl)-2-phenoxy)propane-1,3-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(1,1-d methylethyl)(phenyl)-4-(1-butyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)propane-1,3-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)propane-1,3-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)propane-1,3-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohex-4-ene-1,2-diyl zirconium (IV) dibenzyl, H) bis((2-oxoyl-3-(3,5-bis-(2,4,4-trimethylpentan-2-yl)phenyl)-5-methyl(phenyl)-5-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-methyl(phenyl)-5-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-methyl(phenyl)-5-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohex-4-ene-1,2-diyl zirconium (IV) dichloride, and bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohex-4-ene-1,2-diyl zirconium (IV) dibenzyl.

16. A metal complex of a polyvalent aryloxyether corresponding to the formula:

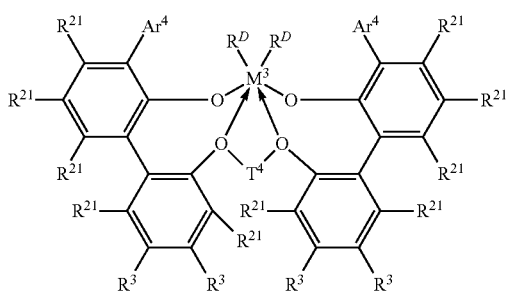

where $M^3$ is Hf or Zr, preferably Zr;

$Ar^4$ independently each occurrence is a substituted $C_{9-20}$ aryl group, wherein the substituents, independently each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached;

$T^4$ independently each occurrence is a $C_{2-20}$ alkylene, cycloalkylene or cycloalkenylene group, or an inertly substituted derivative thereof;

$R^{21}$ independently each occurrence is hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ independently each occurrence is hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$, independently each occurrence is halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group.

17. The metal complex according to embodiment 16 corresponding to the formula:

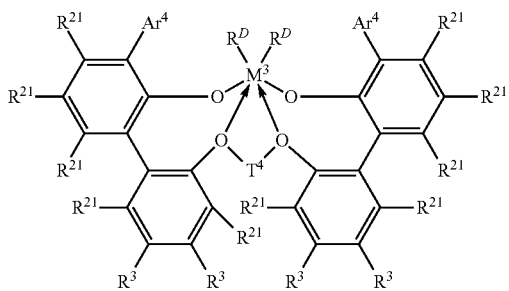

where $M^3$ is Hf or Zr, preferably Zr;

$Ar^4$ independently each occurrence is a substituted $C_{9-20}$ aryl group, wherein the substituents, independently each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached;

$T^4$ independently each occurrence is a $C_{2-20}$ alkylene, cycloalkylene or cycloalkenylene group, or an inertly substituted derivative thereof;

$R^{21}$ independently each occurrence is hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ independently each occurrence is hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring or an $R^3$ and an $R^{21}$ group on the same or different arylene ring together form a divalent ligand group attached to the arylene group in two positions or join two different arylene rings together; and $R^D$, independently each occurrence is halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group.

18. A metal complex according to embodiment 16 or 17 wherein each $Ar^4$ group is substituted with at least one sterically bulky group, and preferably two sterically bulky groups, and at least two $R^3$ groups located on different aryleneoxy groups are sterically bulky.

19. The metal complex according to embodiment 18 wherein each $Ar^4$ group corresponds to the formula:

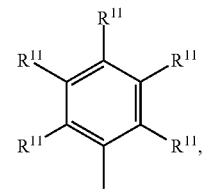

wherein $R^{11}$ independently each occurrence is hydrogen, halo, hydrocarbyl, trihydrocarbylsilyl, trihydrocarbylsilylhydrocarbyl, alkoxy or di(hydrocarbyl)amino of up to 50 atoms not counting hydrogen, or two $R^{11}$ groups together are part of a ring attached to the aryl group in two positions, with the proviso that in at least one occurrence $R^{11}$ or the divalent derivative of two such $R^{11}$ groups, is sterically bulky.

20. A metal complex according to embodiment 19 wherein the sterically bulky $R^{11}$ and $R^3$ substituents are independently selected from the group consisting of tertiary alkyl-; cycloalkyl-, trihydrocarbylsilyl-, tri(hydrocarbyl)silylhydrocarbyl-, and tri(hydrocarbyl)phenyl-groups having from 3 to 20 nonhydrogen atoms.

21. A metal complex according to embodiment 19 wherein the sterically bulky $R^{11}$ and $R^3$ substituents are independently selected from the group consisting of: tert-butyl, sec-butyl, tert-octyl (2,4,4-trimethylpentan-2-yl), 1-phenylethyl, 2,3-dimethyl-but-2-yl, trityl(triphenylmethyl), cumyl (2-phenylprop-2-yl), tert-amyl (1,1-dimethylpropyl), phenyl, cyclohexyl, trimethylsilyl, trimethylsilyl methyl, isopropyl, 2,4,6-trimethylphenyl, 2,6-dimethylphenyl, 3,5-di(isopropyl)phenyl, and 3,5-di(t-butyl)phenyl.

22. The metal complex according to embodiment 16 corresponding to the formula:

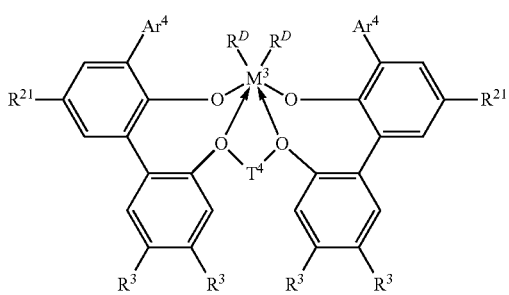

where M³ is Zr;

Ar⁴ is 3,5-di(tert-butyl)phenyl, 3,5-di(isopropyl)phenyl, 3,5-di(isobutyl)phenyl, 3,5-di(tert-octyl)phenyl, 3,5-di(2,4,6-trimethylphenyl)phenyl, 3,5-di(2,6-dimethylphenyl)phenyl, 3,5-di(2,4,6-tri-isopropylphenyl)phenyl, 3,5-di(3,5-di-tert-butylphenyl)phenyl, 1,2,3,4,6,7,8,9-octahydroanthracen-5-yl, 3,6-di(tert-butyl)-9H-carbazol-9-yl, 3,6-di(tert-octyl)-9H-carbazol-9-yl;

$R^{21}$ independently each occurrence is methyl or tert-butyl;

$R^3$ independently each occurrence is branched alkyl, cycloalkyl, substituted aryl, or other sterically bulky group;

$T^4$ is propan-1,3-diyl, butan-1,4-diyl, cyclohexane-1,2-diyl or cyclohexane-1,2-dimethylene; and $R^D$, independently each occurrence is halo or a hydrocarbyl or trihydrocarbylsilyl group of up to 20 atoms not counting hydrogen, or 2 $R^D$ groups together are hydrocarbylene, hydrocarbadiyl, 1,4-dihydrocarbyl-substituted 1,3-butadiene, or a poly(hydrocarbyl)silylene group.

23. The metal complex according to embodiment 22 wherein at least one $R^{11}$ group on each Ar⁴ ring, most preferably 2 such $R^{11}$ groups in the 3 and 5 positions of an Ar⁴ phenyl ring, and at least two $R^3$ group on different arylene rings are branched alkyl, cycloalkyl, hydrocarbyl-substituted aryl, or poly(hydrocarbyl)-substituted silyl groups, containing from 3 to 20 carbons, preferably from 4 to 12 carbons.

24. The metal complex according to embodiment 23 wherein two $R^{11}$ groups on each Ar⁴ ring, and two $R^3$ groups on different arylene rings are tert-butyl.

25. A metal complex selected from the group consisting of:

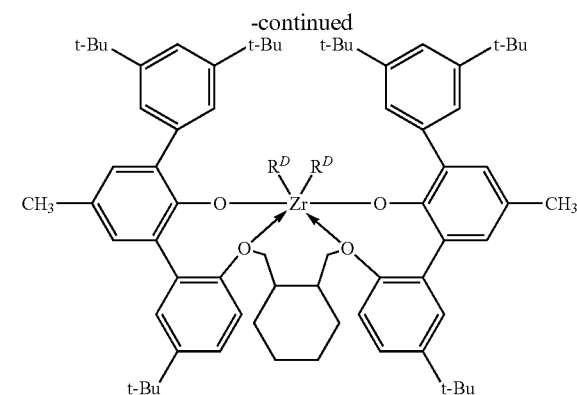

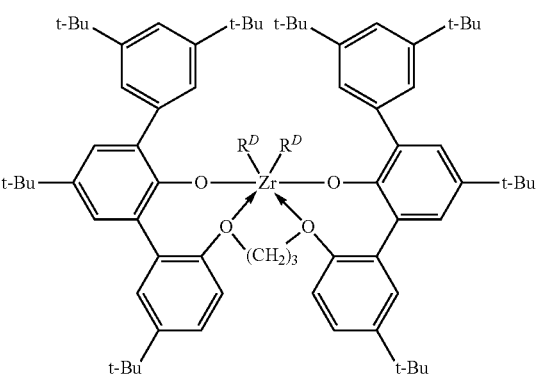

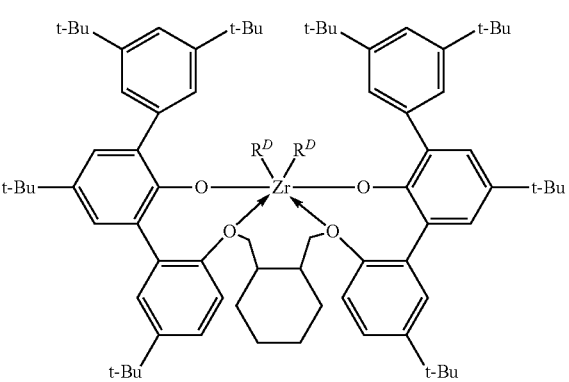

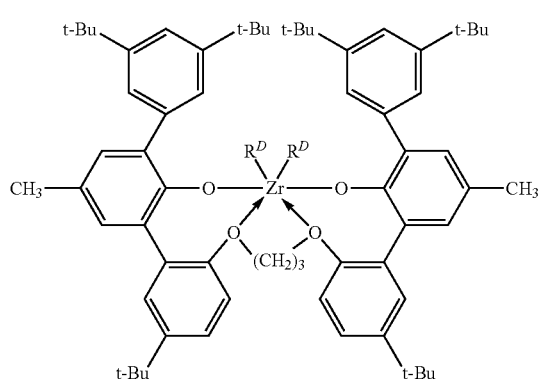

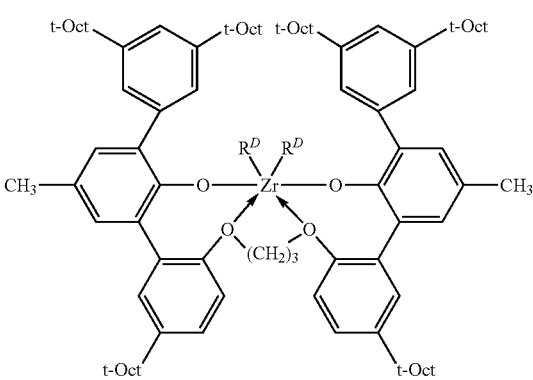

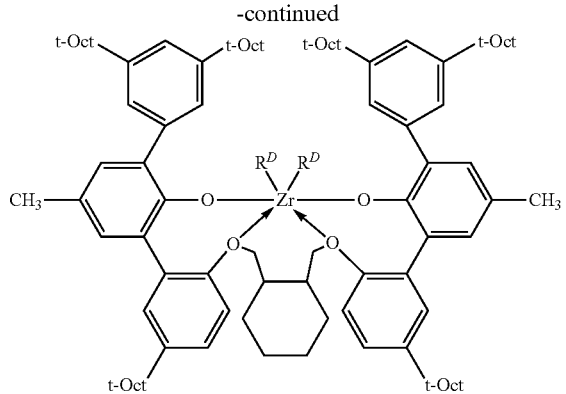
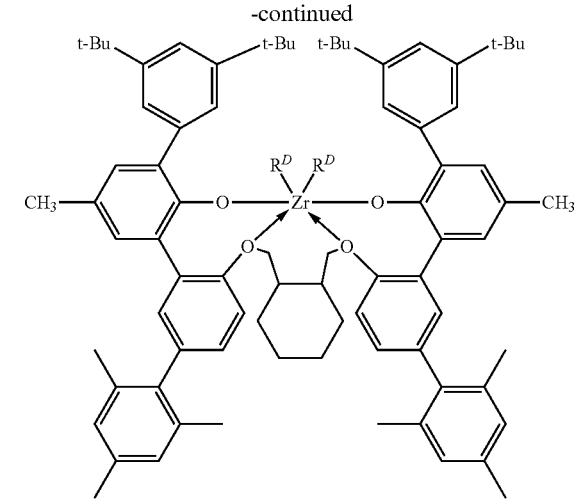
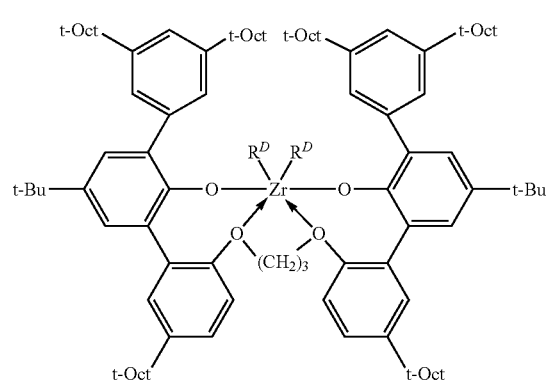
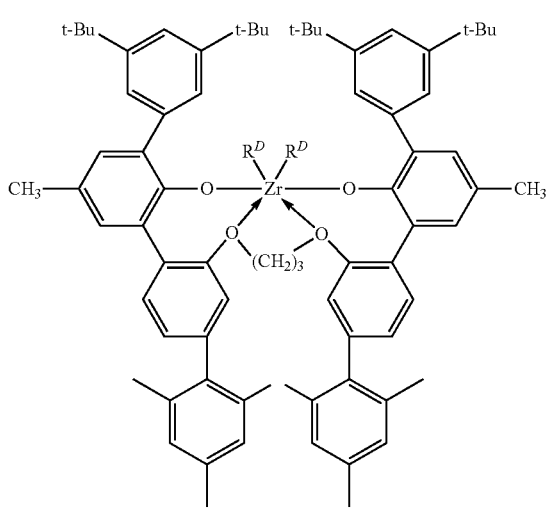
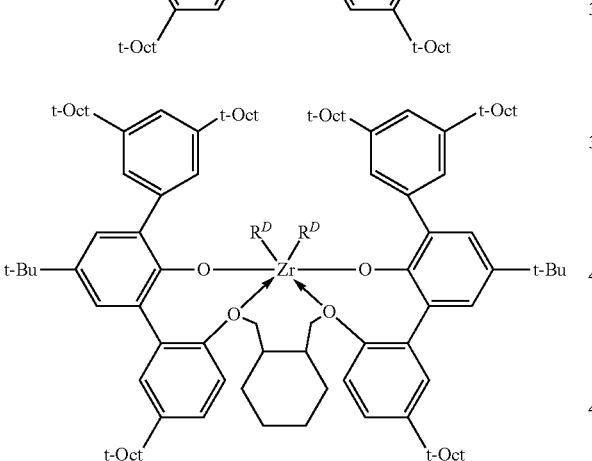
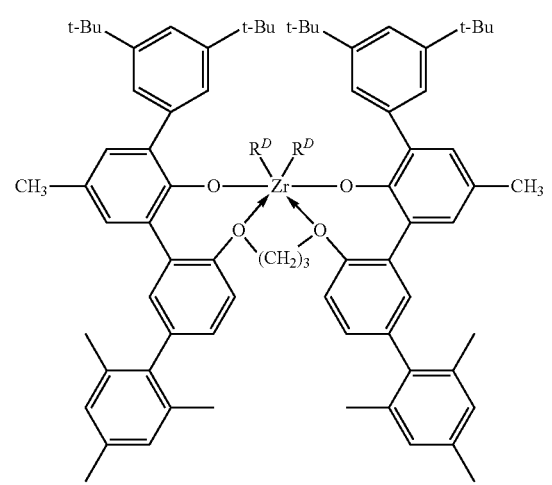
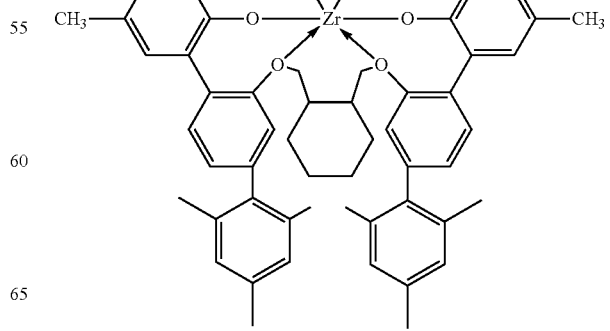

-continued
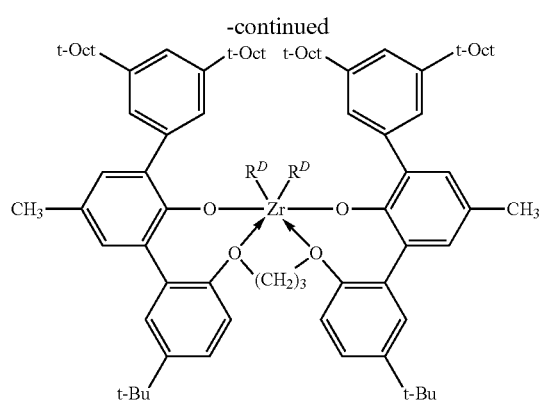
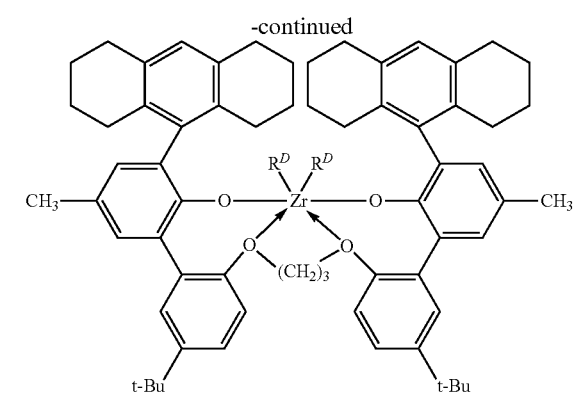
-continued
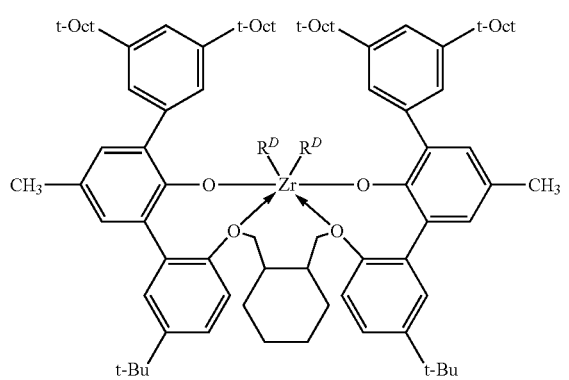
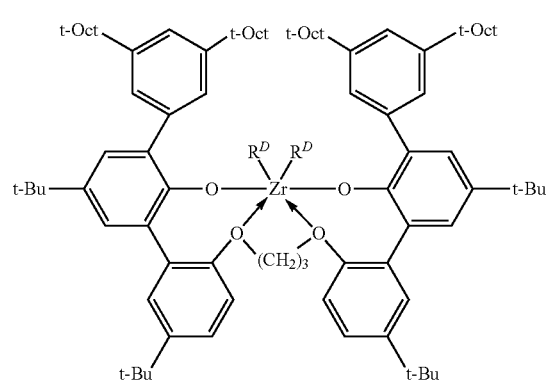
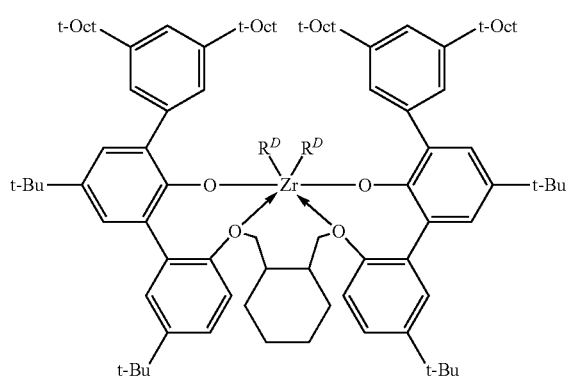
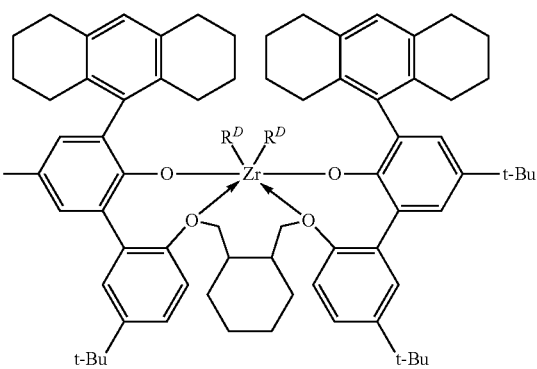

-continued
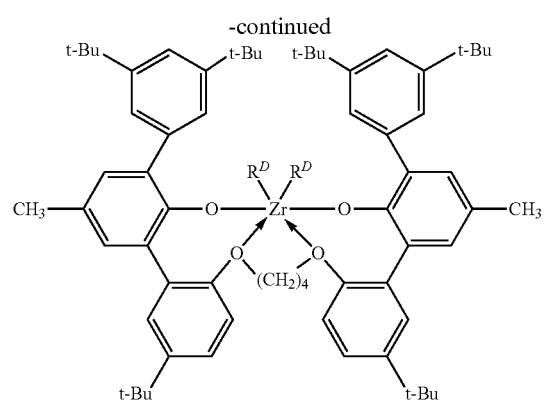
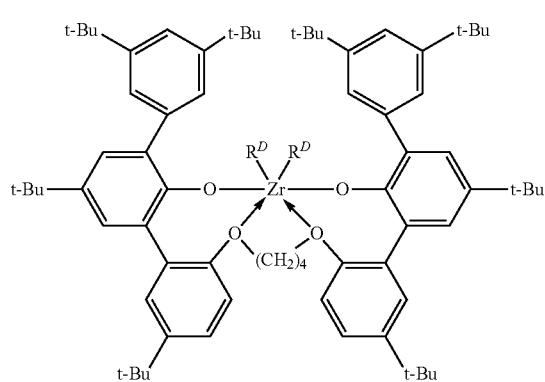
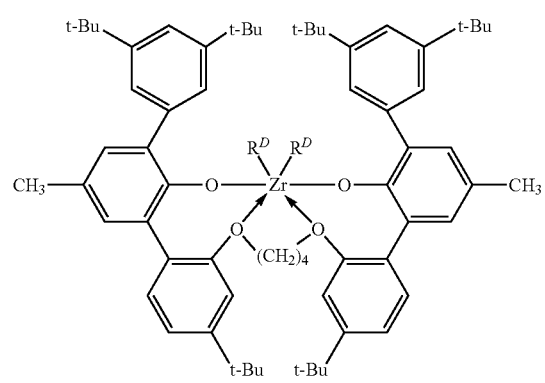
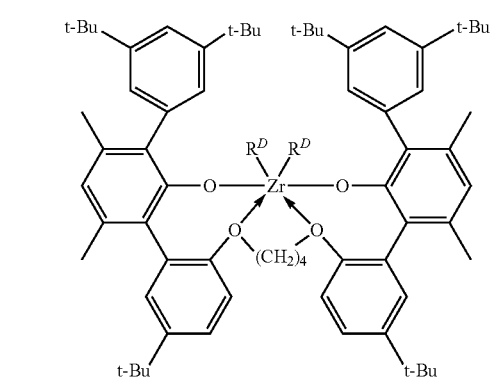
-continued
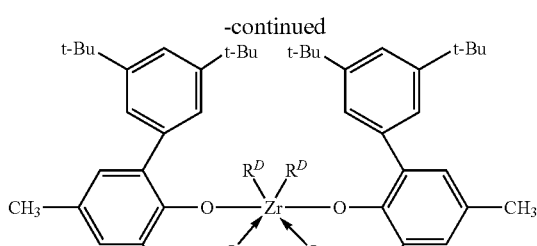
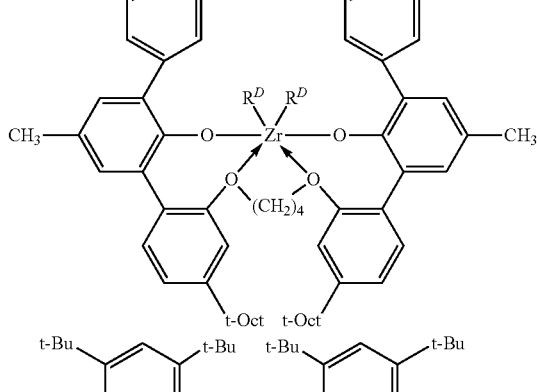
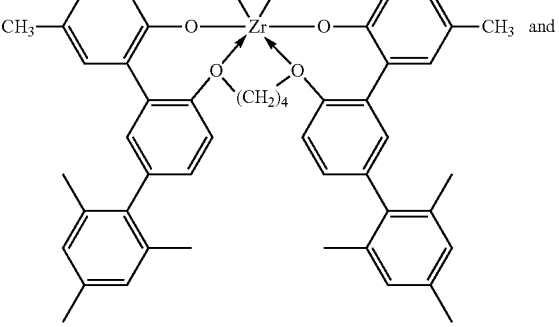
and
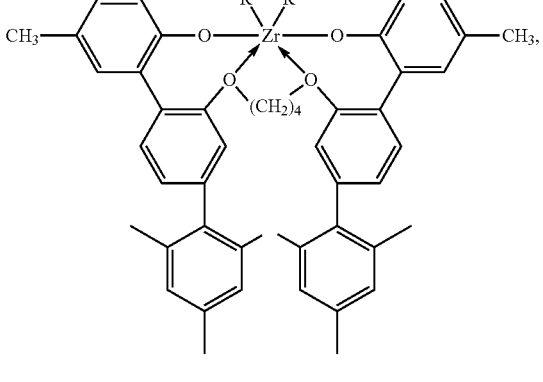

where $R^D$ independently each occurrence is chloride, methyl or benzyl.

26. The metal complex of embodiment 25 selected from the group consisting of:

A) bis((2-oxoyl-3-(3,5-bis-(1,1-dimethylethyl)phenyl)-5-methyl(phenyl)-4-(1,1-dimethylethyl)-2-phenoxy)propane-1,3-diyl zirconium (IV) dimethyl, bis((2-oxoyl-3-(3,5-bis-(1,1-dimethylethyl)phenyl)-5-methyl(phenyl)-4-(1,1-dimethylethyl)-2-phenoxy)propane-1,3-diyl zirconium (IV) dichloride, bis((2-oxoyl-3-(3,5-bis-(1,1-dimethylethyl)phenyl)-5-methyl(phenyl)-4-(1,1-dimethylethyl)-2-phenoxy)propane-1,3-diyl zirconium (IV) dibenzyl, bis((2-oxoyl-3-(3,5-bis-(1,1-dimethylethyl)phenyl)-5-methyl(phenyl)-4-(1,1-dimethylethyl)-2-phenoxy)methyl)cyclohexane-1,2-diyl zirconium (IV) dimethyl, bis((2-oxoyl-3-(3,5-bis-(1,1-dimethylethyl)phenyl)-5-methyl(phenyl)-4-(1,1-dimethylethyl)-2-phenoxy)methyl)cyclohexane-1,2-diyl zirconium (IV) dichloride, bis((2-oxoyl-3-(3,5-bis-(1,1-dimethylethyl)phenyl)-5-methyl(phenyl)-4-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-methyl(phenyl)-4-(1,1-dimethylethyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-methyl(phenyl)-4-(1,1-dimethylethyl)-2-phenoxy)methyl)cyclohex-4-ene-1,2-diyl zirconium (IV) dichloride, bis((2-oxoyl-3-(3,5-bis-(1,1-dimethylethyl)phenyl)-5-methyl(phenyl)-4-(1,1-dimethylethyl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(1,1-dimethylethyl)(phenyl)-4-(1,1-dimethylethyl)-2-phenoxy)propane-1,3-diyl zirconium (IV) dimethyl, bis((2-oxoyl-3-(3,5-bis-(1,1-dimethylethyl)phenyl)-5-(1,1-dimethylethyl)(phenyl)-4-(1,1-dimethylethyl)-2-phenoxy)propane-1,3-diyl zirconium (IV) dichloride, bis((2-oxoyl-3-(3,5-bis-(1,1-dimethylethyl)phenyl)-5-(1,1-dimethylethyl)(phenyl)-4-(1,1-dimethylethyl)-2-phenoxy)propane-1,3-diyl zirconium (IV) dibenzyl, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohexane-1,2-diyl zirconium (IV) dimethyl, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohexane-1,2-diyl zirconium (IV) dichloride, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohex-4-ene-1,2-diyl zirconium (IV) dichloride, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)propane-1,3-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)propane-1,3-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)propane-1,3-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohexane-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohexane-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dibenzyl, B) bis((2-oxoyl-3-(3,5-bis-(1,1-dimethylethyl)phenyl)-5-methyl(phenyl)-4-(2,4,4-trimethylpentan-2-yl)-2-phenoxy)propane-1,3-diyl zirconium (IV) dimethyl, bis((2-oxoyl-3-(3,5-bis-(1,1-dimethylethyl)phenyl)-5-methyl(phenyl)-4-(2,4,4-trimethylpentan-2-yl)-2-phenoxy)propane-1,3-diyl zirconium (IV) dichloride, bis((2-oxoyl-3-(3,5-bis-(1,1-dimethylethyl)phenyl)-5-methyl(phenyl)-4-(2,4,4-trimethylpentan-2-yl)-2-phenoxy)propane-1,3-diyl zirconium (IV) dibenzyl, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohexane-1,2-diyl zirconium (IV) dimethyl, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(1,1-dimethylethyl)(phenyl)-4-(1-methyl-4,4-dimethylpen-2-yl-2-phenoxy)propane-1,3-diyl zirconium (IV) dimethyl, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)propane-1,3-diyl zirconium (IV) dichloride, bis((2-oxoyl-3-(3,5-bis-(1,1-dimethylethyl)phenyl)-5-(1,1-dimethylethyl)(phenyl)-4-(1-methyl-4,4-dimethylpen-2-yl-2-phenoxy)propane-1,3-diyl zirconium (IV) dibenzyl, bis((2-oxoyl-3-(3,5-bis-(1,1-dimethylethyl)phenyl)-5-(1,1-dimethylethyl)(phenyl)-4-(1-methyl-4,4-dimethylpen-2-yl-2-phenoxy)methyl)cyclohexane-1,2-diyl zirconium (IV) dimethyl, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)methyl)cyclohexane-1,2-diyl zirconium (IV)

dibenzyl, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)propane-1,3-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)propane-1,3-diyl zirconium (IV) dichloride, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)propane-1,3-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dibenzyl, C) bis((2-oxoyl-3-(3,5-bis-(1,1-dimethylethyl)phenyl)-5-methyl(phenyl)-4-(1-butyl)-2-phenoxy)propane-1,3-diyl zirconium (IV) dimethyl, bis((2-oxoyl-3-(3,5-bis-(1,1-dimethylethyl)phenyl)-5-methyl(phenyl)-4-(1-butyl)-2-phenoxy)propane-1,3-diyl zirconium (IV) dichloride, bis((2-oxoyl-3-(3,5-bis-(1,1-dimethylethyl)phenyl)-5-methyl(phenyl)-4-(1-butyl)-2-phenoxy)propane-1,3-diyl zirconium (IV) dibenzyl, bis((2-oxoyl-3-(3,5-bis-(1,1-dimethylethyl)phenyl)-5-methyl(phenyl)-4-(1-butyl)-2-phenoxy)methyl)cyclohexane-1,2-diyl zirconium (IV) dimethyl, bis((2-oxoyl-3-(3,5-bis-(1,1-dimethylethyl)phenyl)-5-methyl(phenyl)-4-(1-butyl)-2-phenoxy)methyl)cyclohexane-1,2-diyl zirconium (IV) dichloride, bis((2-oxoyl-3-(3,5-bis-(1,1-dimethylethyl)phenyl)-5-methyl(phenyl)-4-(1-butyl)-2-phenoxy)methyl)cyclohexane-1,2-diyl zirconium (IV) dibenzyl, bis((2-oxoyl-3-(3,5-bis-(1,1-dimethylethyl)phenyl)-5-methyl(phenyl)-4-(1-butyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-methyl(phenyl)-4-(1-butyl)-2-phenoxy)methyl)cyclohex-4-ene-1,2-diyl zirconium (IV) dichloride, bis((2-oxoyl-3-(3,5-bis-(1,1-dimethylethyl)phenyl)-5-methyl(phenyl)-4-(1-butyl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(1,1-dimethylethyl)(phenyl)-4-(1-butyl)-2-phenoxy)propane-1,3-diyl zirconium (IV) dimethyl, bis((2-oxoyl-3-(3,5-bis-(1,1-dimethylethyl)phenyl)-5-(1,1-dimethylethyl)(phenyl)-4-(1-butyl)-2-phenoxy)propane-1,3-diyl zirconium (IV) dichloride, bis((2-oxoyl-3-(3,5-bis-(1,1-dimethylethyl)phenyl)-5-(1,1-dimethylethyl)(phenyl)-4-(1-butyl)-2-phenoxy)propane-1,3-diyl zirconium (IV) dibenzyl, bis((2-oxoyl-3-(3,5-bis-(1,1-dimethylethyl)phenyl)-5-(1,1-dimethylethyl)(phenyl)-4-(1-butyl)-2-phenoxy)methyl)cyclohexane-1,2-diyl zirconium (IV) dimethyl, bis((2-oxoyl-3-(3,5-bis-(1,1-dimethylethyl)phenyl)-5-(1,1-dimethylethyl)(phenyl)-4-(1-butyl)-2-phenoxy)methyl)cyclohexane-1,2-diyl zirconium (IV) dichloride, bis((2-oxoyl-3-(3,5-bis-(1,1-dimethylethyl)phenyl)-5-(1,1-dimethylethyl)(phenyl)-4-(1-butyl)-2-phenoxy)methyl)cyclohexane-1,2-diyl zirconium (IV) dibenzyl, bis((2-oxoyl-3-(3,5-bis-(1,1-dimethylethyl)phenyl)-5-(1,1-dimethylethyl)(phenyl)-4-(1-butyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(1,1-dimethylethyl)(phenyl)-4-(1-butyl)-2-phenoxy)methyl)cyclohex-4-ene-1,2-diyl zirconium (IV) dichloride, bis((2-oxoyl-3-(3,5-bis-(1,1-dimethylethyl)phenyl)-5-(1,1-dimethylethyl)(phenyl)-4-(1-butyl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(1-butyl)-2-phenoxy)propane-1,3-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1-butyl)-2-phenoxy)propane-1,3-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1-butyl)-2-phenoxy)propane-1,3-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(1-butyl)-2-phenoxy)methyl)cyclohexane-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1-butyl)-2-phenoxy)methyl)cyclohexane-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1-butyl)-2-phenoxy)methyl)cyclohexane-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(1-butyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1-butyl)-2-phenoxy)methyl)cyclohex-4-ene-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1-butyl)-2-phenoxy)methyl)cyclohex-4-ene-1,2-diyl zirconium (IV) dibenzyl, D) bis((2-oxoyl-3-(3,5-bis-(1,1-dimethylethyl)phenyl)-5-methyl(phenyl)-5-(1,1-dimethylethyl)-2-phenoxy)propane-1,3-diyl zirconium (IV) dimethyl, bis((2-oxoyl-3-(3,5-bis-(1,1-dimethylethyl)phenyl)-5-methyl(phenyl)-5-(1,1-dimethylethyl)-2-phenoxy)propane-1,3-diyl zirconium (IV) dichloride, bis((2-oxoyl-3-(3,5-bis-(1,1-dimethylethyl)phenyl)-5-methyl(phenyl)-5-(1,1-dimethylethyl)-2-phenoxy)propane-1,3-diyl zirconium (IV) dibenzyl, bis((2-oxoyl-3-(3,5-bis-(1,1-dimethylethyl)phenyl)-5-methyl(phenyl)-5-(1,1-dimethylethyl)-2-phenoxy)methyl)cyclohexane-1,2-diyl zirconium (IV) dimethyl, bis((2-oxoyl-3-(3,5-bis-(1,1-dimethylethyl)phenyl)-5- methyl(phenyl)-5-(1,1-dimethylethyl)-2-phenoxy) methyl)cyclohexane-1,2-diyl zirconium (IV) dichloride, bis((2-oxoyl-3-(3,5-bis-(1,1-dimethylethyl)phenyl)-5-methyl(phenyl)-5-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-methyl(phenyl)-5-(1,1-dimethylethyl)-2-phenoxy) methyl)cyclohex-4-ene-1,2-diyl zirconium (IV) dimethyl, bis((2-oxoyl-3-(3,5-bis-(1,1-dimethylethyl)phenyl)-5-methyl(phenyl)-5-(1,1-dimethylethyl)-2-phenoxy)methyl)cyclohex-4-ene-1,2-diyl zirconium (IV) dichloride, bis((2-oxoyl-3-(3,5-bis-(1,1-dimethylethyl)phenyl)-5-methyl(phenyl)-5-(1,1-dimethylethyl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(1,1-dimethylethyl)(phenyl)-5-(1,1-dimethylethyl)-2-phenoxy)propane-1,3-diyl zirconium (IV) dimethyl, bis((2-oxoyl-3-(3,5-bis-(1,1-dimethylethyl)phenyl)-5-(1,1-dimethylethyl)(phenyl)-5-(1,1-dimethylethyl)-2-phenoxy)propane-1,3-diyl zirconium (IV) dichloride, bis((2-oxoyl-3-(3,5-bis-(1,1-dimethylethyl)phenyl)-5-(1,1-dimethylethyl)(phenyl)-5-(1,1-dimethylethyl)-2-phenoxy)propane-1,3-diyl zirconium (IV) dibenzyl, bis((2-oxoyl-3-(3,5-bis-(1,1-dimethylethyl)phenyl)-5-(1,1-dimethylethyl)(phenyl)-5-(1,1-dimethylethyl)-2-phenoxy)methyl)cyclohexane-1,2-diyl zirconium (IV) dimethyl, bis((2-oxoyl-3-(3,5-bis-(1,1-dimethylethyl)phenyl)-5-(1,1-dimethylethyl)(phenyl)-5-(1,1-dimethylethyl)-2-phenoxy)methyl)cyclohexane-1,2-diyl zirconium (IV) dichloride, bis((2-oxoyl-3-(3,5-bis-(1,1-dimethylethyl)phenyl)-5-(1,1-dimethylethyl)(phenyl)-5-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-(1,1-dimethylethyl)(phenyl)-5-(1,1-dimethylethyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(1,1-dimethylethyl)(phenyl)-5-(1,1-dimethylethyl)-2-phenoxy)methyl) cyclohex-4-ene-1,2-diyl zirconium (IV) dichloride, bis((2-oxoyl-3-(3,5-bis-(1,1-dimethylethyl)phenyl)-5-(1,1-dimethylethyl)(phenyl)-5-(1,1-dimethylethyl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)propane-1,3-diyl zirconium (IV) dimethyl, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)propane-1,3-diyl zirconium (IV) dichloride, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)propane-1,3-diyl zirconium (IV) dibenzyl, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)methyl)cyclohexane-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)methyl)cyclohexane-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)methyl)cyclohex-4-ene-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)methyl) cyclohex-4-ene-1,2-diyl zirconium (IV) dibenzyl, E) bis((2-oxoyl-3-(3,5-bis-(2,4,4-trimethylpentan-2-yl)phenyl)-5-methyl(phenyl)-4-(1,1-dimethylethyl)-2-phenoxy) propane-1,3-diyl zirconium (IV) dimethyl, bis((2-oxoyl-3-(3,5-bis-(2,4,4-trimethylpentan-2-yl)phenyl)-5-methyl (phenyl)-4-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-methyl(phenyl)-4-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-methyl(phenyl)-4-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-methyl(phenyl)-4-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-methyl(phenyl)-4-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-methyl(phenyl)-4-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-methyl(phenyl)-4-(1,1-dimethylethyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-methyl(phenyl)-4-(1,1-dimethylethyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-

(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dibenzyl, F) bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)propane-1,3-diyl zirconium (IV) dimethyl, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)propane-1,3-diyl zirconium (IV) dichloride, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)propane-1,3-diyl zirconium (IV) dibenzyl, bis((2-oxoyl-3-(3,5-bis-(2,4,4-trimethylpentan-2-yl(phenyl)-5-methyl(phenyl)-4-(2,4,4-trimethylpentan-2-yl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1-methyl-4,4-dimethylpen-2-yl-2-phenoxy)propane-1,3-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)propane-1,3-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1-methyl-4,4-dimethylpen-2-yl-2-phenoxy)propane-1,3-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1-methyl-4,4-dimethylpen-2-yl-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)propane-1,3-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)propane-1,3-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)propane-1,3-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dibenzyl, G) bis((2-oxoyl-3-(3,5-bis-(2,4,4-trimethylpentan-2-yl)phenyl)-5-methyl(phenyl)-4-(1-butyl)-2-phenoxy)propane-1,3-diyl zirconium (IV) dimethyl, bis((2-oxoyl-3-(3,5-bis-(2,4,4-trimethylpentan-2-yl)phenyl)-5-methyl(phenyl)-4-(1-butyl)-2-phenoxy)propane-1,3-diyl zirconium (IV) dichloride, bis((2-oxoyl-3-(3,5-bis-(2,4,4-trimethylpentan-2-yl)phenyl)-5-methyl(phenyl)-4-(1-butyl)-2-phenoxy)propane-1,3-diyl zirconium (IV) dibenzyl, bis((2-oxoyl-3-(3,5-bis-(2,4,4-trimethylpentan-2-yl)phenyl)-5-methyl(phenyl)-4-(1-butyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-methyl(phenyl)-4-(1-butyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-methyl(phenyl)-4-(1-butyl)-2-phenoxy)methyl)

cyclohexane-1,2-diyl zirconium (IV) dibenzyl, bis((2-oxoyl-3-(3,5-bis-(2,4,4-trimethylpentan-2-yl)phenyl)-5-methyl(phenyl)-4-(1-butyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-methyl (phenyl)-4-(1-butyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-methyl (phenyl)-4-(1-butyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1-butyl)-2-phenoxy)propane-1,3-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1-butyl)-2-phenoxy) propane-1,3-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1-butyl)-2-phenoxy)propane-1,3-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl) cyclohexane-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1-butyl)-2-phenoxy) methyl)cyclohexane-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl)cyclohexane-1,2-diyl zirconium (IV) dibenzyl, bis((2-oxoyl-3-(3,5-bis-(2,4,4-trimethylpentan-2-yl) phenyl)-5-(1,1-dimethylethyl)(phenyl)-4-(1-butyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)propane-1,3-diyl zirconium (IV) dimethyl, bis ((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)propane-1,3-diyl zirconium (IV) dichloride, bis ((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)propane-1,3-diyl zirconium (IV) dibenzyl, bis ((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohex-4-ene-1,2-diyl zirconium (IV) dibenzyl, H) bis((2-oxoyl-3-(3,5-bis-(2,4,4-trimethylpentan-2-yl)phenyl)-5-methyl(phenyl)-5-(1,1-dimethylethyl)-2-phenoxy) propane-1,3-diyl zirconium (IV) dimethyl, bis((2-oxoyl-3-(3,5-bis-(2,4,4-trimethylpentan-2-yl)phenyl)-5-methyl (phenyl)-5-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-methyl(phenyl)-5-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl) cyclohexane-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-(2,4,4-trimethylpentan-2-yl) (phenyl)-5-(1,1-dimethylethyl)-2-phenoxy)propane-1, 3-diyl zirconium (IV) dichloride, bis((2-oxoyl-3-(3,5- bis-(2,4,4-trimethylpentan-2-yl)phenyl)-5-(2,4,4-trimethylpentan-2-yl)(phenyl)-5-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohex-4-ene-1,2-diyl zirconium (IV) dichloride, and bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohex-4-ene-1,2-diyl zirconium (IV) dibenzyl.

It is understood that the present invention is operable in the absence of any component which has not been specifically disclosed and may be combined with any other suitable reaction or process in a multistep polymerization system design.

Examples 1-3 and Comparative A-E

The following examples are provided as further illustration of the invention and is not to be construed as limiting. The term "overnight", if used, refers to a time of approximately 16-18 hours, the term "room temperature", refers to a temperature of 20-25° C., and the term "mixed alkanes" refers to a commercially obtained mixture of $C_{6-9}$ aliphatic hydrocarbons available under the trade designation Isopar E®, from Exxon Mobil Chemicals Inc. In the event the name of a compound herein does not conform to the structural representation thereof, the structural representation shall control. The synthesis of all metal complexes and the preparation of all screening experiments are carried out in a dry nitrogen atmosphere using dry box techniques. All solvents used are HPLC grade and are dried before their use.

One suitable technique for molecular weight determinations is gel permeation chromatography made using a Model PL-210 or Model PL-220 gel permeation instrument, available from Polymer Laboratories, or equivalent equipment. The column and carousel compartments are operated at 140° C. Three Polymer Laboratories 10-micron Mixed-B columns are used. The solvent is 1,2,4-trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polyethylene} = 0.431 (M_{polystyrene})$.

Polyetheylene equivalent molecular weight calculations are performed using Viscotek TriSEC™ software Version 3.0, available from Viscotek Corporation, Houston, Tex.

Preparation of Metal Complex

The synthetic procedures of US-A-2004/0010103 were substantially repeated to prepare metal complexes Examples 1-3 and Comparatives A-E.

A:

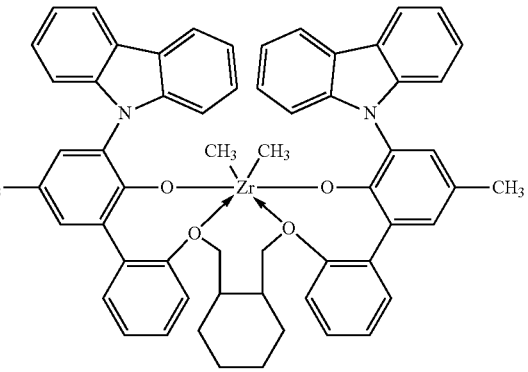

bis((2-oxoyl-3-(dibenzo-1H-pyrrole-1-yl)-5-(methyl)phenyl)-2-phenoxy)-trans-cyclohexane-1,2-dimethylenyl zirconium (IV) dimethyl

B:

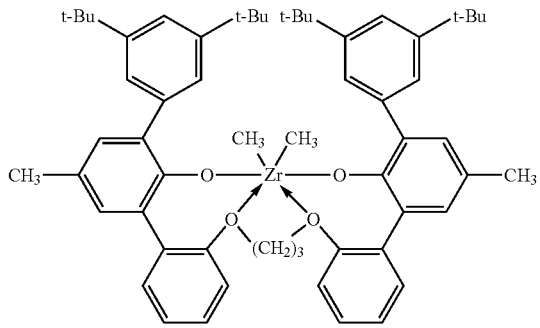

bis((2-oxoyl-3-(3,5-bis-(1,1-dimethyl-ethyl)phen-1-yl)-5-(methyl)phenyl)-2-phenoxy)-propane-1,3-diyl zirconium (IV) dimethyl

C:

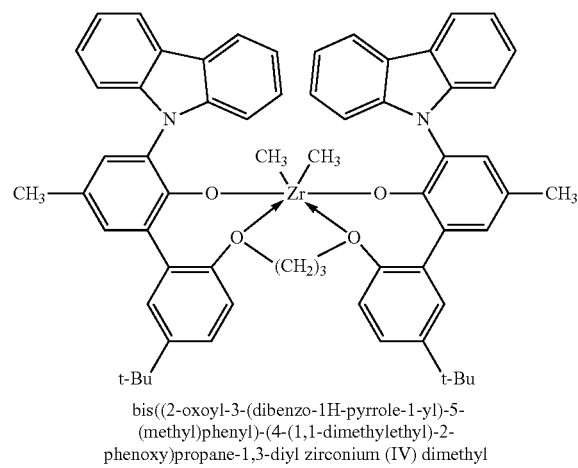

bis((2-oxoyl-3-(dibenzo-1H-pyrrole-1-yl)-5-
(methyl)phenyl)-(4-(1,1-dimethylethyl)-2-
phenoxy)propane-1,3-diyl zirconium (IV) dimethyl

D:

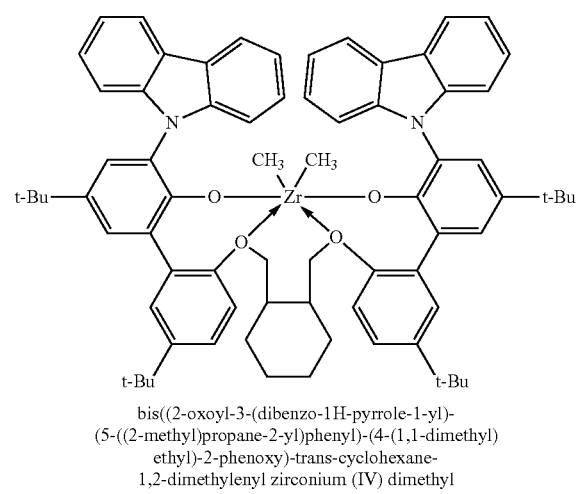

bis((2-oxoyl-3-(dibenzo-1H-pyrrole-1-yl)-
(5-((2-methyl)propane-2-yl)phenyl)-(4-(1,1-dimethyl)
ethyl)-2-phenoxy)-trans-cyclohexane-
1,2-dimethylenyl zirconium (IV) dimethyl

E:

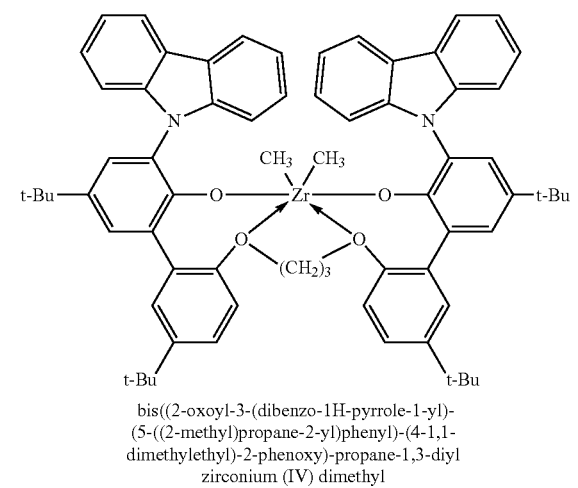

bis((2-oxoyl-3-(dibenzo-1H-pyrrole-1-yl)-
(5-((2-methyl)propane-2-yl)phenyl)-(4-1,1-
dimethylethyl)-2-phenoxy)-propane-1,3-diyl
zirconium (IV) dimethyl Ex 1:

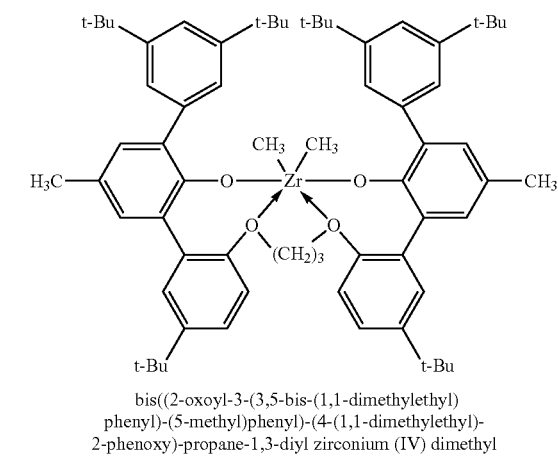

bis((2-oxoyl-3-(3,5-bis-(1,1-dimethylethyl)
phenyl)-(5-methyl)phenyl)-(4-(1,1-dimethylethyl)-
2-phenoxy)-propane-1,3-diyl zirconium (IV) dimethyl Ex 2:

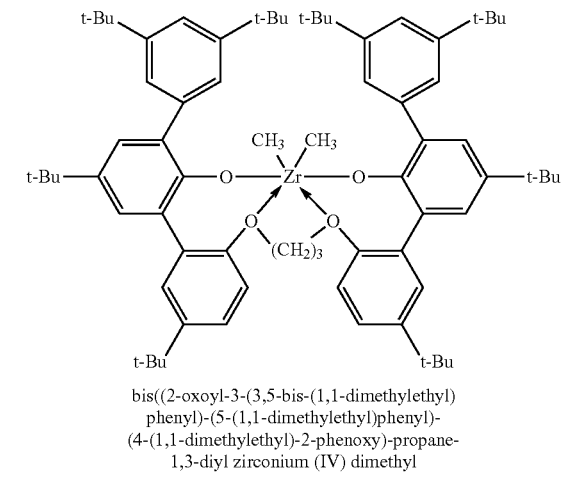

bis((2-oxoyl-3-(3,5-bis-(1,1-dimethylethyl)
phenyl)-(5-(1,1-dimethylethyl)phenyl)-
(4-(1,1-dimethylethyl)-2-phenoxy)-propane-
1,3-diyl zirconium (IV) dimethyl Ex 3:

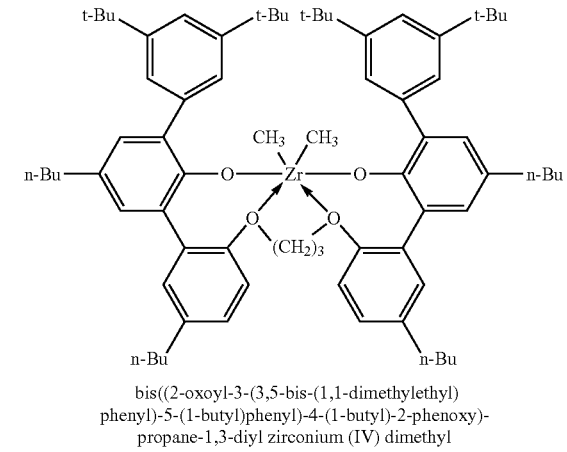

bis((2-oxoyl-3-(3,5-bis-(1,1-dimethylethyl)
phenyl)-5-(1-butyl)phenyl)-4-(1-butyl)-2-phenoxy)-
propane-1,3-diyl zirconium (IV) dimethyl The foregoing metal complexes are measured for solubility in methylcyclohexane at 20° C. An excess of pulverized metal complex is stirred in a known quantity of solvent for one hour. The solution is filtered and the solvent removed under reduced pressure. The quantity of recovered residue is weighed to determine percent solubility. Results are found in Table 1.

TABLE 1

| Complex | Solubility (percent) |
|---|---|
| A* | 1.6 |
| B* | 1.8 |
| C* | 0.85 |
| D* | 0.50 |
| E* | <0.50 |
| Ex. 1 | 7.5 |
| Ex. 2 | 10.0 |
| Ex. 3 | 5.2 |

*Comparative, not an example of the invention

The results of Table 1 support the conclusion that metal complexes according to the invention containing appropriately located, sterically bulky, ligand groups as disclosed herein, possess higher solubility in aliphatic or cycloaliphatic hydrocarbons than metal complexes lacking such ligand groups and/or ligand positioning.

Continuous Solution Polymerizations

Continuous solution polymerizations are carried out in a computer controlled autoclave reactor equipped with an internal stirrer. Purified mixed alkanes solvent (Isopar™ E available from ExxonMobil, Inc.), ethylene, 1-octene, and hydrogen are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst injection lines and the reactor agitator. These flows are measured by mass flow meters and controlled by control valves or by the manual adjustment of needle valves. The remaining solvent is combined with 1-octene, ethylene, and hydrogen and fed to the reactor. A mass flow controller is used to deliver hydrogen to the reactor as needed. The temperature of the solvent/monomer solution is controlled by use of a heat exchanger before entering the reactor. This stream enters the bottom of the reactor. The metal complex and 1.2 equivalents of cocatalyst (bishydrogenated tallowalkyl)methylammonium tetrakis(penta-fluorophenyl)borate having the approximate formula, $[(C_{14\text{-}18}H_{27\text{-}35})_2CH_3N]^+[B(C_6F_5)_4]^-$, along with 5 equivalents of triisobutylaluminum modified alumoxane (MMAO, available from Akzo Chemicals, Inc.) form the catalyst composition. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer. Process details and results are contained in Table 2. Polymer properties are provided in Table 3.

TABLE 2

| Run | Cat. | T (° C.) | conv.[1] | Cat. Eff.[2] | Solvent flow (kg/hr) | $C_2H_4$ flow (kg/hr) | $C_8H_{16}$ flow (kg/hr) | $H_2$ flow (sccm)[3] | Polymer produced (kg/hr) |
|---|---|---|---|---|---|---|---|---|---|
| 1* | A | 190 | 92.2 | 4.6 | 13.0 | 1.68 | 0.59 | 47 | 1.8 |
| 2* | B | 190 | 91.1 | 0.8 | " | " | 0.73 | 43 | 2.0 |
| 3 | Ex. 1 | 190 | 91.7 | 1.4 | " | " | 0.77 | 52 | 1.9 |
| 4 | Ex. 2 | 190 | 90.6 | 0.8 | " | " | " | 55 | 2.1 |
| 5* | D | 190 | 91.8 | 3.0 | 12.8 | " | " | 54 | 1.9 |
| 6* | E | 190 | 92.5 | 1.8 | 12.7 | " | 0.86 | 28 | 1.9 |
| 7 | Ex. 2 | 160 | 91.6 | 2.7 | 13.0 | " | 0.73 | 77 | 2.0 |
| 8 | " | 150 | 89.2 | 3.2 | 13.2 | 1.27 | 2.27 | 20 | 1.9 |

*Comparative, not an example of the invention
[1]percent ethylene conversion in reactor
[2]efficiency, g PE/μg Zr
[3]standard cm³/min

TABLE 3

| Run | MI | $I_{10}/I_2$ | Density (g/cc) | Mw | Mn | Mw/Mn |
|---|---|---|---|---|---|---|
| 1* | 1.00 | 12.8 | 0.910 | 74,880 | 33,760 | 2.22 |
| 2* | 0.94 | 11.0 | 0.911 | 78,820 | 38,030 | 2.07 |
| 3 | 1.14 | 8.9 | 0.907 | 82,610 | 39,390 | 2.10 |
| 4 | 1.15 | 8.6 | 0.910 | 84,230 | 40,430 | 2.08 |
| 5* | 0.80 | 12.5 | 0.910 | 80,340 | 34,520 | 2.33 |
| 6* | 1.15 | 13.1 | 0.909 | 71,650 | 30,150 | 2.38 |
| 7 | 1.13 | 7.3 | 0.909 | 90,370 | 43,540 | 2.08 |
| 8 | 0.54 | 7.9 | 0.869 | 131,800 | 56,510 | 2.33 |

*Comparative, not an example of the invention

The results of Table 3 indicate that polymers having good properties but reduced $I_{10}/I_2$ (indicating reduction in long chain branch formation) may be prepared according to the invention merely by use of metal complexes as described herein.

Variable Temperature Polymerizations

The polymerization conditions stated above are substantially repeated to produce several polymers over a range of polymerization temperatures. Polymer $I_{10}/I_2$ values are measured and plotted. Lines fitting the data points are depicted in FIG. 1. In FIG. 1, PE is an ethylene/octene copolymer containing enhanced long chain branching prepared using (t-butylamido)dimethyl (1,2,3,4,5-η)-1,5,6,7-tetrahydro-2-methyl-s-indacen-1-yl)silane titanium (II) 1,3-pentadiene metal complex (prepared according to U.S. Pat. No. 5,965,756) and trispentafluorophenylborane cocatalyst with MAO scavenger in a molar ratio Ti:B:Al of 1:3:1. Comparative polymer AA (using comparative metal complex A) and polymer IA (using metal complex Ex. 1) are prepared using the previously disclosed cocatalyst/scavenger combination. Over the range of temperatures tested, polymers prepared according to the invention (IA) possess $I_{10}/I_2$ values that are less than those for the two comparative polymers.

The invention claimed is:

1. A process for polymerization of ethylene and one or more $C_{3-30}$ α-olefins or diolefins under continuous, solution polymerization conditions to prepare a polymer, said process comprising conducting the polymerization in the presence of a catalyst composition comprising a zirconium or hafnium complex of a polyvalent aryloxyether characterized in that the polymers have molecular weight distribution ($M_w/M_n$) less than or equal to 3.0, comonomer contents giving polymer densities from 0.850 to 0.950, and $I_{10}/I_2 \leq 10$.

2. A process for polymerization of ethylene and one or more $C_{3-30}$ α-olefins or diolefins under continuous, solution polymerization conditions to prepare a polymer, said process comprising conducting the polymerization in the presence of a catalyst composition comprising a metal complex of a polyvalent aryloxyether corresponding to the formula:

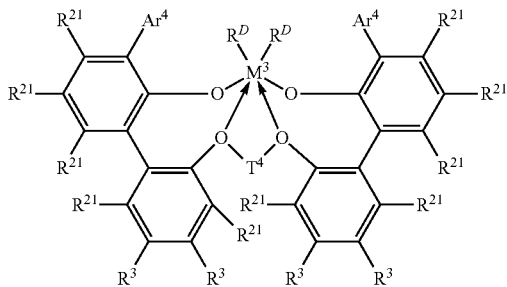

where $M^3$ is Hf or Zr;

$Ar^4$ independently each occurrence is a substituted $C_{9-20}$ aryl group, wherein the substituents, independently each occurrence, are selected from the group consisting of alkyl; cycloalkyl; and aryl groups; and halo-, trihydrocarbylsilyl- and halohydrocarbyl- substituted derivatives thereof, with the proviso that the substituent must lack co-planarity with the aryl group to which it is attached;

$T^4$ independently each occurrence is a $C_{2-20}$ alkylene, cycloalkylene or cycloalkenylene group, or an inertly substituted derivative thereof;

$R^{21}$ independently each occurrence is hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ independently each occurrence is hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$, independently each occurrence is halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl) silylene group wherein each $Ar^4$ group is substituted with at least one sterically bulky group, and at least two $R^3$ groups located on different aryleneoxy groups are sterically bulky.

3. A process according to claim 1 wherein the polymer has $I_{10}$ and $I_2$ properties satisfying the equation $I_{10}/I_2 \leq 10.32 (MI)^{-0.0814}$ for $I_{10}/I_2$ values ranging from 0.01 to 50.

4. A process according to claim 1 consisting essentially of copolymerizing ethylene and 1-octene.

5. A process according to claim 1 operating at an ethylene conversion of 85 percent or greater.

6. A process according to claim 1 wherein the metal complex corresponds to the formula:

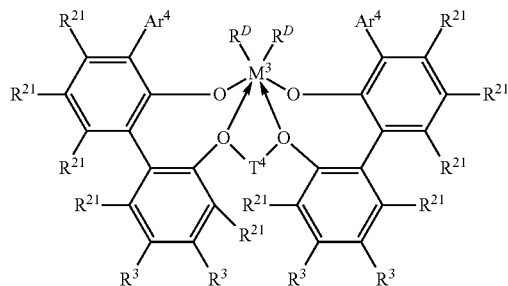

where $M^3$ is Zr;

$Ar^4$ independently each occurrence is a substituted $C_{9-20}$ aryl group, wherein the substituents, independently each occurrence, are selected from the group consisting of alkyl; cycloalkyl; and aryl groups; and halo-, trihydrocarbylsilyl- and halohydrocarbyl- substituted derivatives thereof, with the proviso that at least one substituent lacks co-planarity with the aryl group to which it is attached;

$T^4$ independently each occurrence is a $C_{2-20}$ alkylene, cycloalkylene or cycloalkenylene group, or an inertly substituted derivative thereof;

$R^{21}$ independently each occurrence is hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ independently each occurrence is hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring or an $R^3$ and an $R^{21}$ group on the same or different arylene ring together form a divalent ligand group attached to the arylene group in two positions or join two different arylene rings together; and $R^D$, independently each occurrence is halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl) silylene group.

7. The process of claim 6 wherein each $Ar^4$ group is substituted with at least one sterically bulky group, and at least two $R^3$ groups located on different aryleneoxy groups are sterically bulky.

8. The process of claim 2 or 7 wherein each $Ar^4$ group corresponds to the formula:

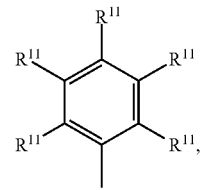

wherein R¹¹ independently each occurrence is hydrogen, halo, hydrocarbyl, trihydrocarbylsilyl, trihydrocarbylsilylhydrocarbyl, alkoxy or di(hydrocarbyl)amino of up to 50 atoms not counting hydrogen, or two R¹¹ groups together are part of a ring attached to the aryl group in two positions, with the proviso that in at least one occurrence R¹¹ or the divalent derivative of two such R¹¹ groups, is sterically bulky.

9. The process of claim 8 wherein the sterically bulky R¹¹ and R³ substituents are independently selected from the group consisting of tertiary alkyl-, cycloalkyl-, trihydrocarbylsilyl-, tri(hydrocarbyl)silylhydrocarbyl-, and tri(hydrocarbyl)phenyl-groups having from 3 to 20 nonhydrogen atoms.

10. The process of claim 8 wherein the sterically bulky R¹¹ and R³ substituents are independently selected from the group consisting of: tert-butyl, sec-butyl, tert-octyl(2,4,4-trimethylpentan-2-yl), 1-phenylethyl, 2,3-dimethyl-but-2-yl, trityl(triphenylmethyl), cumyl(2-phenylprop-2-yl), tert-amyl(1,1-dimethylpropyl), phenyl, cyclohexyl, trimethylsilyl, trimethylsilylmethyl, isopropyl, 2,4,6-trimethylphenyl, 2,6-dimethylphenyl, 3,5-di(isopropyl)phenyl, and 3,5-di(t-butyl)phenyl.

11. The process of claim 6, wherein the metal complex corresponds to the formula:

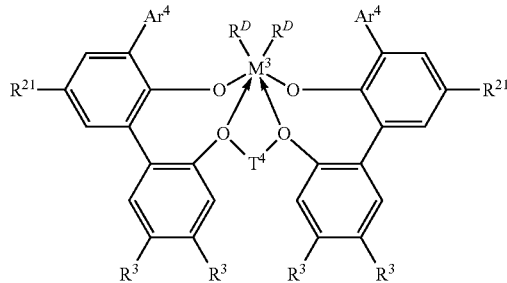

where M³ is Zr;

Ar⁴ is 3,5-di(tert-butyl)phenyl, 3,5-di(isopropyl)phenyl, 3,5-di(isobutyl)phenyl, 3,5-di(tert-octyl)phenyl, 3,5-di(2,4,6-trimethylphenyl)phenyl, 3,5-di(2,6-dimethylphenyl)phenyl, 3,5-di(2,4,6-tri-isopropylphenyl)phenyl, 3,5-di(3,5-di-tert-butylphenyl)phenyl, 1,2,3,4,6,7,8,9-octahydroanthracen-5-yl, 3,6-di(tert-butyl)-9H-carbazol-9-yl, or 3,6-di(tert-octyl)-9H-carbazol-9-yl;

R²¹ independently each occurrence is methyl or tert-butyl;

R³ independently each occurrence is a sterically bulky group selected from branched alkyl, cycloalkyl, or substituted aryl;

T⁴ is propan-1,3-diyl, butan-1,4-diyl, cyclohexane-1,2-diyl or cyclohexane-1,2-dimethylene; and R^D, independently each occurrence is halo or a hydrocarbyl or trihydrocarbylsilyl group of up to 20 atoms not counting hydrogen, or 2 R^D groups together are hydrocarbylene, hydrocarbadiyl, 1,4-dihydrocarbyl-substituted 1,3-butadiene, or a poly(hydrocarbyl)silylene group.

12. The process of claim 11 wherein at least two R³ groups on different arylene rings are branched alkyl, cycloalkyl, hydrocarbyl-substituted aryl, or poly(hydrocarbyl)-substituted silyl groups, containing from 3 to 20 carbons.

13. The process of claim 12 wherein two R³ groups on different arylene rings are tert-butyl or tert-octyl.

14. The process of claim 1 wherein the metal complex is selected from the group consisting of:

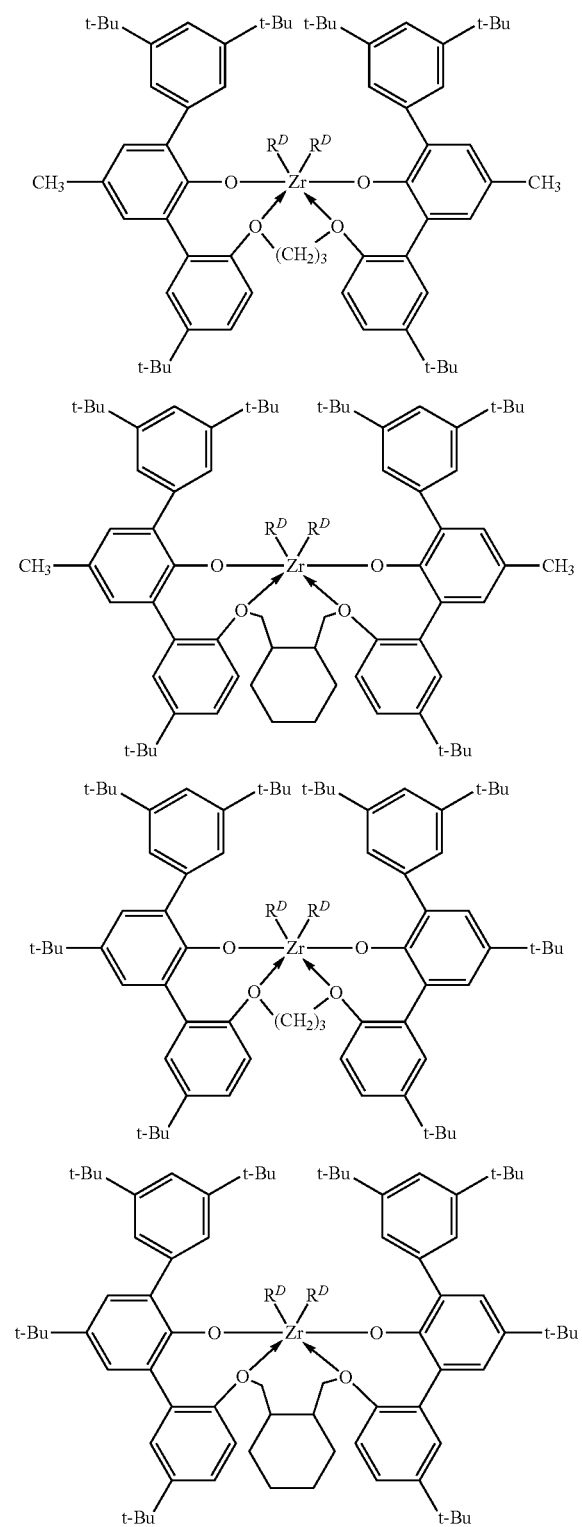

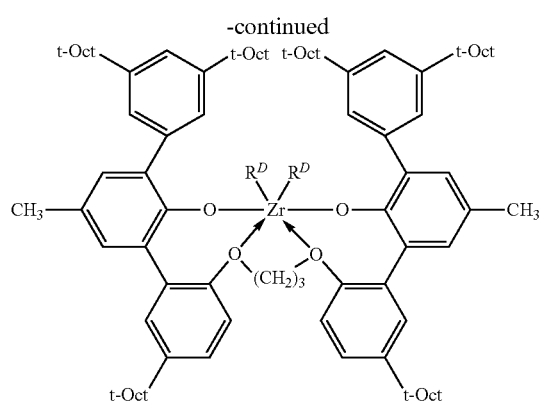
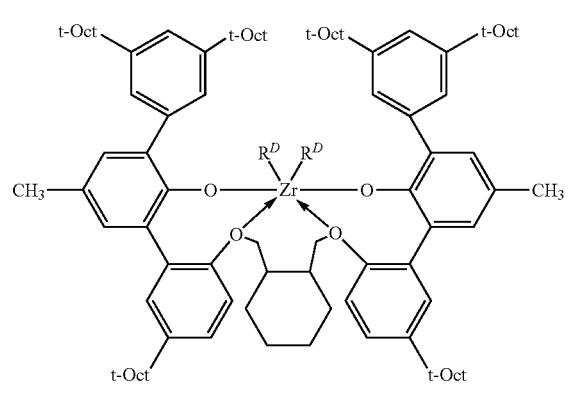
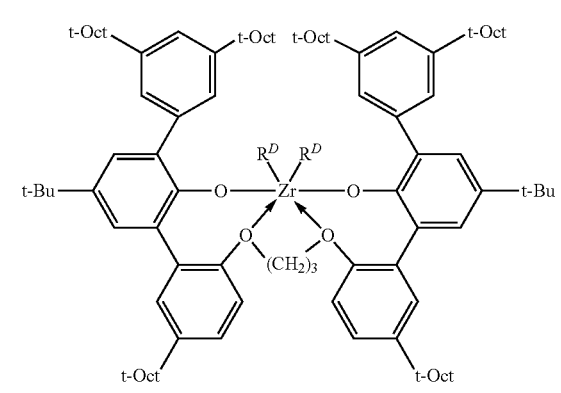
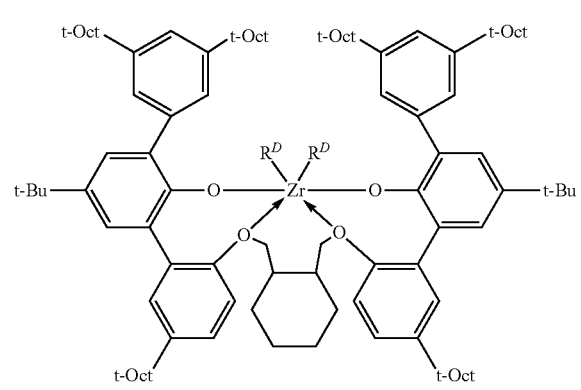
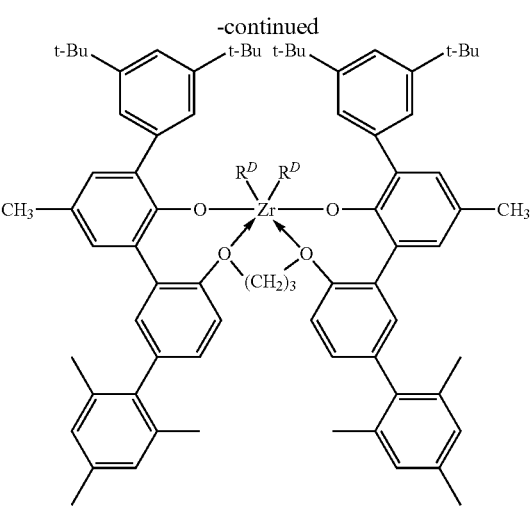
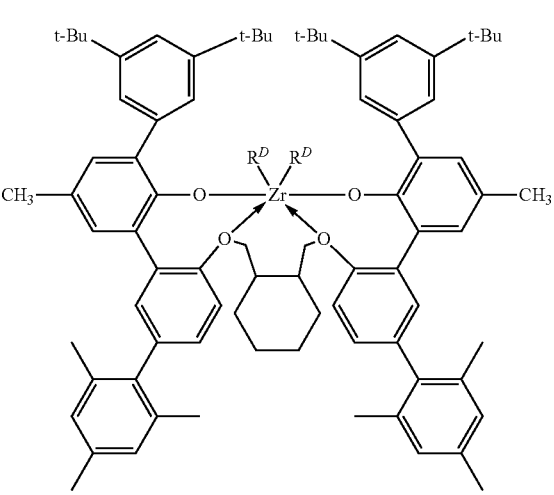
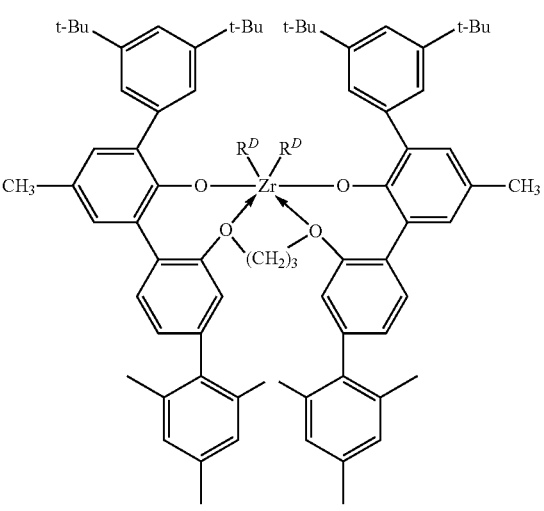

87
-continued
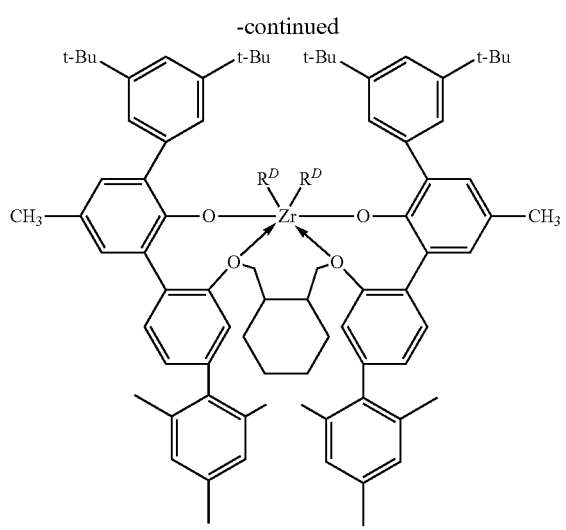
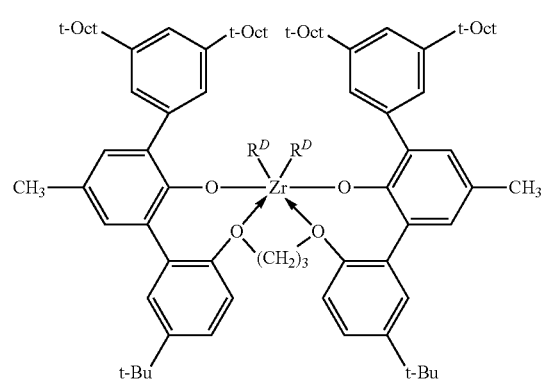
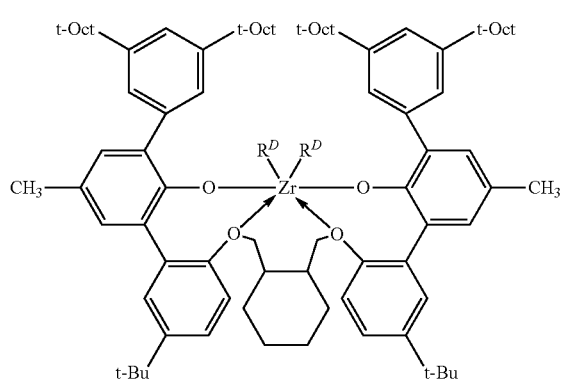
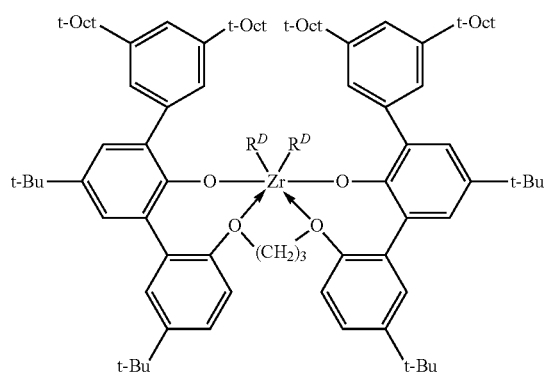
88
-continued
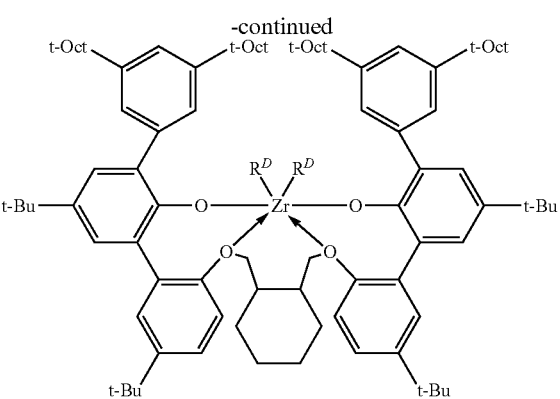
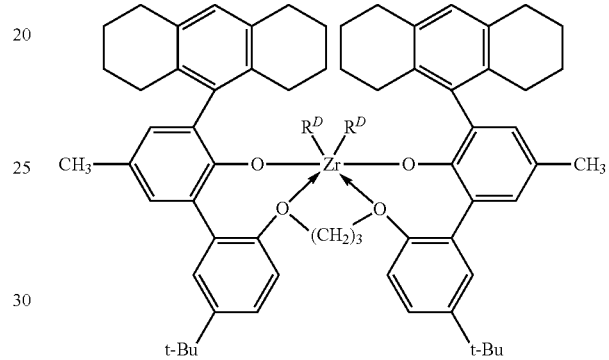
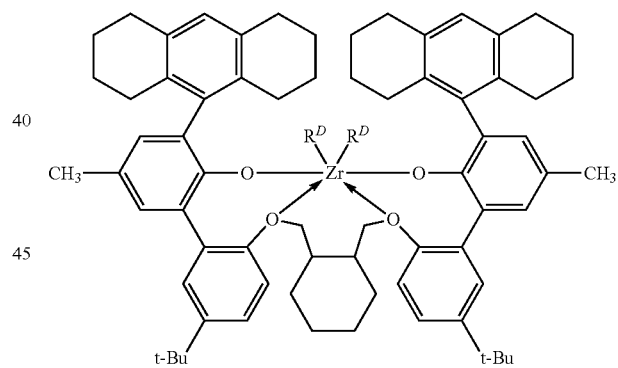
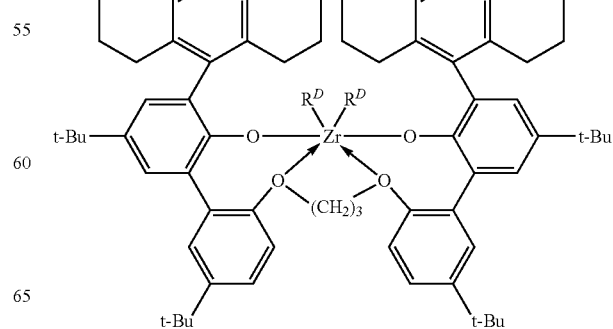

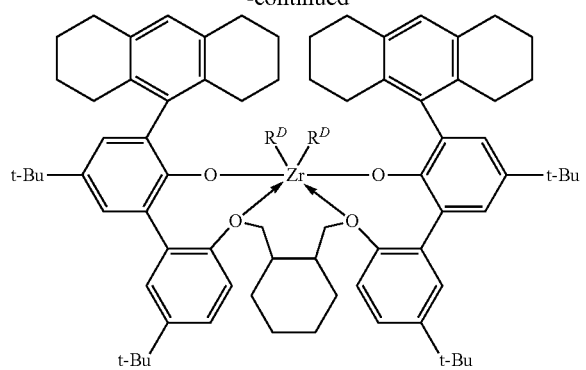
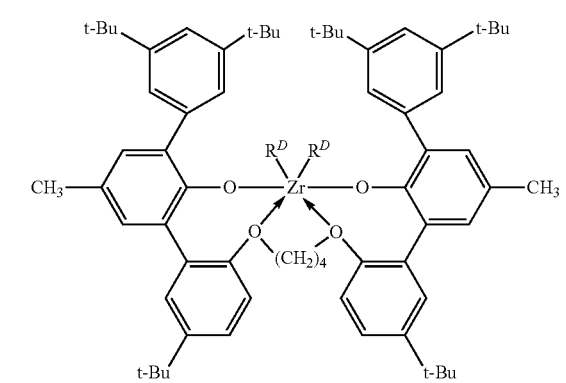
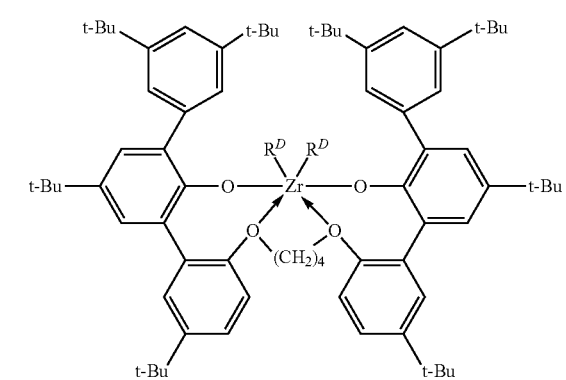
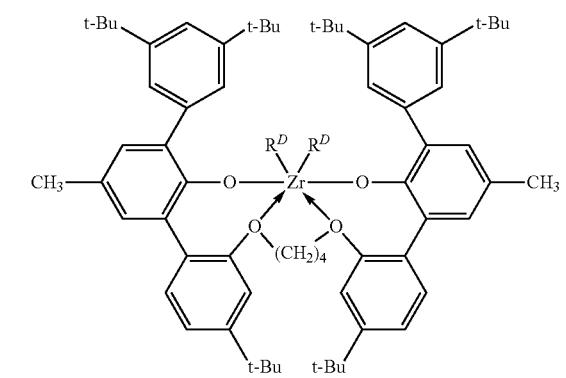
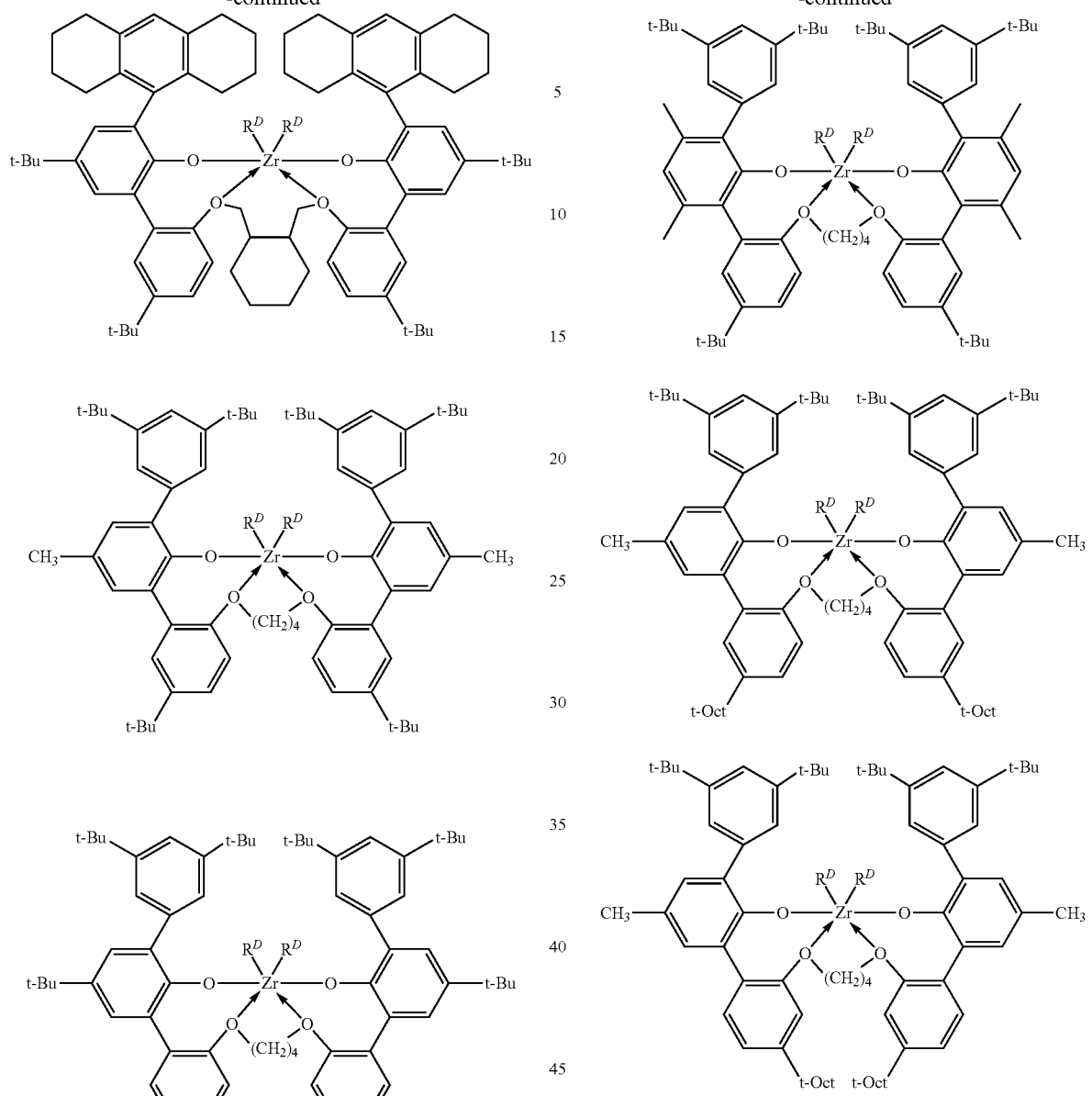
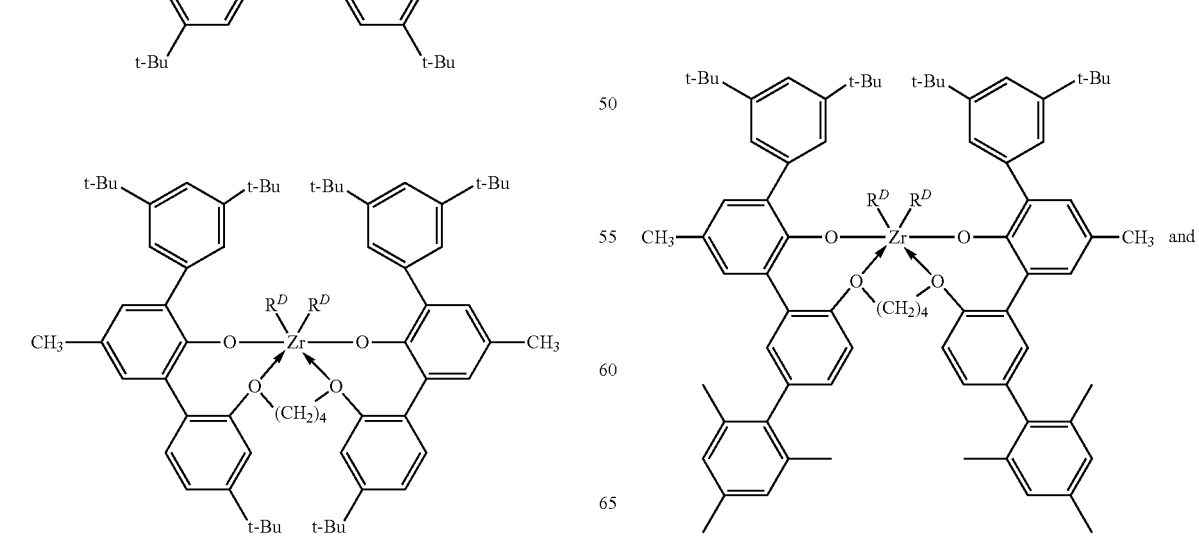

-continued

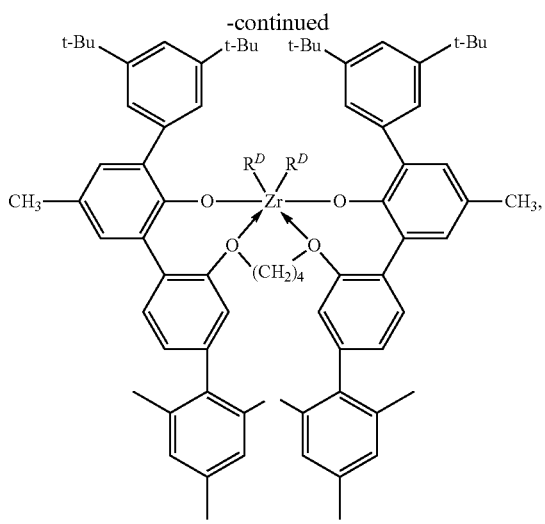

where $R^D$ independently each occurrence is chloride, methyl or benzyl.

15. The process of claim 1 wherein the metal complex is selected from the group consisting of:
A) bis((2-oxoyl-3-(3,5-bis-(1,1-dimethylethyl)phenyl)-5-methyl(phenyl)-4-(1,1-dimethylethyl)-2-phenoxy)propane-1,3-diyl zirconium (IV) dimethyl, bis((2-oxoyl-3-(3,5-bis-(1,1-dimethylethyl)phenyl)-5-methyl(phenyl)-4-(1,1-dimethylethyl)-2-phenoxy)propane-1,3-diyl zirconium (IV) dichloride, bis((2-oxoyl-3-(3,5-bis-(1,1-dimethylethyl)phenyl)-5-methyl(phenyl)-4-(1,1-dimethylethyl)-2-phenoxy)propane-1,3-diyl zirconium (IV) dibenzyl, bis((2-oxoyl-3-(3,5-bis-(1,1-dimethylethyl)phenyl)-5-methyl(phenyl)-4-(1,1-dimethylethyl)-2-phenoxy)methyl)cyclohexane-1,2-diyl zirconium (IV) dimethyl, bis((2-oxoyl-3-(3,5-bis-(1,1-dimethylethyl)phenyl)-5-methyl(phenyl)-4-(1,1-dimethylethyl)-2-phenoxy)methyl)cyclohexane-1,2-diyl zirconium (IV) dichloride, bis((2-oxoyl-3-(3,5-bis-(1,1-dimethylethyl)phenyl)-5-methyl(phenyl)-4-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-methyl(phenyl)-4-(1,1-dimethylethyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-methyl(phenyl)-4-(1,1-dimethylethyl)-2-phenoxy)methyl)cyclohex-4-ene-1,2-diyl zirconium (IV) dichloride, bis((2-oxoyl-3-(3,5-bis-(1,1-dimethylethyl)phenyl)-5-methyl(phenyl)-4-(1,1-dimethylethyl)-2-phenoxy)methyl)cyclohex-4-ene-1,2-diyl zirconium (IV) dibenzyl,
bis((2-oxoyl-3-(3,5-bis-(1,1-dimethylethyl)phenyl)-5-(1,1-dimethylethyl)(phenyl)-4-(1,1-dimethylethyl)-2-phenoxy)propane-1,3-diyl zirconium (IV) dimethyl, bis((2-oxoyl-3-(3,5-bis-(1,1-dimethylethyl)phenyl)-5-(1,1-dimethylethyl)(phenyl)-4-(1,1-dimethylethyl)-2-phenoxy)propane-1,3-diyl zirconium (IV) dichloride, bis((2-oxoyl-3-(3,5-bis-(1,1-dimethylethyl)phenyl)-5-(1,1-dimethylethyl)(phenyl)-4-(1,1-dimethylethyl)-2-phenoxy)propane-1,3-diyl zirconium (IV) dibenzyl, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohexane-1,2-diyl zirconium (IV) dimethyl, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohexane-1,2-diyl zirconium (IV) dichloride, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohex-4-ene-1,2-diyl zirconium (IV) dichloride, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohex-4-ene-1,2-diyl zirconium (IV) dibenzyl,
bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)propane-1,3-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)propane-1,3-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)propane-1,3-diyl zirconium (IV) dibenzyl,
bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohexane-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohexane-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dibenzyl,
B) bis((2-oxoyl-3-(3,5-bis-(1,1-dimethylethyl)phenyl)-5-methyl(phenyl)-4-(2,4,4-trimethylpentan-2-yl)-2-phenoxy)propane-1,3-diyl zirconium (IV) dimethyl, bis((2-oxoyl-3-(3,5-bis-(1,1-dimethylethyl)phenyl)-5-methyl(phenyl)-4-(2,4,4-trimethylpentan-2-yl)-2-phenoxy)propane-1,3-diyl zirconium (IV) dichloride, bis((2-oxoyl-3-(3,5-bis-(1,1-dimethylethyl)phenyl)-5-methyl(phenyl)-4-(2,4,4-trimethylpentan-2-yl)-2-phenoxy)propane-1,3-diyl zirconium (IV) dibenzyl, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohexane-1,2-diyl zirconium (IV) dimethyl, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(1,1- dimethylethyl)phenyl)-5-methyl(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(1,1-dimethylethyl)(phenyl)-4-(1-methyl-4,4-dimethylpen-2-yl-2-phenoxy)propane-1,3-diyl zirconium (IV) dimethyl, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)propane-1,3-diyl zirconium (IV) dichloride, bis((2-oxoyl-3-(3,5-bis-(1,1-dimethylethyl)phenyl)-5-(1,1-dimethylethyl)(phenyl)-4-(1-methyl-4,4-dimethylpen-2-yl-2-phenoxy)propane-1,3-diyl zirconium (IV) dibenzyl, bis((2-oxoyl-3-(3,5-bis-(1,1-dimethylethyl)phenyl)-5-(1,1-dimethylethyl)(phenyl)-4-(1-methyl-4,4-dimethylpen-2-yl-2-phenoxy)methyl)cyclohexane-1,2-diyl zirconium (IV) dimethyl, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)propane-1,3-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)propane-1,3-diyl zirconium (IV) dichloride, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)propane-1,3-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dibenzyl, C) bis((2-oxoyl-3-(3,5-bis-(1,1-dimethylethyl)phenyl)-5-methyl(phenyl)-4-(1-butyl)-2-phenoxy)propane-1,3-diyl zirconium (IV) dimethyl, bis((2-oxoyl-3-(3,5-bis-(1,1-dimethylethyl)phenyl)-5-methyl(phenyl)-4-(1-butyl)-2-phenoxy)propane-1,3-diyl zirconium (IV) dichloride, bis((2-oxoyl-3-(3,5-bis-(1,1-dimethylethyl)phenyl)-5-methyl(phenyl)-4-(1-butyl)-2-phenoxy)propane-1,3-diyl zirconium (IV) dibenzyl, bis((2-oxoyl-3-(3,5-bis-(1,1-dimethylethyl)phenyl)-5-methyl(phenyl)-4-(1-butyl)-2-phenoxy)methyl)cyclohexane-1,2-diyl zirconium (IV) dimethyl, bis((2-oxoyl-3-(3,5-bis-(1,1-dimethylethyl)phenyl)-5-methyl(phenyl)-4-(1-butyl)-2-phenoxy)methyl)cyclohexane-1,2-diyl zirconium (IV) dichloride, bis((2-oxoyl-3-(3,5-bis-(1,1-dimethylethyl)phenyl)-5-methyl(phenyl)-4-(1-butyl)-2-phenoxy)methyl)cyclohexane-1,2-diyl zirconium (IV) dibenzyl, bis((2-oxoyl-3-(3,5-bis-(1,1-dimethylethyl)phenyl)-5-methyl(phenyl)-4-(1-butyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-methyl(phenyl)-4-(1-butyl)-2-phenoxy)methyl)cyclohex-4-ene-1,2-diyl zirconium (IV) dichloride, bis((2-oxoyl-3-(3,5-bis-(1,1-dimethylethyl)phenyl)-5-methyl(phenyl)-4-(1-butyl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(1,1-dimethylethyl)(phenyl)-4-(1-butyl)-2-phenoxy)propane-1,3-diyl zirconium (IV) dimethyl, bis((2-oxoyl-3-(3,5-bis-(1,1-dimethylethyl)phenyl)-5-(1,1-dimethylethyl)(phenyl)-4-(1-butyl)-2-phenoxy)propane-1,3-diyl zirconium (IV) dichloride, bis((2-oxoyl-3-(3,5-bis-(1,1-dimethylethyl)phenyl)-5-(1,1-dimethylethyl)(phenyl)-4-(1-butyl)-2-phenoxy)propane-1,3-diyl zirconium (IV) dibenzyl, bis((2-oxoyl-3-(3,5-bis-(1,1-dimethylethyl)phenyl)-5-(1,1-dimethylethyl)(phenyl)-4-(1-butyl)-2-phenoxy)methyl)cyclohexane-1,2-diyl zirconium (IV) dimethyl, bis((2-oxoyl-3-(3,5-bis-(1,1-dimethylethyl)phenyl)-5-(1,1-dimethylethyl)(phenyl)-4-(1-butyl)-2-phenoxy)methyl)cyclohexane-1,2-diyl zirconium (IV) dichloride, bis((2-oxoyl-3-(3,5-bis-(1,1-dimethylethyl)phenyl)-5-(1,1-dimethylethyl)(phenyl)-4-(1-butyl)-2-phenoxy)methyl)cyclohexane-1,2-diyl zirconium (IV) dibenzyl, bis((2-oxoyl-3-(3,5-bis-(1,1-dimethylethyl)phenyl)-5-(1,1-dimethylethyl)(phenyl)-4-(1-butyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(1,1-dimethylethyl)(phenyl)-4-(1-butyl)-2-phenoxy)methyl)cyclohex-4-ene-1,2-diyl zirconium (IV) dichloride, bis((2-oxoyl-3-(3,5-bis-(1,1-dimethylethyl)phenyl)-5-(1,1-dimethylethyl)(phenyl)-4-(1-butyl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(1-butyl)-2-phenoxy)propane-1,3-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1-butyl)-2-phenoxy)propane-1,3-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1-butyl)-2-phenoxy)propane-1,3-diyl zirconium (IV) dibenzyl, bis((2-oxoyl-3-(3,5-bis-(1,1-dimethylethyl)phenyl)-5-(2,4,4- trimethylpentan-2-yl)(phenyl)-4-(1-butyl)-2-phenoxy)
methyl)cyclohexane-1,2-diyl zirconium (IV) dimethyl,
bis((2-oxoyl-3-(3,5-bis-(1,1-dimethylethyl)phenyl)-5-
(2,4,4-trimethylpentan-2-yl)(phenyl)-4-(1-butyl)-2-
phenoxy)methyl)cyclohexane-1,2-diyl zirconium (IV)
dichloride, bis((2-oxoyl-3-(3,5-bis-(1,1-dimethylethyl)
phenyl)-5-(2,4,4-trimethylpentan-2-yl)(phenyl)-4-(1-
butyl)-2-phenoxy)methyl)cyclohexane-1,2-diyl zirconium (IV) dibenzyl, bis((2-oxoyl-3-(3,5-bis-(1,1-
dimethylethyl)phenyl)-5-(2,4,4-trimethylpentan-2-yl)
(phenyl)-4-(1-butyl)-2-phenoxy)methyl)cyclohex-4-
ene-1,2-diyl zirconium (IV) dimethyl, bis((2-oxoyl-3-
(3,5-bis-(1,1-dimethylethyl)phenyl)-5-(2,4,4-
trimethylpentan-2-yl)(phenyl)-4-(1-butyl)-2-phenoxy)
methyl)cyclohex-4-ene-1,2-diyl zirconium (IV)
dichloride, bis((2-oxoyl-3-(3,5-bis-(1,1-dimethylethyl)
phenyl)-5-(2,4,4-trimethylpentan-2-yl)(phenyl)-4-(1-
butyl)-2-phenoxy)methyl)cyclohex-4-ene-1,2-diyl zirconium (IV) dibenzyl, D) bis((2-oxoyl-3-(3,5-bis-(1,1-dimethylethyl)phenyl)-5-
methyl(phenyl)-5-(1,1-dimethylethyl)-2-phenoxy)propane-1,3-diyl zirconium (IV) dimethyl,
bis((2-oxoyl-3-(3,5-bis-(1,1-dimethylethyl)phenyl)-5-
methyl(phenyl)-5-(1,1-dimethylethyl)-2-phenoxy)propane-1,3-diyl zirconium (IV) dichloride, bis((2-oxoyl-
3-(3,5-bis-(1,1-dimethylethyl)phenyl)-5-methyl
(phenyl)-5-(1,1-dimethylethyl)-2-phenoxy)propane-1,
3-diyl zirconium (IV) dibenzyl, bis((2-oxoyl-3-(3,5-bis-
(1,1-dimethylethyl)phenyl)-5-methyl(phenyl)-5-(1,1-
dimethylethyl)-2-phenoxy)methyl)cyclohexane-1,2-
diyl zirconium (IV) dimethyl, bis((2-oxoyl-3-(3,5-bis-
(1,1-dimethylethyl)phenyl)-5-methyl(phenyl)-5-(1,1-
dimethylethyl)-2-phenoxy)methyl)cyclohexane-1,2-
diyl zirconium (IV) dichloride, bis((2-oxoyl-3-(3,5-bis-
(1,1-dimethylethyl)phenyl)-5-methyl(phenyl)-5-(1,1-
dimethylethyl)-2-phenoxy)methyl)cyclohexane-1,2-
diyl zirconium (IV) dibenzyl, bis((2-oxoyl-3-(3,5-bis-
(1,1-dimethylethyl)phenyl)-5-methyl(phenyl)-5-(1,1-
dimethylethyl)-2-phenoxy)methyl)cyclohex-4-ene-1,2-
diyl zirconium (IV) dimethyl, bis((2-oxoyl-3-(3,5-bis-
(1,1-dimethylethyl)phenyl)-5-methyl(phenyl)-5-(1,1-
dimethylethyl)-2-phenoxy)methyl)cyclohex-4-ene-1,2-
diyl zirconium (IV) dichloride, bis((2-oxoyl-3-(3,5-bis-
(1,1-dimethylethyl)phenyl)-5-methyl(phenyl)-5-(1,1-
dimethylethyl)-2-phenoxy)methyl)cyclohex-4-ene-1,2-
diyl zirconium (IV) dibenzyl,
bis((2-oxoyl-3-(3,5-bis-(1,1-dimethylethyl)phenyl)-5-(1,
1-dimethylethyl)(phenyl)-5-(1,1-dimethylethyl)-2-phenoxy)propane-1,3-diyl zirconium (IV) dimethyl, bis((2-
oxoyl-3-(3,5-bis-(1,1-dimethylethyl)phenyl)-5-(1,1-
dimethylethyl)(phenyl)-5-(1,1-dimethylethyl)-2-
phenoxy)propane-1,3-diyl zirconium (IV) dichloride,
bis((2-oxoyl-3-(3,5-bis-(1,1-dimethylethyl)phenyl)-5-
(1,1-dimethylethyl)(phenyl)-5-(1,1-dimethylethyl)-2-
phenoxy)propane-1,3-diyl zirconium (IV) dibenzyl,
bis((2-oxoyl-3-(3,5-bis-(1,1-dimethylethyl)phenyl)-5-(1,
1-dimethylethyl)(phenyl)-5-(1,1-dimethylethyl)-2-phenoxy)methyl)cyclohexane-1,2-diyl zirconium (IV) dimethyl, bis((2-oxoyl-3-(3,5-bis-(1,1-dimethylethyl)
phenyl)-5-(1,1-dimethylethyl)(phenyl)-5-(1,1-
dimethylethyl)-2-phenoxy)methyl)cyclohexane-1,2-
diyl zirconium (IV) dichloride, bis((2-oxoyl-3-(3,5-bis-
(1,1-dimethylethyl)phenyl)-5-(1,1-dimethylethyl)
(phenyl)-5-(1,1-dimethylethyl)-2-phenoxy)methyl)
cyclohexane-1,2-diyl zirconium (IV) dibenzyl, bis((2-
oxoyl-3-(3,5-bis-(1,1-dimethylethyl)phenyl)-5-(1,1-
dimethylethyl)(phenyl)-5-(1,1-dimethylethyl)-2-
phenoxy)methyl)cyclohex-4-ene-1,2-diyl zirconium
(IV) dimethyl, bis((2-oxoyl-3-(3,5-bis-(1,1-dimethylethyl)phenyl)-5-(1,1-dimethylethyl)(phenyl)-5-(1,1-
dimethylethyl)-2-phenoxy)methyl)cyclohex-4-ene-1,2-
diyl zirconium (IV) dichloride, bis((2-oxoyl-3-(3,5-bis-
(1,1-dimethylethyl)phenyl)-5-(1,1-dimethylethyl)
(phenyl)-5-(1,1-dimethylethyl)-2-phenoxy)methyl)
cyclohex-4-ene-1,2-diyl zirconium (IV) dibenzyl,
bis((2-oxoyl-3-(3,5-bis-(1,1-dimethylethyl)phenyl)-5-(2,
4,4-trimethylpentan-2-yl)(phenyl)-5-(1,1-dimethylethyl)-2-phenoxy)propane-1,3-diyl zirconium (IV)
dimethyl, bis((2-oxoyl-3-(3,5-bis-(1,1-dimethylethyl)
phenyl)-5-(2,4,4-trimethylpentan-2-yl)(phenyl)-5-(1,1-
dimethylethyl)-2-phenoxy)propane-1,3-diyl zirconium
(IV) dichloride, bis((2-oxoyl-3-(3,5-bis-(1,1-dimethylethyl)phenyl)-5-(2,4,4-trimethylpentan-2-yl)(phenyl)-
5-(1,1-dimethylethyl)-2-phenoxy)propane-1,3-diyl zirconium (IV) dibenzyl, bis((2-oxoyl-3-(3,5-bis-(1,1-
dimethylethyl)phenyl)-5-(2,4,4-trimethylpentan-2-yl)
(phenyl)-5-(1,1-dimethylethyl)-2-phenoxy)methyl)
cyclohexane-1,2-diyl zirconium (IV) dimethyl, bis((2-
oxoyl-3-(3,5-bis-(1,1-dimethylethyl)phenyl)-5-(2,4,4-
trimethylpentan-2-yl)(phenyl)-5-(1,1-dimethylethyl)-
2-phenoxy)methyl)cyclohexane-1,2-diyl zirconium
(IV) dichloride, bis((2-oxoyl-3-(3,5-bis-(1,1-dimethylethyl)phenyl)-5-(2,4,4-trimethylpentan-2-yl)(phenyl)-
5-(1,1-dimethylethyl)-2-phenoxy)methyl)cyclohexane-
1,2-diyl zirconium (IV) dibenzyl, bis((2-oxoyl-3-(3,5-
bis-(1,1-dimethylethyl)phenyl)-5-(2,4,4-
trimethylpentan-2-yl)(phenyl)-5-(1,1-dimethylethyl)-
2-phenoxy)methyl)cyclohex-4-ene-1,2-diyl zirconium
(IV) dimethyl, bis((2-oxoyl-3-(3,5-bis-(1,1-dimethylethyl)phenyl)-5-(2,4,4-trimethylpentan-2-yl)(phenyl)-
5-(1,1-dimethylethyl)-2-phenoxy)methyl)cyclohex-4-
ene-1,2-diyl zirconium (IV) dichloride, bis((2-oxoyl-3-
(3,5-bis-(1,1-dimethylethyl)phenyl)-5-(2,4,4-
trimethylpentan-2-yl)(phenyl)-5-(1,1-dimethylethyl)-
2-phenoxy)methyl)cyclohex-4-ene-1,2-diyl zirconium
(IV) dibenzyl, E) bis((2-oxoyl-3-(3,5-bis-(2,4,4-trimethylpentan-2-yl)
phenyl)-5-methyl(phenyl)-4-(1,1-dimethylethyl)-2-
phenoxy)propane-1,3-diyl zirconium (IV) dimethyl, bis
((2-oxoyl-3-(3,5-bis-(2,4,4-trimethylpentan-2-yl)
phenyl)-5-methyl(phenyl)-4-(1,1-dimethylethyl)-2-
phenoxy)propane-1,3-diyl zirconium (IV) dichloride,
bis((2-oxoyl-3-(3,5-bis-(2,4,4-trimethylpentan-2-yl)
phenyl)-5-methyl(phenyl)-4-(1,1-dimethylethyl)-2-
phenoxy)propane-1,3-diyl zirconium (IV) dibenzyl, bis
((2-oxoyl-3-(3,5-bis-(2,4,4-trimethylpentan-2-yl)
phenyl)-5-methyl(phenyl)-4-(1,1-dimethylethyl)-2-
phenoxy)methyl)cyclohexane-1,2-diyl zirconium (IV)
dimethyl, bis((2-oxoyl-3-(3,5-bis-(2,4,4-trimethylpentan-2-yl)phenyl)-5-methyl(phenyl)-4-(1,1-dimethylethyl)-2-phenoxy)methyl)cyclohexane-1,2-diyl zirconium (IV) dichloride, bis((2-oxoyl-3-(3,5-bis-(2,4,4-
trimethylpentan-2-yl)phenyl)-5-methyl(phenyl)-4-(1,
1-dimethylethyl)-2-phenoxy)methyl)cyclohexane-1,2-
diyl zirconium (IV) dibenzyl, bis((2-oxoyl-3-(3,5-bis-
(2,4,4-trimethylpentan-2-yl)phenyl)-5-methyl(phenyl)-
4-(1,1-dimethylethyl)-2-phenoxy)methyl)cyclohex-4-
ene-1,2-diyl zirconium (IV) dimethyl, bis((2-oxoyl-3-
(3,5-bis-(2,4,4-trimethylpentan-2-yl)phenyl)-5-methyl
(phenyl)-4-(1,1-dimethylethyl)-2-phenoxy)methyl)
cyclohex-4-ene-1,2-diyl zirconium (IV) dichloride, bis
((2-oxoyl-3-(3,5-bis-(2,4,4-trimethylpentan-2-yl)

phenyl)-5-methyl(phenyl)-4-(1,1-dimethylethyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dibenzyl, F) bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)propane-1,3-diyl zirconium (IV) dimethyl, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)propane-1,3-diyl zirconium (IV) dichloride, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)propane-1,3-diyl zirconium (IV) dibenzyl, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1-methyl-4,4-dimethylpen-2-yl-2-phenoxy)propane-1,3-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)propane-1,3-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1-methyl-4,4-dimethylpen-2-yl-2-phenoxy)propane-1,3-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1-methyl-4,4-dimethylpen-2-yl-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)propane-1,3-diyl zirconium (IV) dimethyl, bis((2-oxoyl-3-(3,5-bis-(2,4,4- trimethylpentan-2-yl)phenyl)-5-(2,4,4-trimethylpentan-2-yl)(phenyl)-4-(2,4,4-trimethylpentan-2-yl)-2-phenoxy)propane-1,3-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)propane-1,3-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dibenzyl, G) bis((2-oxoyl-3-(3,5-bis-(2,4,4-trimethylpentan-2-yl)phenyl)-5-methyl(phenyl)-4-(1-butyl)-2-phenoxy)propane-1,3-diyl zirconium (IV) dimethyl, bis((2-oxoyl-3-(3,5-bis-(2,4,4-trimethylpentan-2-yl)phenyl)-5-methyl(phenyl)-4-(1-butyl)-2-phenoxy)propane-1,3-diyl zirconium (IV) dichloride, bis((2-oxoyl-3-(3,5-bis-(2,4,4-trimethylpentan-2-yl)phenyl)-5-methyl(phenyl)-4-(1-butyl)-2-phenoxy)propane-1,3-diyl zirconium (IV) dibenzyl, bis((2-oxoyl-3-(3,5-bis-(2,4,4-trimethylpentan-2-yl)phenyl)-5-methyl(phenyl)-4-(1-butyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-methyl(phenyl)-4-(1-butyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-methyl(phenyl)-4-(1-butyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-methyl(phenyl)-4-(1-butyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-methyl(phenyl)-4-(1-butyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-methyl(phenyl)-4-(1-butyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1-butyl)-2-phenoxy)propane-1,3-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1-butyl)-2-phenoxy)propane-1,3-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1-butyl)-2-phenoxy)propane-1,3-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)propane-1,3-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)propane-1,3-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)propane-1,3-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohex-4-ene-1,2-diyl zirconium (IV) dibenzyl, H) bis((2-oxoyl-3-(3,5-bis-(2,4,4-trimethylpentan-2-yl)phenyl)-5-methyl(phenyl)-5-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-methyl(phenyl)-5-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-methyl(phenyl)-5-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohexane-1,2-diyl zirconium (IV) dichloride, bis((2-oxoyl-3-(3,5-bis-(2,4,4- trimethylpentan-2-yl)phenyl)-5-methyl(phenyl)-5-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)(phenyl)-5-(1,1-dimethylethyl)-2-phenoxy)methyl)cyclohex-4-ene-1,2-diyl zirconium (IV) dichloride, and bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohex-4-ene-1,2-diyl zirconium (IV) dibenzyl.

16. A metal complex of a polyvalent aryloxyether corresponding to the formula:

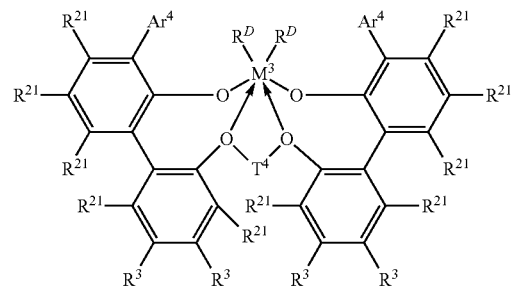

where $M^3$ is Hf or Zr;

$Ar^4$ independently each occurrence is a substituted $C_{9-20}$ aryl group, wherein the substituents, independently each occurrence, are selected from the group consisting of alkyl; cycloalkyl; and aryl groups; and halo-, trihydrocarbylsilyl- and halohydrocarbyl- substituted derivatives thereof, with the proviso that the substituent must lack co-planarity with the aryl group to which it is attached;

$T^4$ independently each occurrence is a $C_{2-20}$ alkylene, cycloalkylene or cycloalkenylene group, or an inertly substituted derivative thereof;

$R^{21}$ independently each occurrence is hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ independently each occurrence is hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$, independently each occurrence is halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl) silylene group;

wherein each $Ar^4$ group is substituted with at least one sterically bulky group, and at least two $R^3$ groups located on different aryleneoxy groups are sterically bulky.

17. A metal complex according to claim 16 where $M^3$ is Zr.

18. A metal complex according to claim 16 wherein each $Ar^4$ group corresponds to the formula:

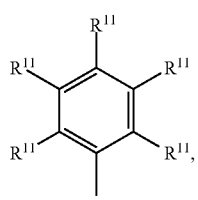

wherein R[11] independently each occurrence is hydrogen, halo, hydrocarbyl, trihydrocarbylsilyl, trihydrocarbylsilylhydrocarbyl, alkoxy or di(hydrocarbyl)amino of up to 50 atoms not counting hydrogen, or two R[11] groups together are part of a ring attached to the aryl group in two positions, with the proviso that in at least one occurrence R[11] or the divalent derivative of two such R[11] groups, is sterically bulky.

19. The metal complex of claim 18 wherein the sterically bulky R[11] and R[3] substituents are independently selected from the group consisting of tertiary alkyl-, cycloalkyl-, trihydrocarbylsilyl-, tri(hydrocarbyl)silylhydrocarbyl-, and tri(hydrocarbyl)phenyl- groups having from 3 to 20 nonhydrogen atoms.

20. The metal complex of claim 18 wherein the sterically bulky R[11] and R[3] substituents are independently selected from the group consisting of: tert-butyl, sec-butyl, tert-octyl (2,4,4-trimethylpentan-2-yl), 1-phenylethyl, 2,3-dimethylbut-2-yl, trityl(triphenylmethyl), cumyl(2-phenylprop-2-yl), tert-amyl(1,1-dimethylpropyl), phenyl, cyclohexyl, trimethylsilyl, trimethylsilylmethyl, isopropyl, 2,4,6-trimethylphenyl, 2,6-dimethylphenyl, 3,5-di(isopropyl)phenyl, and 3,5-di(t-butyl)phenyl.

21. The metal complex of claim 16, corresponding to the formula:

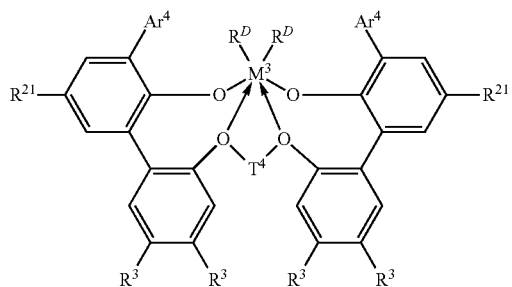

where $M^3$ is Zr;
Ar[4] is 3,5-di(tert-butyl)phenyl, 3,5-di(isopropyl)phenyl, 3,5-di(isobutyl)phenyl, 3,5-di(tert-octyl)phenyl, 3,5-di(2,4,6-trimethylphenyl)phenyl, 3,5-di(2,6-dimethylphenyl)phenyl, 3,5-di(2,4,6-tri-isopropylphenyl)phenyl, 3,5-di(3,5-di-tert-butylphenyl)phenyl, 1,2,3,4,6,7,8,9-octahydroanthracen-5-yl, 3,6-di(tert-butyl)-9H-carbazol-9-yl, or 3,6-di(tert-octyl)-9H-carbazol-9-yl;

R[21] independently each occurrence is methyl or tert-butyl;

R[3] independently each occurrence is a sterically bulky group selected from branched alkyl, cycloalkyl, or substituted aryl;

T[4] is propan-1,3-diyl, butan-1,4-diyl, cyclohexane-1,2-diyl or cyclohexane-1,2-dimethylene; and R[D], independently each occurrence is halo or a hydrocarbyl or trihydrocarbylsilyl group of up to 20 atoms not counting hydrogen, or 2 R[D] groups together are hydrocarbylene, hydrocarbadiyl, 1,4-dihydrocarbyl- substituted 1,3-butadiene, or a poly(hydrocarbyl)silylene group.

22. The metal complex of claim 21 wherein at least two R[3] groups on different arylene rings are branched alkyl, cycloalkyl, hydrocarbyl- substituted aryl, or poly(hydrocarbyl)- substituted silyl groups, containing from 3 to 20 carbons.

23. The metal complex of claim 22 wherein two R[3] groups on different arylene rings are tert-butyl or tert-octyl.

24. A metal complex selected from the group consisting of:

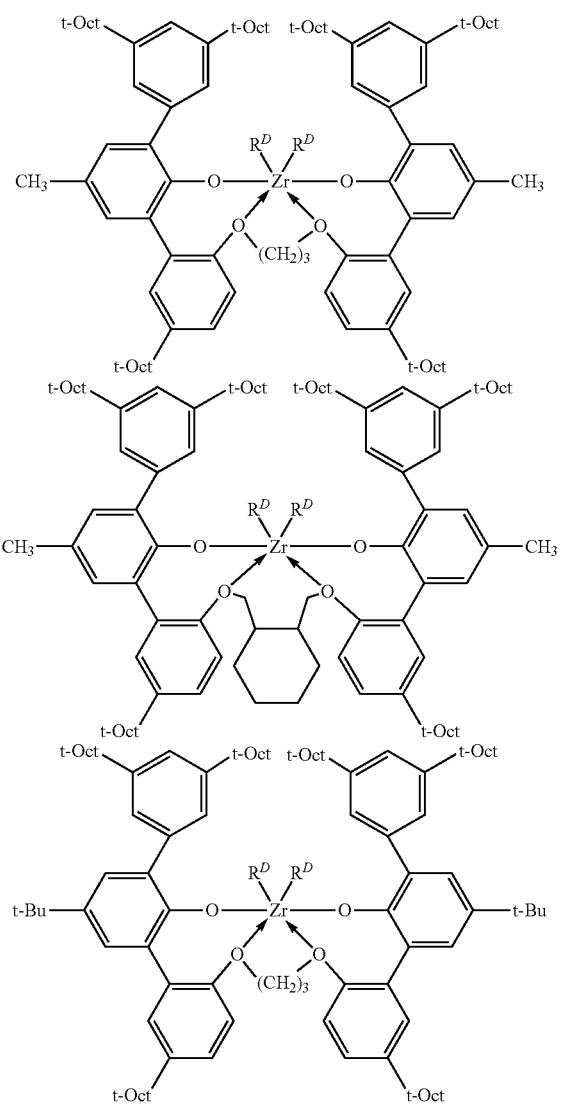

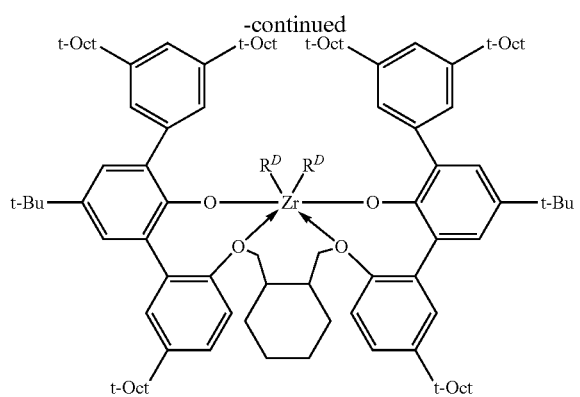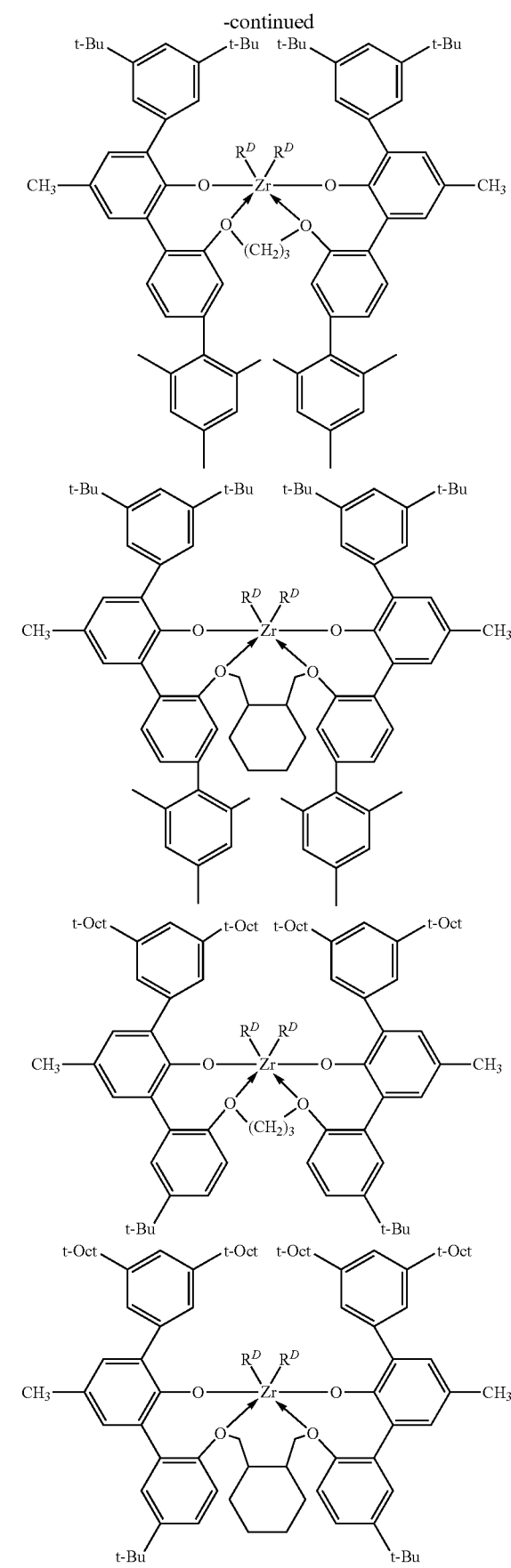

-continued
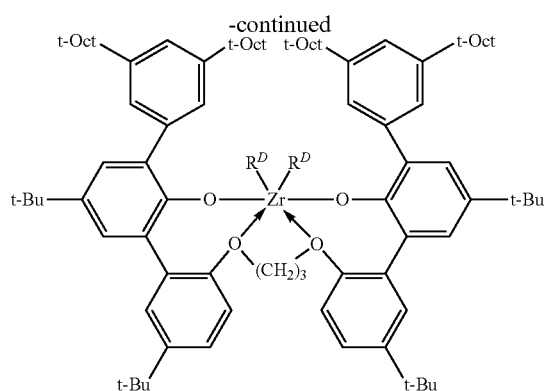
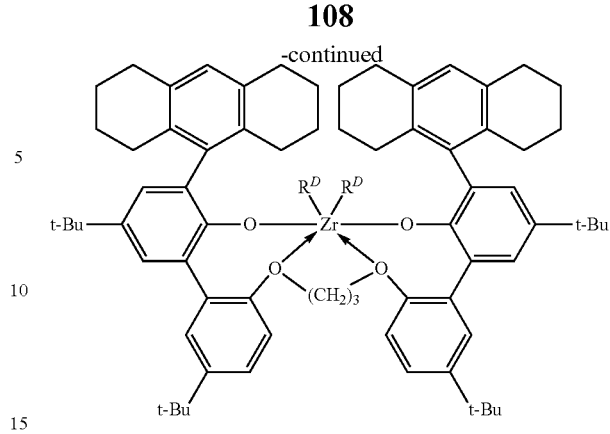
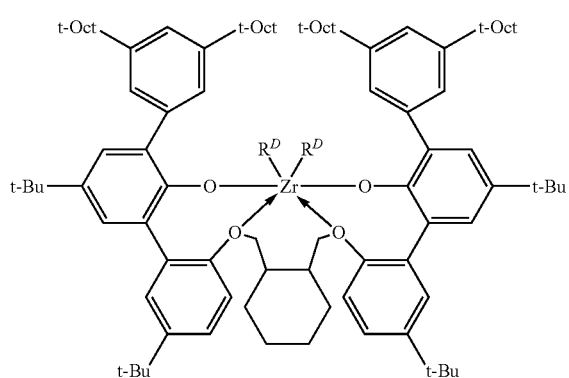
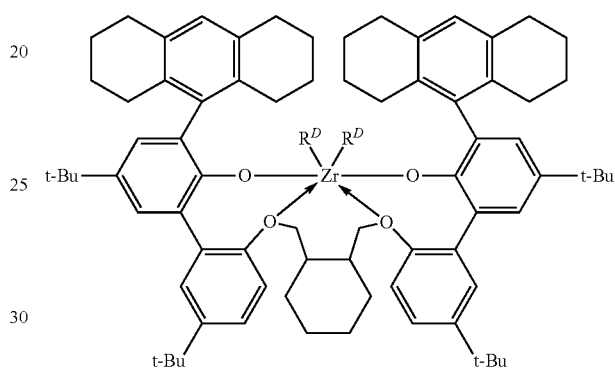
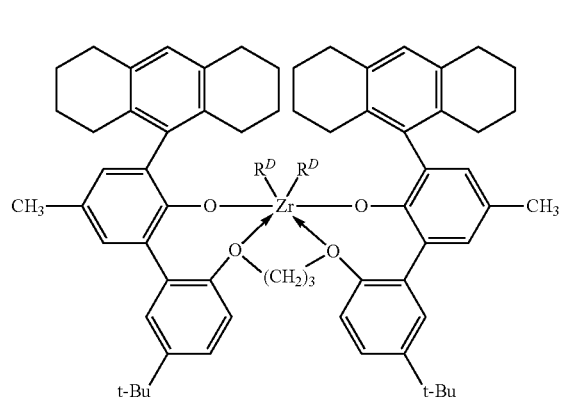
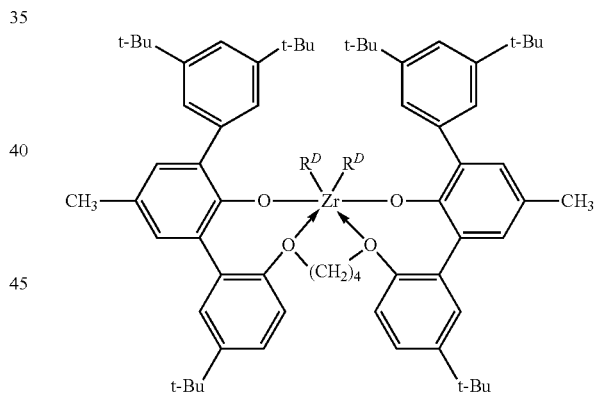
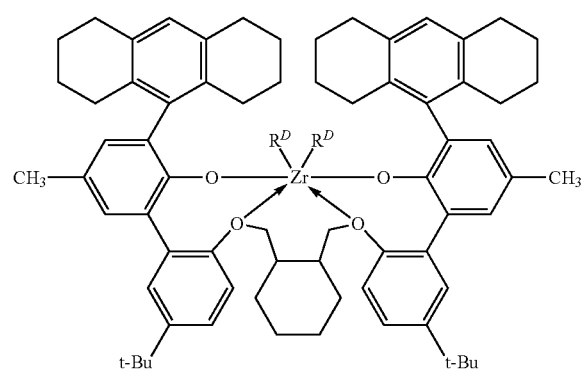
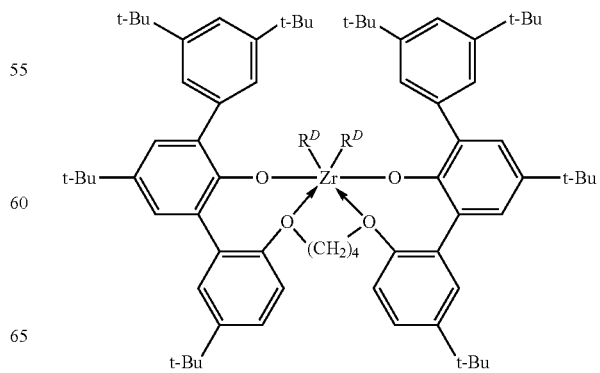

-continued

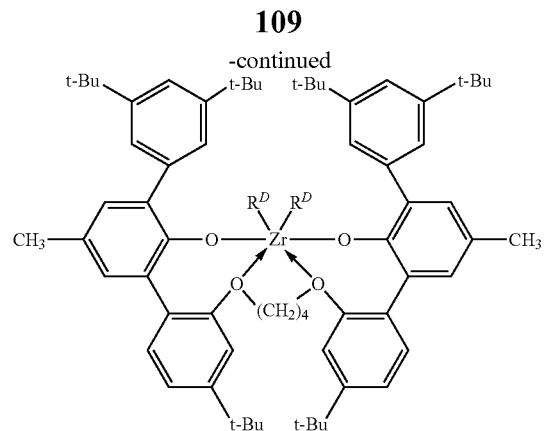

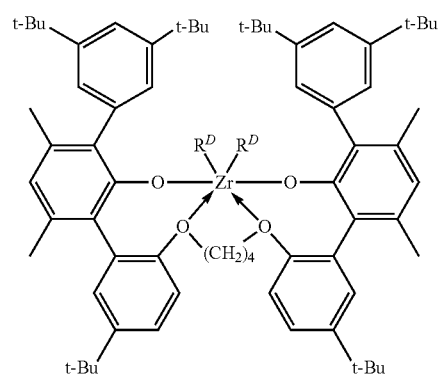

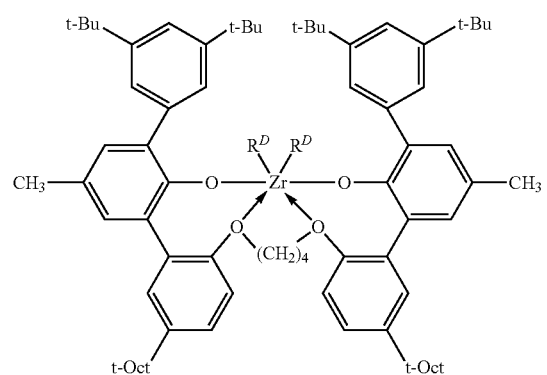

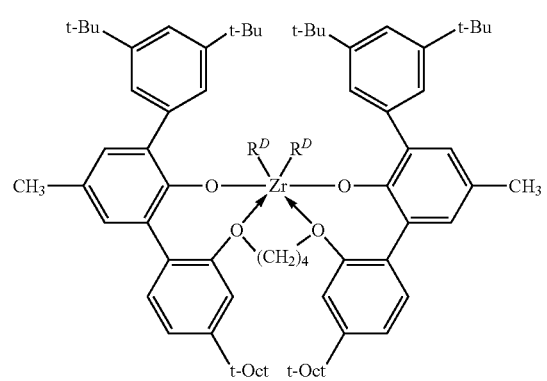

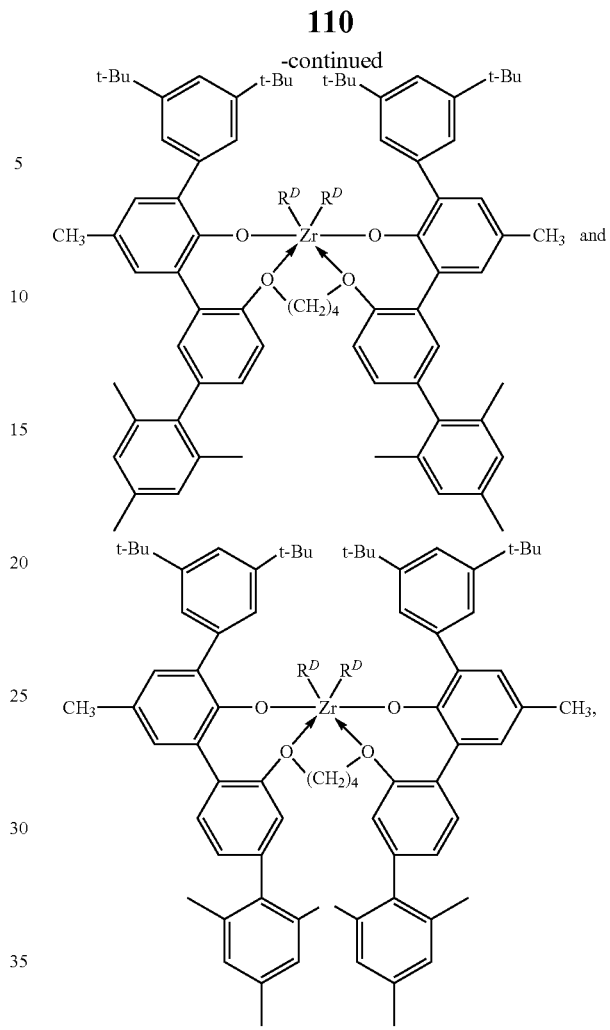

where $R^D$ independently each occurrence is chloride, methyl or benzyl.

25. A metal complex selected from the group consisting of:
A) bis((2-oxoyl-3-(3,5-bis-(1,1-dimethylethyl)phenyl)-5-methyl(phenyl)-4-(1,1-dimethylethyl)-2-phenoxy)propane-1,3-diyl zirconium (IV) dimethyl, bis((2-oxoyl-3-(3,5-bis-(1,1-dimethylethyl)phenyl)-5-methyl(phenyl)-4-(1,1-dimethylethyl)-2-phenoxy)propane-1,3-diyl zirconium (IV) dichloride, bis((2-oxoyl-3-(3,5-bis-(1,1-dimethylethyl)phenyl)-5-methyl(phenyl)-4-(1,1-dimethylethyl)-2-phenoxy)propane-1,3-diyl zirconium (IV) dibenzyl, bis((2-oxoyl-3-(3,5-bis-(1,1-dimethylethyl)phenyl)-5-methyl(phenyl)-4-(1,1-dimethylethyl)-2-phenoxy)methyl)cyclohexane-1,2-diyl zirconium (IV) dimethyl, bis((2-oxoyl-3-(3,5-bis-(1,1-dimethylethyl)phenyl)-5-methyl(phenyl)-4-(1,1-dimethylethyl)-2-phenoxy)methyl)cyclohexane-1,2-diyl zirconium (IV) dichloride, bis((2-oxoyl-3-(3,5-bis-(1,1-dimethylethyl)phenyl)-5-methyl(phenyl)-4-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-methyl(phenyl)-4-(1,1-dimethylethyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-methyl(phenyl)-4-(1,1-dimethylethyl)-2-phenoxy)methyl)cyclohex-4-ene-1,2-diyl zirconium (IV) dichloride, bis((2-oxoyl-3-(3,5-bis-(1,1-dimethylethyl)phenyl)-5-methyl(phenyl)-4-(1,1-dimethylethyl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(1,1-dimethylethyl)(phenyl)-4-(1,1-dimethylethyl)-2-phenoxy)propane-1,3-diyl zirconium (IV) dimethyl, bis((2-oxoyl-3-(3,5-bis-(1,1-dimethylethyl)phenyl)-5-(1,1-dimethylethyl)(phenyl)-4-(1,1-dimethylethyl)-2-phenoxy)propane-1,3-diyl zirconium (IV) dichloride, bis((2-oxoyl-3-(3,5-bis-(1,1-dimethylethyl)phenyl)-5-(1,1-dimethylethyl)(phenyl)-4-(1,1-dimethylethyl)-2-phenoxy)propane-1,3-diyl zirconium (IV) dibenzyl, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohexane-1,2-diyl zirconium (IV) dimethyl, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohexane-1,2-diyl zirconium (IV) dichloride, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohex-4-ene-1,2-diyl zirconium (IV) dichloride, bis((2-oxoyl-3-(3,5-bis-(1,1-dimethylethyl)phenyl)-5-(1,1-dimethylethyl)(phenyl)-4-(1,1-dimethylethyl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)propane-1,3-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)propane-1,3-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)propane-1,3-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohexane-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohexane-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dibenzyl, B) bis((2-oxoyl-3-(3,5-bis-(1,1-dimethylethyl)phenyl)-5-methyl(phenyl)-4-(2,4,4-trimethylpentan-2-yl)-2-phenoxy)propane-1,3-diyl zirconium (IV) dimethyl, bis((2-oxoyl-3-(3,5-bis-(1,1-dimethylethyl)phenyl)-5-methyl(phenyl)-4-(2,4,4-trimethylpentan-2-yl)-2-phenoxy)propane-1,3-diyl zirconium (IV) dichloride, bis((2-oxoyl-3-(3,5-bis-(1,1-dimethylethyl)phenyl)-5-methyl(phenyl)-4-(2,4,4-trimethylpentan-2-yl)-2-phenoxy)propane-1,3-diyl zirconium (IV) dibenzyl, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohexane-1,2-diyl zirconium (IV) dimethyl, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(1,1-dimethylethyl)phenyl)-5-methyl(phenyl)-4-(2,4,4-trimethylpentan-2-yl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(1,1-dimethylethyl)(phenyl)-4-(1-methyl-4,4-dimethylpen-2-yl-2-phenoxy)propane-1,3-diyl zirconium (IV) dimethyl, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)propane-1,3-diyl zirconium (IV) dichloride, bis((2-oxoyl-3-(3,5-bis-(1,1-dimethylethyl)phenyl)-5-(1,1-dimethylethyl)(phenyl)-4-(1-methyl-4,4-dimethylpen-2-yl-2-phenoxy)propane-1,3-diyl zirconium (IV) dibenzyl, bis((2-oxoyl-3-(3,5-bis-(1,1-dimethylethyl)phenyl)-5-(1,1-dimethylethyl)(phenyl)-4-(1-methyl-4,4-dimethylpen-2-yl-2-phenoxy)methyl)cyclohexane-1,2-diyl zirconium (IV) dimethyl, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(1,1-dimethylethyl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)propane-1,3-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)propane-1,3-diyl zirconium (IV) dichloride, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)propane-1,3-diyl zirconium (IV) dibenzyl, bis((2-oxoyl-3-(3,5-bis-(1,1-dimethylethyl)phenyl)-5-(2,4,4-trimethylpentan-2-yl)

(phenyl)-4-(2,4,4-trimethylpentan-2-yl)-2-phenoxy)methyl)cyclohexane-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dibenzyl, C) bis((2-oxoyl-3-(3,5-bis-(1,1-dimethylethyl)phenyl)-5-methyl(phenyl)-4-(1-butyl)-2-phenoxy)propane-1,3-diyl zirconium (IV) dimethyl, bis((2-oxoyl-3-(3,5-bis-(1,1-dimethylethyl)phenyl)-5-methyl(phenyl)-4-(1-butyl)-2-phenoxy)propane-1,3-diyl zirconium (IV) dichloride, bis((2-oxoyl-3-(3,5-bis-(1,1-dimethylethyl)phenyl)-5-methyl(phenyl)-4-(1-butyl)-2-phenoxy)propane-1,3-diyl zirconium (IV) dibenzyl, bis((2-oxoyl-3-(3,5-bis-(1,1-dimethylethyl)phenyl)-5-methyl(phenyl)-4-(1-butyl)-2-phenoxy)methyl)cyclohexane-1,2-diyl zirconium (IV) dimethyl, bis((2-oxoyl-3-(3,5-bis-(1,1-dimethylethyl)phenyl)-5-methyl(phenyl)-4-(1-butyl)-2-phenoxy)methyl)cyclohexane-1,2-diyl zirconium (IV) dichloride, bis((2-oxoyl-3-(3,5-bis-(1,1-dimethylethyl)phenyl)-5-methyl(phenyl)-4-(1-butyl)-2-phenoxy)methyl)cyclohexane-1,2-diyl zirconium (IV) dibenzyl, bis((2-oxoyl-3-(3,5-bis-(1,1-dimethylethyl)phenyl)-5-methyl(phenyl)-4-(1-butyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-methyl(phenyl)-4-(1-butyl)-2-phenoxy)methyl)cyclohex-4-ene-1,2-diyl zirconium (IV) dichloride, bis((2-oxoyl-3-(3,5-bis-(1,1-dimethylethyl)phenyl)-5-methyl(phenyl)-4-(1-butyl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(1,1-dimethylethyl)(phenyl)-4-(1-butyl)-2-phenoxy)propane-1,3-diyl zirconium (IV) dimethyl, bis((2-oxoyl-3-(3,5-bis-(1,1-dimethylethyl)phenyl)-5-(1,1-dimethylethyl)(phenyl)-4-(1-butyl)-2-phenoxy)propane-1,3-diyl zirconium (IV) dichloride, bis((2-oxoyl-3-(3,5-bis-(1,1-dimethylethyl)phenyl)-5-(1,1-dimethylethyl)(phenyl)-4-(1-butyl)-2-phenoxy)propane-1,3-diyl zirconium (IV) dibenzyl, bis((2-oxoyl-3-(3,5-bis-(1,1-dimethylethyl)phenyl)-5-(1,1-dimethylethyl)(phenyl)-4-(1-butyl)-2-phenoxy)methyl)cyclohexane-1,2-diyl zirconium (IV) dimethyl, bis((2-oxoyl-3-(3,5-bis-(1,1-dimethylethyl)phenyl)-5-(1,1-dimethylethyl)(phenyl)-4-(1-butyl)-2-phenoxy)methyl)cyclohexane-1,2-diyl zirconium (IV) dichloride, bis((2-oxoyl-3-(3,5-bis-(1,1-dimethylethyl)phenyl)-5-(1,1-dimethylethyl)(phenyl)-4-(1-butyl)-2-phenoxy)methyl)cyclohexane-1,2-diyl zirconium (IV) dibenzyl, bis((2-oxoyl-3-(3,5-bis-(1,1-dimethylethyl)phenyl)-5-(1,1-dimethylethyl)(phenyl)-4-(1-butyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(1,1-dimethylethyl)(phenyl)-4-(1-butyl)-2-phenoxy)methyl)cyclohex-4-ene-1,2-diyl zirconium (IV) dichloride, bis((2-oxoyl-3-(3,5-bis-(1,1-dimethylethyl)phenyl)-5-(1,1-dimethylethyl)(phenyl)-4-(1-butyl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(1-butyl)-2-phenoxy)propane-1,3-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1-butyl)-2-phenoxy)propane-1,3-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1-butyl)-2-phenoxy)propane-1,3-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(1-butyl)-2-phenoxy)methyl)cyclohexane-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1-butyl)-2-phenoxy)methyl)cyclohexane-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1-butyl)-2-phenoxy)methyl)cyclohexane-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-4-(1-butyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-4-(1-butyl)-2-phenoxy)methyl)cyclohex-4-ene-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-4-(1-butyl)-2-phenoxy)methyl)cyclohex-4-ene-1,2-diyl zirconium (IV) dibenzyl, D) bis((2-oxoyl-3-(3,5-bis-(1,1-dimethylethyl)phenyl)-5-methyl(phenyl)-5-(1,1-dimethylethyl)-2-phenoxy)propane-1,3-diyl zirconium (IV) dimethyl, bis((2-oxoyl-3-(3,5-bis-(1,1-dimethylethyl)phenyl)-5-methyl(phenyl)-5-(1,1-dimethylethyl)-2-phenoxy)propane-1,3-diyl zirconium (IV) dichloride, bis((2-oxoyl-3-(3,5-bis-(1,1-dimethylethyl)phenyl)-5-methyl(phenyl)-5-(1,1-dimethylethyl)-2-phenoxy)propane-1,3-diyl zirconium (IV) dibenzyl, bis((2-oxoyl-3-(3,5-bis-(1,1-dimethylethyl)phenyl)-5-methyl(phenyl)-5-(1,1-dimethylethyl)-2-phenoxy)methyl)cyclohexane-1,2-diyl zirconium (IV) dimethyl, bis((2-oxoyl-3-(3,5-bis-(1,1-dimethylethyl)phenyl)-5-methyl(phenyl)-5-(1,1-dimethylethyl)-2-phenoxy)methyl)cyclohexane-1,2-diyl zirconium (IV) dichloride, bis((2-oxoyl-3-(3,5-bis-(1,1-dimethylethyl)phenyl)-5-methyl(phenyl)-5-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-methyl(phenyl)-5-(1,1-dimethylethyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-methyl(phenyl)-5-(1,1-dimethylethyl)-2-phenoxy)methyl)cyclohex-4-ene-1,2-diyl zirconium (IV) dichloride, bis((2-oxoyl-3-(3,5-bis-(1,1-dimethylethyl)phenyl)-5-methyl(phenyl)-5-(1,1-dimethylethyl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(1,1-dimethylethyl)(phenyl)-5-(1,1-dimethylethyl)-2-phenoxy)propane-1,3-diyl zirconium (IV) dimethyl, bis((2-oxoyl-3-(3,5-bis-(1,1-dimethylethyl)phenyl)-5-(1,1- dimethylethyl)(phenyl)-5-(1,1-dimethylethyl)-2-phenoxy)propane-1,3-diyl zirconium (IV) dichloride, bis((2-oxoyl-3-(3,5-bis-(1,1-dimethylethyl)phenyl)-5-(1,1-dimethylethyl)(phenyl)-5-(1,1-dimethylethyl)-2-phenoxy)propane-1,3-diyl zirconium (IV) dibenzyl, bis((2-oxoyl-3-(3,5-bis-(1,1-dimethylethyl)phenyl)-5-(1,1-dimethylethyl)(phenyl)-5-(1,1-dimethylethyl)-2-phenoxy)methyl)cyclohexane-1,2-diyl zirconium (IV) dimethyl, bis((2-oxoyl-3-(3,5-bis-(1,1-dimethylethyl)phenyl)-5-(1,1-dimethylethyl)(phenyl)-5-(1,1-dimethylethyl)-2-phenoxy)methyl)cyclohexane-1,2-diyl zirconium (IV) dichloride, bis((2-oxoyl-3-(3,5-bis-(1,1-dimethylethyl)phenyl)-5-(1,1-dimethylethyl)(phenyl)-5-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-(1,1-dimethylethyl)(phenyl)-5-(1,1-dimethylethyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(1,1-dimethylethyl)(phenyl)-5-(1,1-dimethylethyl)-2-phenoxy)methyl)cyclohex-4-ene-1,2-diyl zirconium (IV) dichloride, bis((2-oxoyl-3-(3,5-bis-(1,1-dimethylethyl)phenyl)-5-(1,1-dimethylethyl)(phenyl)-5-(1,1-dimethylethyl)-2-phenoxy)methyl)cyclohex-4-ene-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)propane-1,3-diyl zirconium (IV) dimethyl, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)propane-1,3-diyl zirconium (IV) dichloride, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)propane-1,3-diyl zirconium (IV) dibenzyl, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)methyl)cyclohexane-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)methyl)cyclohexane-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)methyl)cyclohexane-1,2-diyl zirconium (IV) dibenzyl, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)methyl)cyclohex-4-ene-1,2-diyl zirconium (IV) dimethyl, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)methyl)cyclohex-4-ene-1,2-diyl zirconium (IV) dichloride, bis((2-oxoyl-3-(3,5-bis-(1,1-dimethylethyl)phenyl)-5-(2,4,4-trimethylpentan-2-yl)(phenyl)-5-(1,1-dimethylethyl)-2-phenoxy)methyl)cyclohex-4-ene-1,2-diyl zirconium (IV) dibenzyl, E) bis((2-oxoyl-3-(3,5-bis-(2,4,4-trimethylpentan-2-yl)phenyl)-5-methyl(phenyl)-4-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-methyl(phenyl)-4-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-methyl(phenyl)-4-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-methyl(phenyl)-4-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-methyl(phenyl)-4-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-methyl(phenyl)-4-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-methyl(phenyl)-4-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-methyl(phenyl)-4-(1,1-dimethylethyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-methyl(phenyl)-4-(1,1-dimethylethyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1,1-dimethylethyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1,1-dimethylethyl)-2-phenoxy)methyl)cyclohex-4-ene-1,2-diyl zirconium (IV) dibenzyl, F) bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)propane-1,3-diyl zirconium (IV) dimethyl, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)propane-1,3-diyl zirconium (IV) dichloride, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)propane-1,3-diyl zirconium (IV) dibenzyl, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-methyl(phenyl)-4-(2,4,4-trimethylpentan-2-yl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1-methyl-4,4-dimethylpen-2-yl-2-phenoxy)propane-1,3-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)propane-1,3-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1-methyl-4,4-dimethylpen-2-yl-2-phenoxy)propane-1,3-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1-methyl-4,4-dimethylpen-2-yl-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(2,4,4-trimethylpentan-2-yl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)propane-1,3-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)propane-1,3-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)propane-1,3-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(2,4,4-trimethylpentan-2-yl)-2-phenoxy)methyl)cyclohex-4-ene-1,2-diyl zirconium (IV) dibenzyl, G) bis((2-oxoyl-3-(3,5-bis-(2,4,4-trimethylpentan-2-yl)phenyl)-5-methyl(phenyl)-4-(1-butyl)-2-phenoxy)propane-1,3-diyl zirconium (IV) dimethyl, bis((2-oxoyl-3-(3,5-bis-(2,4,4-trimethylpentan-2-yl)phenyl)-5-methyl(phenyl)-4-(1-butyl)-2-phenoxy)propane-1,3-diyl zirconium (IV) dichloride, bis((2-oxoyl-3-(3,5-bis-(2,4,4-trimethylpentan-2-yl)phenyl)-5-methyl(phenyl)-4-(1-butyl)-2-phenoxy)propane-1,3-diyl zirconium (IV) dibenzyl, bis((2-oxoyl-3-(3,5-bis-(2,4,4-trimethylpentan-2-yl)phenyl)-5-methyl(phenyl)-4-(1-butyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-methyl(phenyl)-4-(1-butyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-methyl(phenyl)-4-(1-butyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-methyl(phenyl)-4-(1-butyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-methyl(phenyl)-4-(1-butyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-methyl(phenyl)-4-(1-butyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1-butyl)-2-phenoxy)propane-1,3-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1-butyl)-2-phenoxy)propane-1,3-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1-butyl)-2-phenoxy)propane-1,3-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-4-(1-butyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)propane-1,3-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)propane-1,3-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)propane-1,3-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-4-(1-butyl)-2-phenoxy)methyl)cyclohex-4-ene-1,2-diyl zirconium (IV) dibenzyl, H) bis((2-oxoyl-3-(3,5-bis-(2,4,4-trimethylpentan-2-yl)phenyl)-5-methyl(phenyl)-5-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-methyl(phenyl)-5-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-methyl(phenyl)-5-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-methyl(phenyl)-5-(1,1-dimethylethyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohex-4-ene-1,2-diyl zirconium (IV) dichloride, bis((2-oxoyl-3-(3,5-bis-(2,4,4-trimethylpentan-2-yl)phenyl)-5-(1,1-dimethylethyl)(phenyl)-5-(1,1-dimethylethyl)-2-phenoxy)methyl)cyclohex-4-ene-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)propane-1,3-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)propane-1,3-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)propane-1,3-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohexane-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohexane-1,2-diyl zirconium (IV) dichloride, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohexane-1,2-diyl zirconium (IV) dibenzyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohex-4-ene-1,2-diyl zirconium (IV) dimethyl, bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohex-4-ene-1,2-diyl zirconium (IV) dichloride, and bis((2-oxoyl-3-(3,5-bis-(2,4,4-trimethylpentan-2-yl)phenyl)-5-(2,4,4-trimethylpentan-2-yl)(phenyl)-5-(1,1-dimethylethyl)-2-phenoxy)methyl)cyclohex-4-ene-1,2-diyl zirconium (IV) dibenzyl.

\* \* \* \* \*